US006833699B2

(12) United States Patent
Galford et al.

(10) Patent No.: US 6,833,699 B2
(45) Date of Patent: Dec. 21, 2004

(54) METHOD FOR USING CONVENTIONAL CORE DATA TO CALIBRATE BOUND WATER VOLUMES DERIVED FROM TRUE VERTICAL DEPTH (TVD) INDEXING, IN A BOREHOLE, OF CAPILLARY PRESSURE AND NMR LOGS

(75) Inventors: James E. Galford, Missouri City, TX (US); David M. Marschall, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 114 days.

(21) Appl. No.: 10/252,135

(22) Filed: Sep. 19, 2002

(65) Prior Publication Data

US 2003/0094946 A1 May 22, 2003

Related U.S. Application Data

(60) Provisional application No. 60/323,567, filed on Sep. 19, 2001.

(51) Int. Cl.[7] .................................................. G01V 3/00
(52) U.S. Cl. ..................................................... 324/303
(58) Field of Search ................................ 324/303, 306, 324/300, 338; 702/16, 6

(56) References Cited

U.S. PATENT DOCUMENTS 5,680,043 A * 10/1997 Hurlimann et al. ......... 324/303

6,366,088 B1 * 4/2002 Hagiwara ................... 324/303
2003/0094946 A1 * 5/2003 Galford et al. .............. 324/303

OTHER PUBLICATIONS

Marschall, D M "HBVI (Height–Based BVI): An NMR Method to Determine BVI (Bulk Volume Irreducible) as a Function of Resrvoir Capillarity" Halliburton Energy Service 41st ANNU SPWLA Logging SYMP (Dallas, TX Jun. 4–Jul. 2000) ISBN: 65029274 Conference Article.*

* cited by examiner

*Primary Examiner*—Diego Gutierrez
*Assistant Examiner*—Tiffany A. Fetzner
(74) *Attorney, Agent, or Firm*—Jones Day

(57) ABSTRACT

Disclosed are a method and system for developing customized bound water transformations to obtain accurate determinations of non-producible water from nuclear magnetic resonance (NMR) logs. The approaches of this invention can be applied for in situ calibration where laboratory NMR measurements may not be possible or practical. In particular, a transformation model directly linking BVI and capillary pressure is developed by calibrating NMR derived BVI with the core data, the novel transformation model utilizes SBVI and/or CBVI models to directly relate NMR derived BVI and capillary pressure responses through the height of the measurement in a borehole. The derived height-based BVI transformation model is applied to the NMR log of the borehole to quantify non-producible water in the NMR log.

25 Claims, 48 Drawing Sheets

13-a: GROUP K, HAS AN AVERAGE $p_{2e}$ OF 2.9 μm/sec. AVERAGE POROSITY IS 8.5 AND AVERAGE THE ARITHMETIC $K_{air}$ AVERAGE IS 18.2 md.

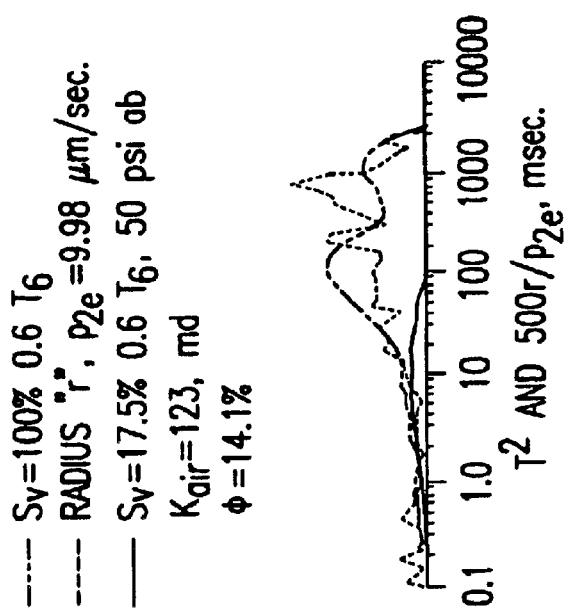
13-b: GROUP F, HAS AN AVERAGE $p_{2e}$ OF 7.4 $\mu m/sec$. AVERAGE POROSITY IS 9.5 AND AVERAGE THE ARITHMETIC $K_{air}$ AVERAGE IS 28.9 md.
FIG.13B
PRIOR ART

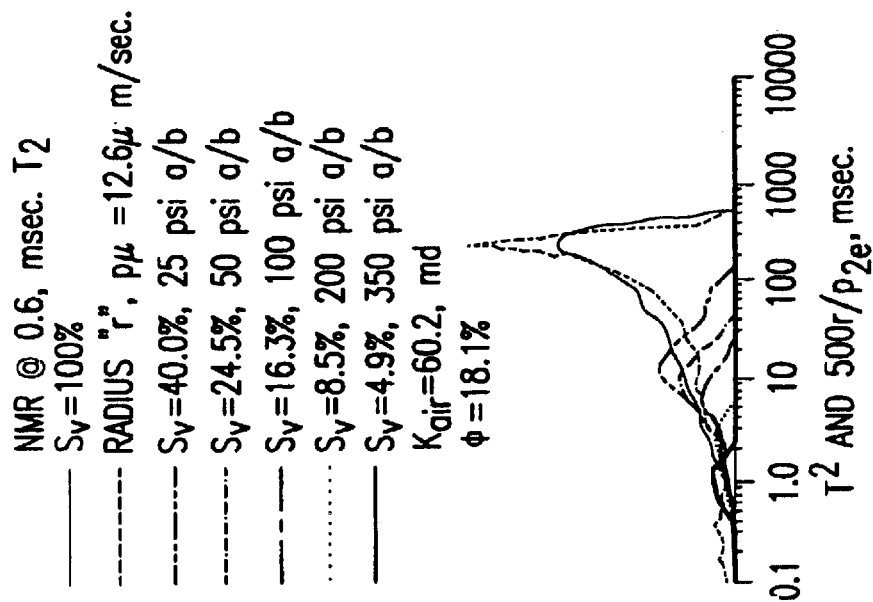
13-c: GROUP L HAS AN AVERAGE $p_{2e}$ OF 6.4 $\mu m$/sec. AVERAGE POROSITY IS 11.7 AND AVERAGE THE ARITHMETIC $K_{air}$ AVERAGE IS 3.4 md.
FIG. 13C
PRIOR ART 13-d: GROUP I, HAS AN AVERAGE $p_{2e}$ OF 31 μm/sec. AVERAGE POROSITY IS 18.4 AND AVERAGE THE ARITHMETIC $K_{air}$ AVERAGE IS 866 md.

METHOD FOR USING CONVENTIONAL CORE DATA TO CALIBRATE BOUND WATER VOLUMES DERIVED FROM TRUE VERTICAL DEPTH (TVD) INDEXING, IN A BOREHOLE, OF CAPILLARY PRESSURE AND NMR LOGS

This application claims priority of application Ser. No. 60/323,567, filed Sep. 19, 2001, which is incorporated by reference.

FIELD OF THE INVENTION

This application is directed to nuclear magnetic resonance (NMR) logging, in particular to a method and system for in-situ calibration and even more particularly to calibrated transformations, which can be applied to NMR logs to quantify non-producible water in hydrocarbon-bearing reservoirs.

BACKGROUND OF THE INVENTION

Due to the environmental and economic factors, the oil and gas industry typically conducts comprehensive evaluation of underground hydrocarbon formations to predict their producibility. Formation evaluation, also know as logging, determines potential performance of a hydrocarbon reservoir at the early stages of its development thus minimizing both the environmental impact and financial investment associated with further reservoir development. Known subsurface geological evaluation techniques include sonic logging, gamma ray logging, and electric logging. Recently, however, progress in nuclear spectroscopy and borehole imaging resulted in the development of a nuclear magnetic resonance ("NMR") well-logging technology, which ensures environmentally safe formation logging that is unaffected by variations in the matrix mineralogy.

The principle underlying the NMR logging is that an assembly of magnetic moments, such as those of hydrogen nuclei, when exposed to a static magnetic field, aligns along the direction of the magnetic field. Upon consequent application of an oscillating magnetic field, the direction of the magnetic moments is tipped into the transverse plane. Upon cessation of the oscillating magnetic field, the magnetic moments precess to their original alignment thus generating a magnetic echo. The alignment time of the magnetic moments in the static magnetic field, also known as longitudinal or spin-lattice relaxation time, is characterized by a time constant $T_1$. The alignment time due to the loss of coherence of the magnetic moments in the oscillating magnetic field, also known as transverse or spin-spin relaxation time, is represented by a time constant $T_2$. These relaxation parameters are generally used to estimate, inter alia, saturation, porosity, permeability, as well as the type and amount of fluids that will be produced from a well. NMR measurements of these and other parameters of the geologic formation can be done using, for example, the centralized MRIL™ tool made by NUMAR, a Halliburton company. The MRIL™ tool is described, for example, in U.S. Pat. No. 4,710,713 to Taicher et al. and in various other publications such G. R. Coates, L. Xiao, and M. G. Prammer, "NMR Logging Principles and Applications", 2000, Butterworth-Heinemann. Details of the structure and the use of the MRIL™ tool, as well as the interpretation of various measurement parameters are also discussed in U.S. Pat. Nos. 4,717,876; 4,717,877; 4,717,878; 5,212,447; 5,280,243; 5,309,098; 5,412,320; 5,517,115, 5,557,200 and 5,696,448, all of which are commonly owned by the assignee of the present invention. The content of the above patents and publications is hereby expressly incorporated by reference.

One of the earliest and still the most widely used applications of NMR logging is estimating the bulk volume of irreducible water (BVI) of reservoir formations. It allows the user to partition porosity into static and dynamic quantities, those fluids that will be held to the rock and fluids that will be produced. BVI also provides information needed to compute permeability using a popular equation developed by Coates and Denno in "The Producibility Answer Product." Current NMR methods used to determine BVI, such as cutoff-BVI and spectral-BVI, however, do not adequately incorporate capillary pressure, which is an essential feature of geological formation. An NMR bases method for determining BVI as a function of reservoir's capillary pressure would expand the scope of uses of NMR data, such as predicting free water levels, water block due to aqueous phase drilling and/or completion fluid retention, capillary pressure curves, more accurate determination of movable fluid and accurate determinations of hydrocarbon pore volume.

The cutoff BVI model (CBVI) is based on the observation made by Timur in "Pulsed nuclear magnetic resonance studies of porosity, movable fluid and permeability of sandstones," that short relaxation times represent capillary bound fluids (BVI) and longer relaxation times represented free fluid index (FFI). Using a three component model and a "critical spin-lattice relaxation time" of 12 milliseconds, he achieved a good match to core derived irreducible saturation values using an air/brine displacement pressure of 50 psi. In 1990 Miller et al. in "Spin Echo Magnetic Resonance Logging: Porosity and Free Fluid Index Determination", introduced a logging system that employed static and radio frequency magnetic fields capable of measuring spin-echo magnetic resonance to determine porosity. BVI was determined by fitting the spin-spin echo data using a bi-exponential equation constrained to a time gate of 21 milliseconds. Following the work of Timur the time gate method recognized that early echoes decayed rapidly due to high surface area pores that hold water to the rock's surface. The particular time selected was based on a best match to core derived irreducible saturations. However, the capillary pressure used to achieve this condition was not specified.

Recognizing that valuable information could be obtained with regard to pore size distribution and fluid types exponential fitting methods evolved into multi-exponential inversion. As a result, a relaxation time cutoff parameter of 25 to 46 milliseconds was implemented to obtain BVI. Following Timur, the cutoff value was selected based on comparisons to core measurements. Straley et al. in "NMR in Partially Saturated Rocks: Laboratory Insights on Free Fluid Index and Comparison With Borehole Logs" selected a $T_1$ cutoff of 46 millisecond for samples that had been centrifuged using an air/brine pressure of 100 psi. Dunn et al. in "On the Calculation and Interpretation of NMR Relaxation Time Distributions" concluded that a $T_1$ cutoff of 33 milliseconds compared best to samples de-saturated to an air/brine pressure of 400 psi. Morriss et al. in "Field Test of an Experimental Pulsed Nuclear Magnetism Tool" found that a 27-millisecond $T_2$ cutoff best approximated BVI when compared to core measured saturations centrifuged using an air/brine pressure of 50 psi. Prammer in "NMR Pore Size Distributions and Permeability at the Well Site" selected a 25 to 30 millisecond cutoff based on a best match between core measured brine permeability and computed NMR permeability using the free fluid model.

Subsequent studies report the relaxation time cutoff varied depending on lithology and mineral content. A notable comparison is the study of two carbonate formations one in west Texas described by Chang et al. in "Effective Porosity, Producible Fluid and Permeability in Carbonates from NMR Logging" and the other a Middle East carbonate described by Kenyon et al. in "A Laboratory Study of of Nuclear Magnetic Resonance Relaxation and its Relation to Depositional Texture and petrophycical Properties—Carbonate Thamama Group, Mubarraz Field, Abu Dhabi." Chang et al. studied dolomitic carbonates and found that a 92-millisecond $T_2$ cutoff best fit samples centrifuged using an air/brine pressure of 100 psi. In contrast to this, Kenyon et al. found carbonate samples from the Mubarraz Field yielded a relaxation time cutoff of 190 milliseconds when de-saturated using an air/brine capillary pressure of 25 psi.

Coates et al. in the paper entitled: "A New Characterization of Bulk-Volume Irreducible Using Magnetic Resonance," however, identified that CBVI model has several limitations. In particular, the model is susceptible to textural and lithological variations, because it relies on the assumption that smaller pores remain at 100% saturation and the cutoff value represents a threshold size of pore that limits drainage. As a result, Coates et al. developed a spectral BVI (SBVI) model that emulates films of water left in pores after drainage. SBVI minimizes two shortcomings of the cutoff $T_2$ model. First, it is not as susceptible to variations in textural and lithologic variation. Second, it overcomes the problems associated with certain lithofacies when flushed with water-base mud filtrate. For example, when quartz rich sandstones are flushed with water base muds, the hydrogen protons in the water phase are less restricted by the water/hydrocarbon interface and are weakly coupled to the smooth surface of the quartz grains. This causes longer than expected relaxation times. In such cases, a BVI determined using a CBVI model is often underestimated.

The SBVI model is based on the premise that each pore size has its own inherent irreducible water saturation. Given that relaxation time is related to pore size, this method utilizes core NMR measurements to relate each relaxation time to a specific fraction of capillary bound water. Thus, the bulk volume irreducible becomes a direct output of the inversion of the echo data, and it utilizes the entire $T_2$ distribution. A notable feature of the SBVI model is that the boundary between bound and free fluid components as a smoothly decreasing function of pore size and, hence, T2. This subdivision of the T2 spectrum follows naturally from the assumption that pores are water-wet and contain a layer of irreducible water on their surfaces. Thus, pores of all sizes contribute to the total volume of irreducible water, not just the smallest pores in the rock.

Another essential feature of the SBVI model is the specification of the set of weight factors that defines the FFI-BVI boundary. In his paper, Coate et al. investigates two approaches in deriving equations for weight factors applicable to an arbitrary set of basis $T_2$ times. One approach, which is considered to be more closely aligned with traditional capillary pressure theory then the above-described CBVI method, is to model the rock pore system as a bundle of water-wet capillary tubes and to derive an explicit expression for the pore-level saturation as a function of capillary pressure and various parameter. This model is expressed in the following equation:

$$S_{WIRR}(T_2) = \frac{T_{2IRR}}{T_2}\left(2 - \frac{T_{2IRR}}{T_2}\right) \quad \text{(Eq. 1)}$$

where $$T_{2IRR} = \frac{\sigma}{\rho_2 P_{CIRR}},$$

$S_{WIRR}$ is an irreducible water saturation, $\sigma$ is the interfacial tension between water and the non-wetting fluid, and $\rho_2$ is the surface relaxivity. A more detailed discussion of the SBVI model is presented in Appendix A.

The above-described BVI models require numerous core-specific parameters which are typically obtained by calibration against core data. To this end, laboratory NMR measurements performed on samples of core material are often used to obtain such parameters so that calibrated capillary-bound water (BVI) determinations can be made from NMR logs. These samples are usually selectively drilled and removed from a much larger core retrieved from the formations of interest. The extracted samples are cleaned and saturated with brine prior to making an initial laboratory NMR measurement. Then, each sample is de-saturated to a pre-determined capillary pressure condition and re-measured with a laboratory NMR spectrometer. In some instances, the samples may be de-saturated to more than one capillary pressure condition followed by a lab spectrometer measurement. Data from these experiments is then used to derive a calibrated transformation that can be applied to the saturated measurements (and NMR logs in the same formations) to derive the irreducible, or capillary-bound, water volume in the same, or similar, formations.

The success of this approach depends on several factors, such as formation homogeneity, the number of samples measured, the choices of de-saturation conditions, and the presence of secondary porosity features, such as fractures and vugs. Because of the above and other factors, laboratory NMR data obtained from core samples can involve errors. Such errors may adversely affect the derivation of calibrated BVI transformations intended for logging applications, especially when the core material does not represent the reservoir's heterogeneity. Those of skill in the art will appreciate that heterogeneous formations are often encountered in practice, thus limiting the utility of the prior art calibration approach.

In addition, a single de-saturation condition chosen in the prior art for the laboratory NMR measurements may not reflect the multiple capillary conditions under which the logging data may be acquired, thereby introducing a systematic error in log-derived BVI values. Finally, it will be appreciated that the customary method outlined above may not work at all when samples of core material are simply not available for laboratory NMR measurements.

Accordingly, there is a need for a new approach using customized calibrated BVI transformations to obtain accurate BVI determinations from NMR logs in hydrocarbon-bearing reservoirs, so that accurate results can be obtained in situations where customary laboratory NMR measurements may not be possible or practical. The novel approach of this invention can be employed as an alternative to the prior art approach outlined above when samples of core material may not be available to perform laboratory NMR measurements, and could potentially produce superior results in heterogeneous formations. Additionally, the disclosed invention permits several new or improved applications of NMR data. These include, but are not limited to, improved determinations of hydrocarbon pore volume, more accurate predictions of movable water, prediction and mapping of the reservoir's free water level(s), pore size, capillary pressure curves and the prediction of fracture fluid retention that may cause severe permeability reductions.

The interested reader is directed to the disclosure of the following references for useful background information:

Borgia, G. C., 1994, "A New Un-Free Fluid Index in Sandstones Through NMR Studies", SPE 69th Annual Technical Conference and Exhibition, Sep. 25–28, SPE 28366.

Brownstein, K. R. and Tarr, C. E., 1979, "Importance of Classical Diffusion in NMR Studies of Water In Biological Cells", Phys. Rev. A, 19, pp 2446–2453.

Chang, D, Vinegar, H., Morriss, C., and Straley, C., 1994, "Effective Porosity, Producible Fluid and Permeability in Carbonates from NMR Logging", SPWLA 35th Annual Logging Symposium, June, paper A. Coates, G. R. and Denoo, S., 1981, "The Producibility Answer Product", Schlumberger Technical Review, 29 (2), pp. 55.

Coates, G. R., and Denno, S., 1981, "The Producibility Answer Product", Schlumberger Technical Review, 29 (2), pp.55.

Coates, G. R., Marschall, D., Mardon, D., and Galford, J.: "A New Characterization of Bulk-Volume Irreducible Using Magnetic Resonance," paper QQ presented at the SPWLA 38th Annual Logging Symposium, Houston, Tex., Jun. 15–18, 1997.

Coates, G. R., Miller, M., Gillen, M., and Henderson, G., 1991, "An Investigation of a New Magnetic Resonance Imaging Log", SPWLA 32nd Annual Logging Symposium, June, paper DD.

Coates, G. R., Miller, D. L., Mardon, D., and Gardner, J. S., 1995, "Applying Log Measurements of Restricted Diffusion and T2 to Formation Evaluation", SPWLA $36^{th}$ Annual Logging Symposium, Jun. 26–29, paper P.

Dunn K J. LaTorraca, G. A., Warner, J. L., Bergman, D. J., "On the Calculation and Interpretation of NMR Relaxation Time Distributions", 1994, SPE 69th Annual Technical Conference and Exhibition, Sep., 25–28, SPE 28367

Dodge W M. S. Sr., Shafer, J. L., and Guzman-Garcia, A. G., "Core and Log NMR Measurements of an Iron-rich, Glauconitic Sandstone Reservoir", 1995, SPWLA 36th Annual Logging Symposiums, Jun. 26–29, Paper O.

Hassler, G. L., and Brunner, E., 1945, "Measurements of Capillary Pressure in Small Core Samples", Trans. AIME, 160, 114–123.

Kenyon, W. E., Takezaki, H., Straley, C., Sen, P. N., Herron, M., Matteson, A., Petricola, M. J., 1995, "A Laboratory Study of of Nuclear Magnetic Resonance Relaxation and its Relation to Depositional Texture and petrophycical Properties-Carbonate Thamama Group, Mubarraz Field, Abu Dhabi", SPE Middle East Oil Show, Bahrain, March 11–14, SPE 29886.

Kleinberg, R. L., Straley, C., Kenyon, W. E., Akkurt, R., and Farooqui, S. A., 1993, "Nuclear Magnetic Resonance of Rocks: T1 vs. T2", SPE 68th Annual Technical Conference and Exhibition, October 3–6, SPE 26470.

Kleinberg, R. L., 1994, "Pore Size Distributions, Pore Coupling, and Transverse Relaxation Spectra of Porous Rocks", Magnetic Resonance Imaging, 12 (2), pp. 271–274.

Latour, L. L., Kleinberg, R. L., and Sezginer, A., 1992, "Nuclear Magnetic Resonance Properties of Rocks at Elevated Temperatures", J. Colloid Interface, Sci., 150, pp.535–548.

Marschall, D. M.: "HBVI—An NMR Method to Determine BVI as a Function of Reservoir Capillarity," paper KK presented at the SPWLA $41^{st}$ Annual Logging Symposium, Dallas, Tex. Jun. 4–7, 2000.

Marschall, D., Gardner, J. S., Mardon, D, and Coates, G. R., 1995, "Method for Correlating NMR Relaxometry and Mercury Injection Data", Society of Core Analysts Conference, San Francisco, paper 9511.

Miller M. N., Palteil, Z., Gillen, M. E., Granot, J., and Bouton, J. C., "Spin Echo Magnetic Resonance Logging: Porosity and Free Fluid Index Determination", 1990, SPE 65th Annual Technical Conference and Exhibition, Sep. 23–26, SPE 20561.

Morriss, C. E., MacInnis, R., Freedman, R, Smaardyk, J., 1993, "Field Test of an Experimental Pulsed Nuclear Magnetism Tool", SPWLA 34th Annual Logging Symposium, Jun. 13–16, paper GGG.

O'Meara, D. J., Hirasaki, G. J., and Rohan, J. A., 1992, "Centrifuge Measurements of Capillary Pressure, Part 1-Outflow Boundary Condition", SPE Reservoir Engineering, p.133–142.

Prammer, M. G., 1994, "NMR Pore Size Distributions and Permeability at the Well Site", SPE 69th Annual Technical Conference and Exhibition, Sep. 25–28, SPE 28368.

Straley, C., Morriss, C. E., Kenyon, W. E., and Howard, J. J., 1991, "NMR in Partially Saturated Rocks: Laboratory Insights on Free Fluid Index and Comparison With Borehole Logs", SPWLA $32^{nd}$ Annual Logging Symposium, June, paper CC.

Straley, C., Rossini, D., Vinegar, H., Tutunjian, P., Morriss, C., 1994, "Core Analysis By Low Field NMR", Society of Core Analysts Conference, Stavanger, paper 9406.

Timur, A., 1967, "Pulsed nuclear magnetic resonance studies of porosity, movable fluid and permeability of sandstones," SPE 2045, 42nd Annual Meeting preprint, SPE. Later published in 1969 in Journal of Petroleum Technology, v. 21, no. 6, p. 775–786.

The NMR Sandstone Rock Catalogue, Applied Reservoir Technology, Ltd./Sintef Unimed, 1996.

The East Texas Sandstone Catalogue, NUMAR, MR Laboratory, 1996.

SUMMARY OF THE INVENTION

Accordingly, it is an object of the present invention to provide a data logging method and system that overcome problems associated with the prior art solutions, and help meet the market demands for increased input capacity, high distribution flexibility and fault tolerance. The novel approach used in accordance with the present invention combines in situ NMR logging measurements from one or more well bores with measurements obtained from routine and special core analysis methods applied to rock samples recovered by drilling/coring or wireline rotary sidewall coring operations. Conceptually, the approach proposed in this application involves several major phases. Initially, an empirical relationship between BVI and capillary pressure responses is established. Then, a calibration of NMR derived BVI based on conventional core data is performed to derive transformation model linking BVI and capillary pressure responses. Finally, the derived transformation model is applied to the NMR measurements to to quantify non-producible water in the NMR log.

Since present invention is based on the premise that there exists a relationship between BVI and capillary pressure, in accordance with a preferred embodiment, known BVI models were empirically analyzed to confirm such proposition. In particular, the dependance between BVI and capillary pressure is confirmed with core measurements. To this end, core samples from the Baker Hughes test well in Oklahoma were selected for study. Initially, various centrifuge and mercury injection capillary pressure tests, as well as low-field NMR measurements where conducted on the core samples. Then, several integration steps were performed on the core data derived from the above-described experiments.

Finally, BVI dependancy on capillary pressure was established; particularly, it has been observed that both CVBI and SBVI models exhibit apparent logarithmic dependance on capillary pressure.

Once an empirical dependence between BVI and capillary pressure established, a transformation model directly linking BVI and capillary pressure is developed by calibrating NMR derived BVI with the core data. In particular, the novel transformation model utilizes SBVI and/or CBVI models to directly relate NMR derived BVI and capillary pressure responses through the height of the measurement in a borehole, hence it is named HBVI. In accordance with the transformation model, capillary pressure responses are related to height through the following equation: $P_c = H(\delta_w - \delta_h)$, where Pc represents capillary pressure, $\delta_w$ is the pressure gradient for the water in the formation, $\delta_h$ is the pressure gradient of the hydrocarbon, and H is the height, or distance the measurement is above the free water level. To facilitate the transformation, in accordance with a preferred embodiment, the NMR relaxation spectra are indexed by true vertical depth (TVD). Similarly, data from routine and special core analyses, such as the capillary pressure curves, are indexed by TVD.

In accordance with a preferred embodiment, once the transformation model is derived, it can be applied to the NMR measurements to quantify non-producible water in the NMR log. In particular, the HBVI transformation model enables capillary pressure responses from core analysis to define volume of hydrocarbons (and water) for points above the free water level at in situ conditions.

To this end the, in one aspect, the invention is a method for NMR borehole logging comprising the steps of: providing a core analysis of a borehole, the analysis comprising capillary pressure responses being indexed by a true vertical depth (TVD) in the borehole; providing a NMR log of a borehole, the NMR log being indexed by TVD; deriving a bound volume irreducible (BVI) transformation model calibrated on the basis of the provided core analysis; and applying the derived BVI transformation model to the NMR log of the borehole to quantify non-producible water in the NMR log.

In one aspect, the invention includes a method for deriving formation-specific HBVI functions when core material is available. In another aspect, to handle those situations when core material is not available, an alternative method, so called Global Solution, is disclosed to predict HBVI function for sandstone reservoirs. This method recognizes that NMR is highly sensitive to the surface area of the pore system. Sandstones that are more quartz rich have a higher probability of exhibiting low pore surface areas causing them to exhibit weaker surface relaxation. The analyst simply needs to estimate quartz richness, via log analysis techniques, or by direct laboratory measurement and assign an HBVI function to be used. When reliable mineral data is available regarding clay content and minerals known to exhibit fast relaxation times, an improved estimation method is also presented. These simple techniques allow the analyst to determine BVI from NMR logs for a specific capillary pressure or multiple capillary conditions. Additional aspects of the invention are disclosed in greater detail in the following description and the attached claims.

BRIEF DESCRIPTION OF THE DRAWINGS

The present invention will be understood and appreciated more fully from the following detailed description, taken in conjunction with the drawings in which:

Prior Art

Prior Art

Prior Art

Prior Art

Prior Art

Prior Art

Prior Art

Prior Art

Prior Art

Prior Art

Prior Art

Prior Art

Prior Art

Prior Art

Prior Art

Prior Art

Prior Art

FIG. 18A illustrates $T_2$ distributions at different true vertical depth (TVD); FIG. 18B illustrates sample capillary pressure curves, along with the $T_2$ distributions in FIG. 18A; FIGS. 18C and 1D illustrate the definition of the hydrocarbon and water levels from the capillary pressure response curves; and FIG. 18E illustrate fractional contribution from each decay component to the overall BVI for each data point shown in FIG. 18A.

DETAILED DESCRIPTION OF THE INVENTION

Figure 1:
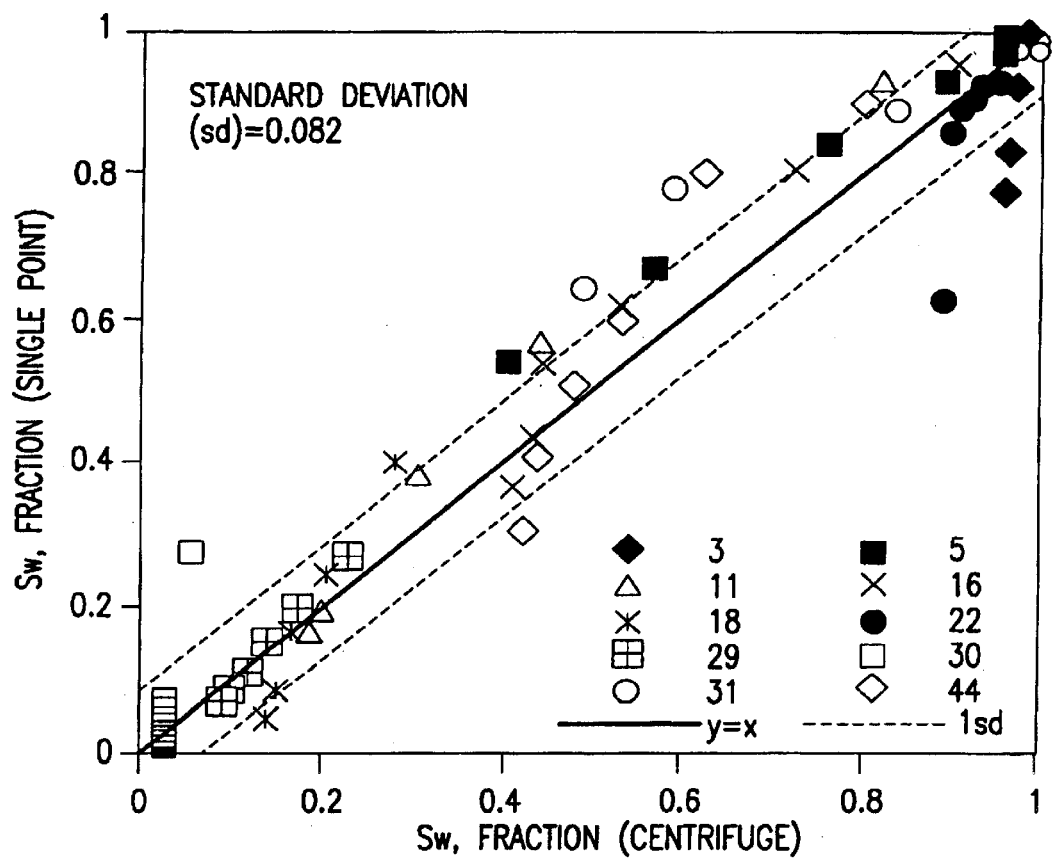
FIG. 1 is a comparison of the capillary pressure saturations from full-curve centrifuge test to single point centrifuge saturations. NMR measurements were performed on samples at partial saturation conditions that were measuring using the single point centrifuge method.

The novel approach used in accordance with the present invention combines in situ NMR logging measurements from one or more well bores with measurements obtained from routine and special core analysis methods applied to rock samples recovered by drilling/coring or wireline rotary sidewall coring operations. Conceptually, the approach proposed in this application involves several major phases. The first phase is to establish an apparent relationships between CBVI and capillary pressure and SBVI and capillary pressure. The second phase is calibration of BVI derived from NMR logs based on conventional core data. The third phase is directed to applying the calibration to derive BVI from NMR logging measurements.

Establishing the Dependance of BVI and Capillary Pressure

Present invention is based on the proposition that there exist a relationship between BVI and capillary pressure. The inventors recognized there is a relationship between surface relation mechanism $1/T_1=\rho_1 S/V$ (Eq. 2) and the Young-Laplace equation for capillary pressure $P_C=2\sigma \cos \theta/r$ (Eq. 3). Modeling the rock as a bundle of capillary tubes, equation 2 and 3 can be related. The ratio of $2/r$ in equation 3 represents the surface to volume (S/V) of a capillary tube, so that by substitution $1/T_1=\rho_1 2/r$ (Eq. 4) represents the direct relationship between pore size (radius in microns, r) and relaxation time for a given spin-lattice relaxivity ($\rho_1$). Equations 2–4 clearly show that capillary pressure ($P_c$) is tied directly to relaxation time for spin-lattice and/or spin-spin. Rewriting equations 2–4 for spin-spin relaxation times to show the dependence of $T_2$ on $P_c$, yields $1/T_{2t}=\rho_2 P_c/\sigma \cos \theta$ (Eq. 5). Since a rock's rock pore structure is more complex that a tube model equations 4 and 5 should be considered approximations. Even so, equation 5 describes a $P_c$ that evokes a partial saturation at some threshold relaxation time ($T_{2t}$), which is the conceptual basis for a cutoff $T_2$. It is clear that the relaxation time cutoff used to determine BVI represents a specific capillary pressure. In fact, equation 5 implies that $T_{2t}$ will be inversely correlated to $P_c$.

Confirming the Dependance of BVI and Capillary Pressure with Core Measurements

Straley et al. in "NMR in Partially Saturated Rocks: Laboratory Insights on Free Fluid Index and Comparison With Borehole Logs" showed that as centrifuge speeds increased a resulting decrease in the partial saturation yielded an apparent shift in $T_{1t}$ which appeared to be dependent on the centrifuge speed used. To confirm this for spin-spin relaxation, 10 samples from the Baker Hughes test well in Oklahoma were selected for study. Each 1-inch diameter plug sample drilled horizontally from a conventional diamond core was trimmed to a length of 1 inch. The trim samples were used to measure mercury injection, thin section, X-ray Diffraction (XRD), and Scanning Electron Microscopy (SEM). The plug samples were cleaned using cool solvent extraction for hydrocarbons and salts and dried at 220° F. Each sample was analyzed for routine properties, Kair, helium gas expansion porosity, re-saturation porosity and grain density. They were vacuum pressure saturated with 2% KCl brine to achieve 100% saturation.

Then, the following series of tests was performed on samples: (1) Centrifuge capillary pressure tests were performed on each sample using standard laboratory practices and the average saturations measured were converted to inlet face saturations using a modified Hassler and Brunner technique described in "Measurements of Capillary Pressure in Small Core Samples" and known as the parameter estimation method described by O'Meara et al. in "Centrifuge Measurements of Capillary Pressure, Part 1-Outflow Boundary Condition." After centrifugation, each sample was saturated to a Sw=100% condition using vacuum pressure saturation. (2) Low field magnetic resonance spin-spin relaxation measurements were made using a 1 MHZ Core-Spec™ spectrometer with no gradient field, at inter-echo times of 0.3, 0.6 and 1.2 msec., for the conditions of Sw=100% and each partial saturation. (3) Single-point partial saturations were achieved using a centrifuge technique at air/brine pressures of 25, 50, 100, 200 and 350 psi. The end effects were minimized using a porous disc at the downstream end of the sample. FIG. 1 compares the single point core saturations to the inlet face saturations from centrifuge for each sample and pressure. There is good agreement as 80% fall within 10 saturation units (s.u.) with a standard deviation of 8.2 s.u. (4) Each sample was stored in heat sealed Saran wrap in an airtight vial placed in a humidity vesicle. Weights during storage, before and after NMR runs show no weight loss. These techniques are common to the samples selected from the database for study.

Figure 2:
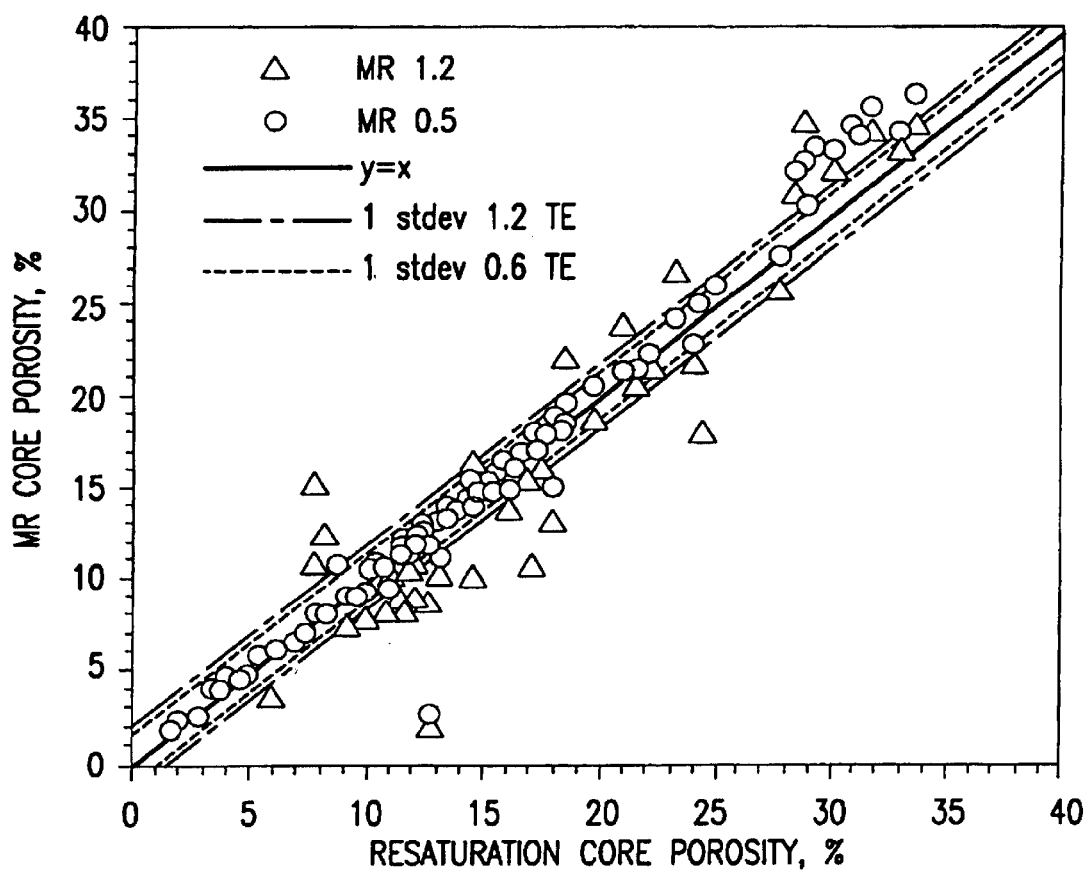
FIG. 2 is a comparison of core porosity and NMR porosity.
Figure 3A:
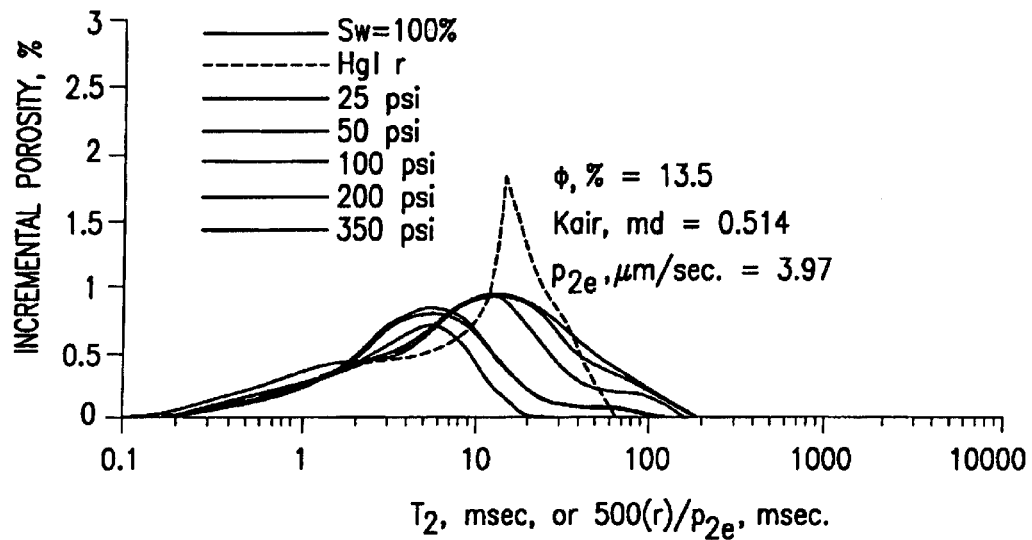
FIG. 3 illustrates relaxation time spectrums for the Baker Hughes test well samples.
Figure 3B:
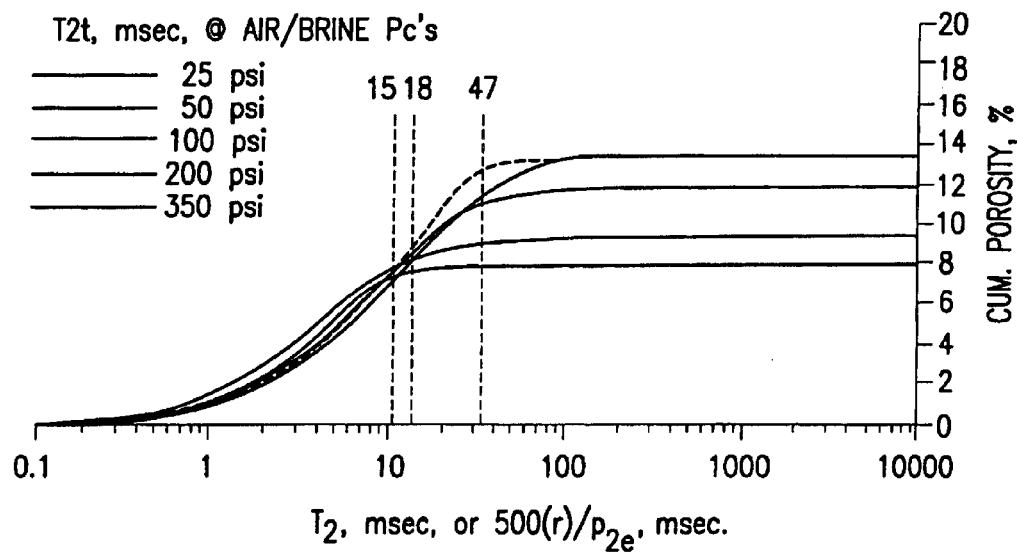
Figure 3C:
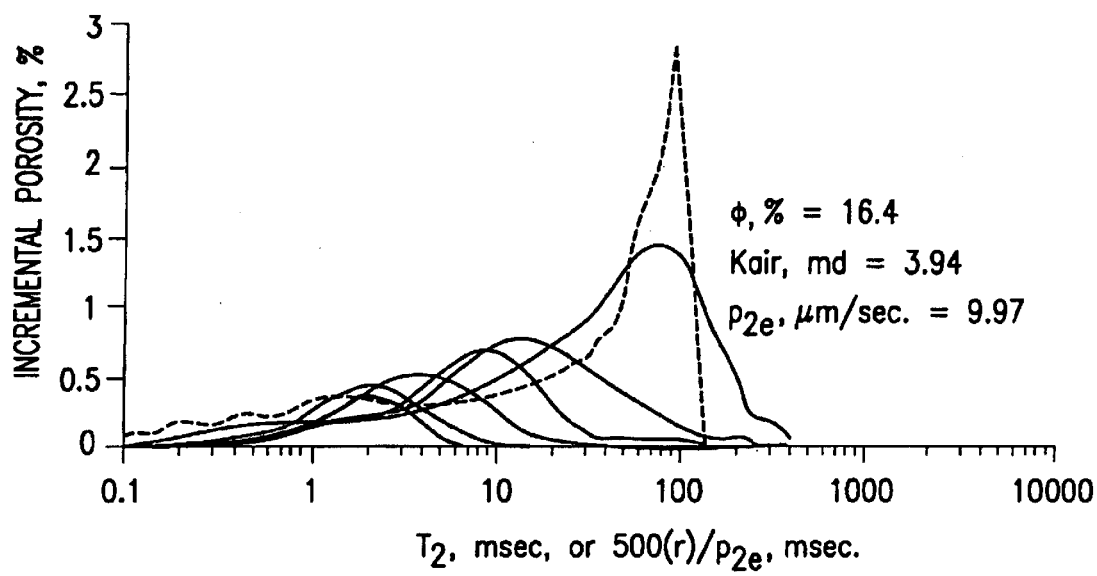
Figure 3D:
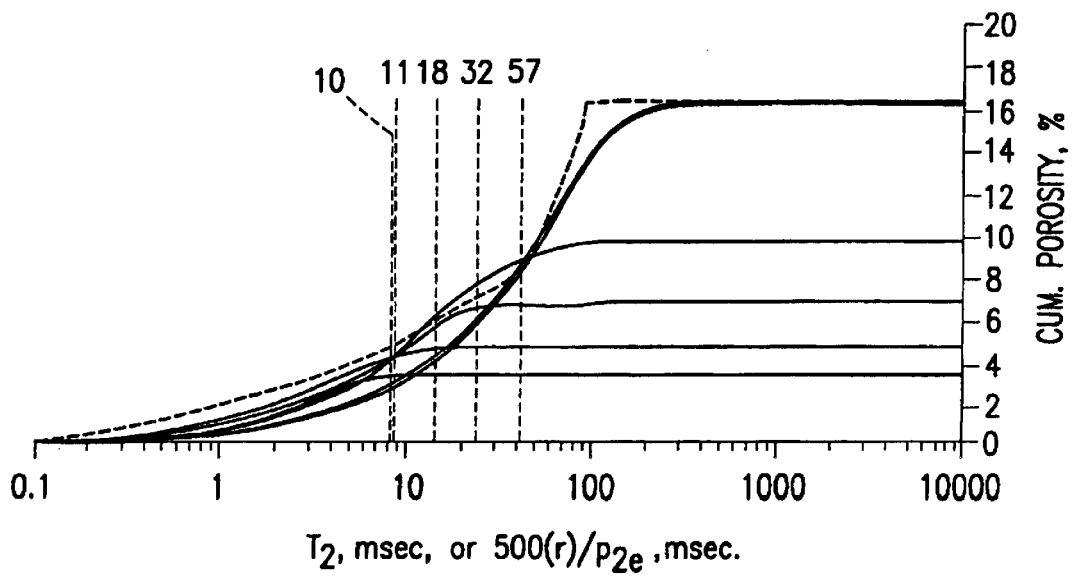
Figure 3E:
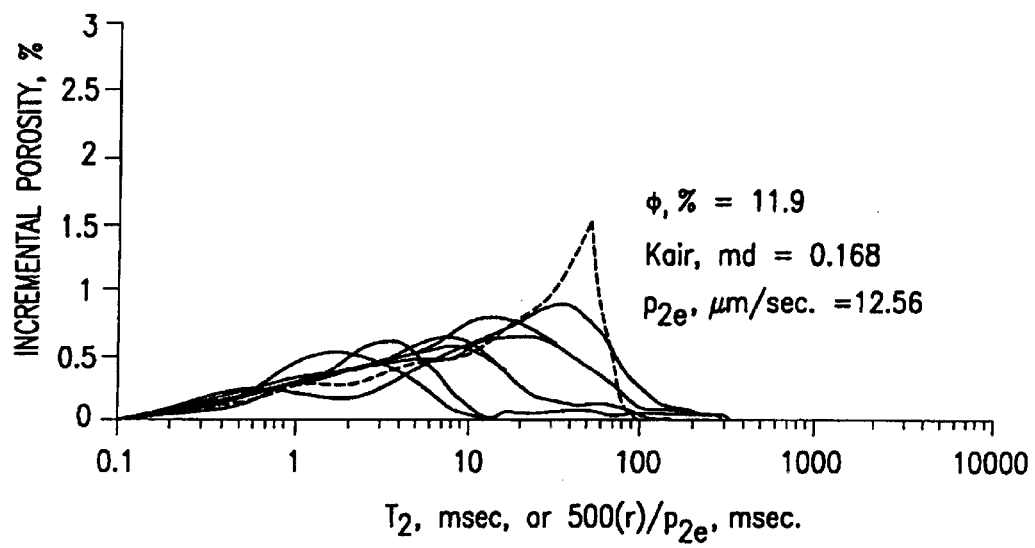
Figure 3F:
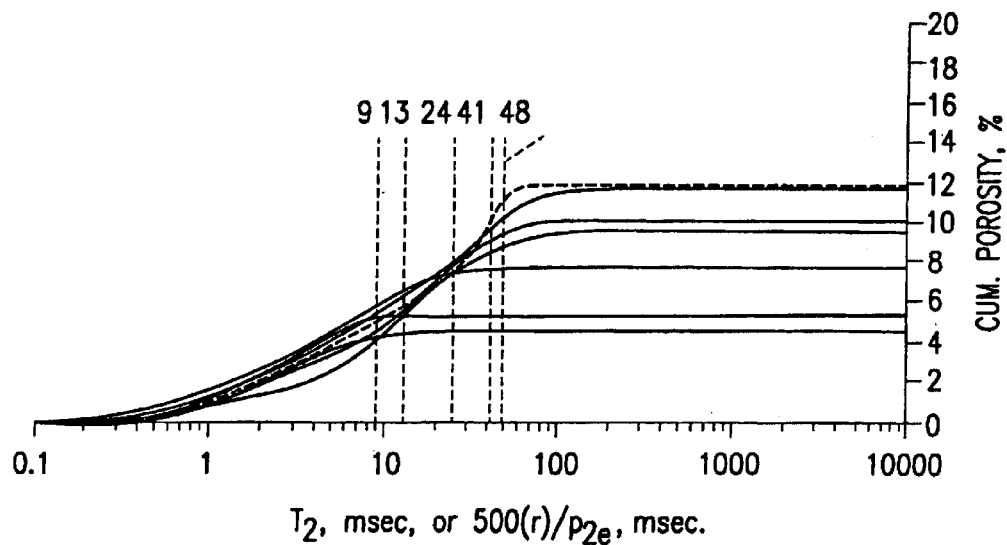
Figure 3G:
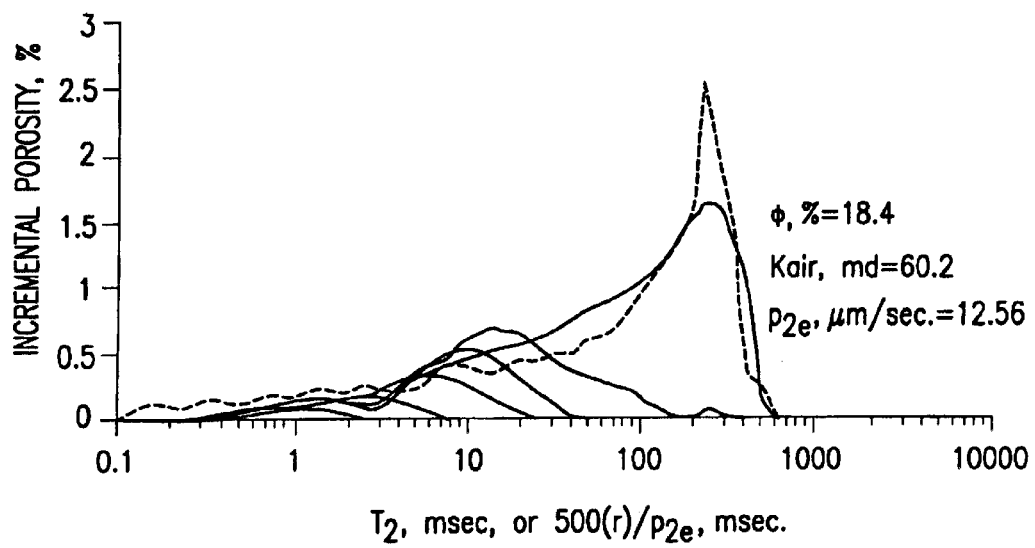
Figure 3H:
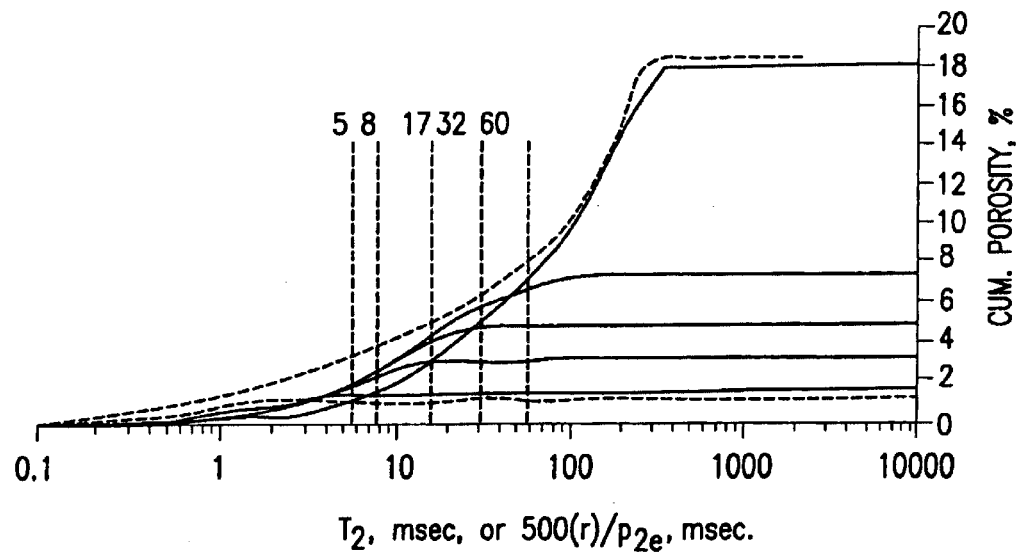
Figure 3I:
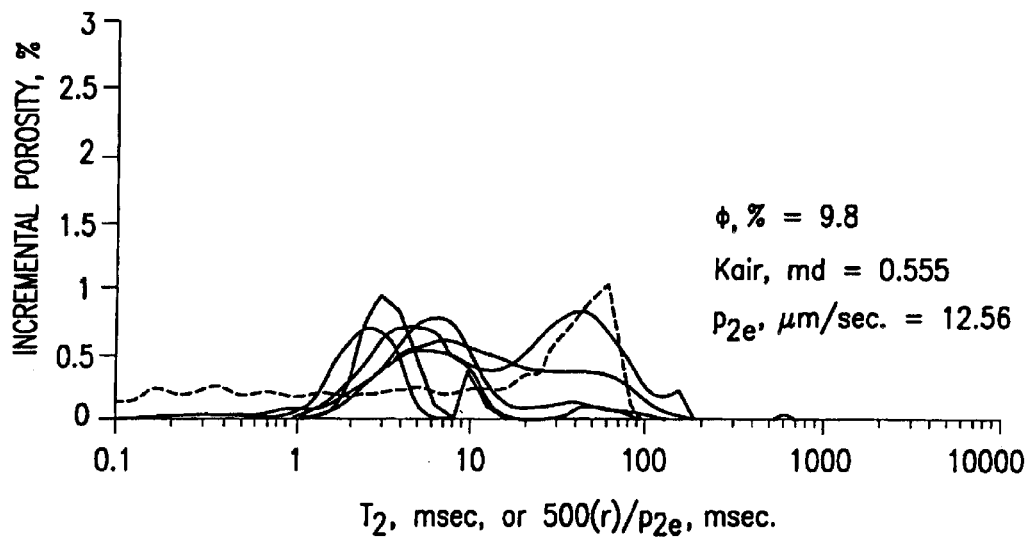
Figure 3J:
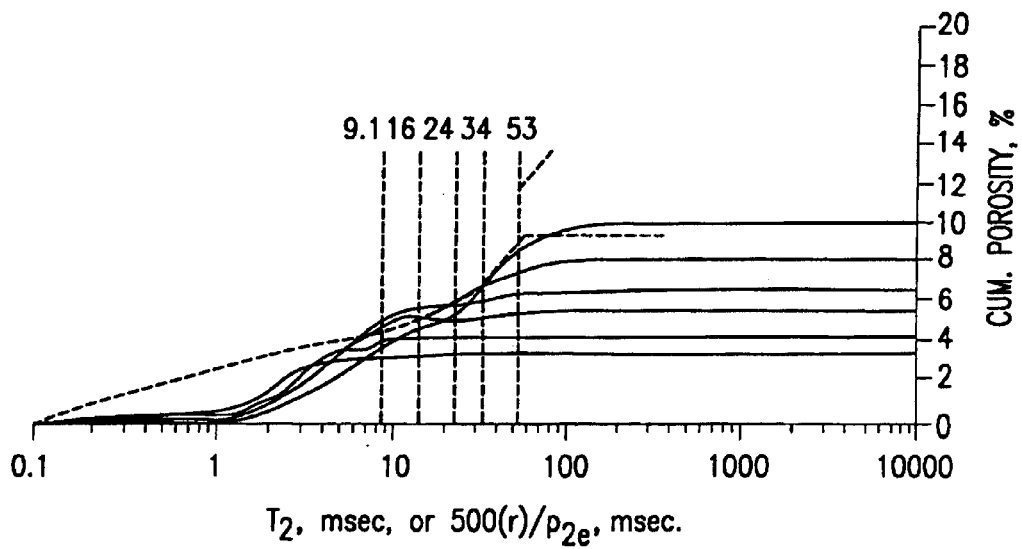

Next, several integration steps on the above-derived data are performed. First, core porosity was compared to lab NMR porosity. FIG. 2 shows a very good agreement with the standard deviation for the 1.2 ms. $T_E$ being 1.7 porosity percent and the 0.6 msec. $T_E$ to be 1.2%. Second, mercury injection pore throat size distribution was compared to NMR pore size distributions using a cross correlation function described by Marschall et al. in "Method for Correlating NMR Relaxometry and Mercury Injection Data." The desired outcome of the cross correlation function matching the two spectrums is the effective relaxivity ($\rho_{2e}$) As stated by Marschall et al., this value is proportional to the product of intrinsic relaxivity and a pore throat-to-body size ratio. It was used to help understand observed shifts in the relaxation time cutoffs and SBVI exponents.

Core porosity measured using a re-saturation method agrees very well with NMR porosity values for all three inter-echo times, 0.3, 0.6 and 1.2 ms., with standard deviations of 0.132, 0.133 and 0.195 porosity percent respectively. Partial core saturations measured by weight difference were compared to NMR saturations at the same condition with good agreement with a standard deviation of 5 saturation units.

CBVI's Dependence on Capillary Pressure

The $T_2$ spectrums displayed in FIG. 3 shows that for each $P_C$ imposed, a consistent decrease in $T_2$ spectrum long time components and to a lesser extent an increase in short time components was observed. All 10 samples show this dependence but for display purposes only five are shown. Relaxation time cutoff ($T_{2t}$) values are displayed with each spectrum as horizontal lines. In each case $T_{2t}$ decreases with each increase in pressure. In addition they appear to be roughly logarithmically distributed. These results mimic the results shown by Straley et al. for $T_1$ spectrums.

Figure 4:
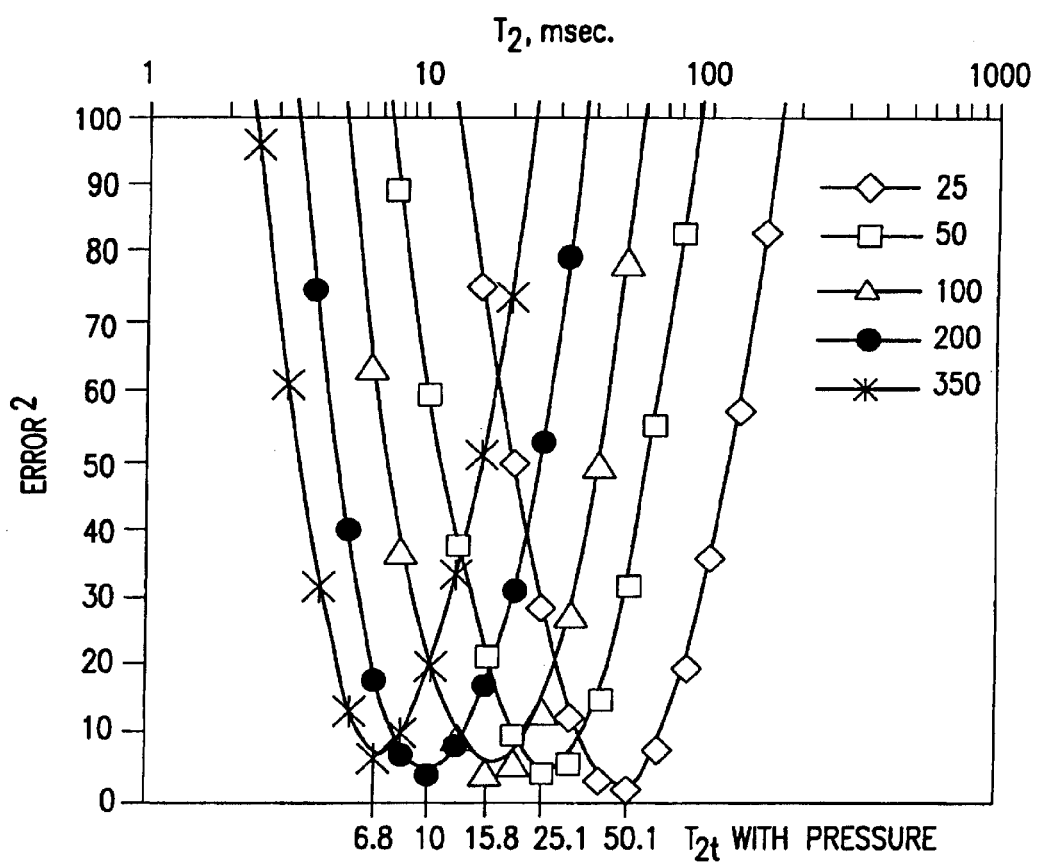
FIG. 4 illustrates error minimization to optimize $T_{2t}$ for each single-point air/brine displacement pressure.

In order to confirm the logarithmic nature shown for individual samples, an error minimization technique was performed on the ten samples to find an optimum $T_{2t}$ for the group at each $P_c$. Results of this analysis are shown in FIG. 4. It confirms the dependence of $T_{2t}$ on the capillary condition and further demonstrates the dependence is logarithmic.

SBVI's Dependence on Capillary Pressure

As described above, Coates et al. in "A New Characterization of Bulk-Volume Irreducible Using Magnetic Resonance" demonstrated that the SBVI method could provide reliable BVI values even in cases where the CBVI method failed. The authors also showed that the SBVI function when tested using a capillary pressure model was sensitive to the $P_c$ condition set. The empirical model proposed also demonstrated a formation specific dependence, however its dependence on capillary pressure was only implied.

Using the same methods as Coates et al., in accordance with a specific embodiment of the invention, the SBVI functions were developed for each capillary condition. It was determined that the original model $1/S_{WIRR}=mT_2+1$ (Eq. 6) showed greater error when predicting saturations when $P_c$ was low. Therefore, in accordance with a specific embodiment of the invention, another model expressed by $1/S_{WIRR}=mT_2$ (Eq. 7) is proposed. The model sets the intercept to zero as opposed to the value of one consistently provided better $S_{WIRR}$ predictions when compared to core values for all $P_c$ conditions.

Figure 5:
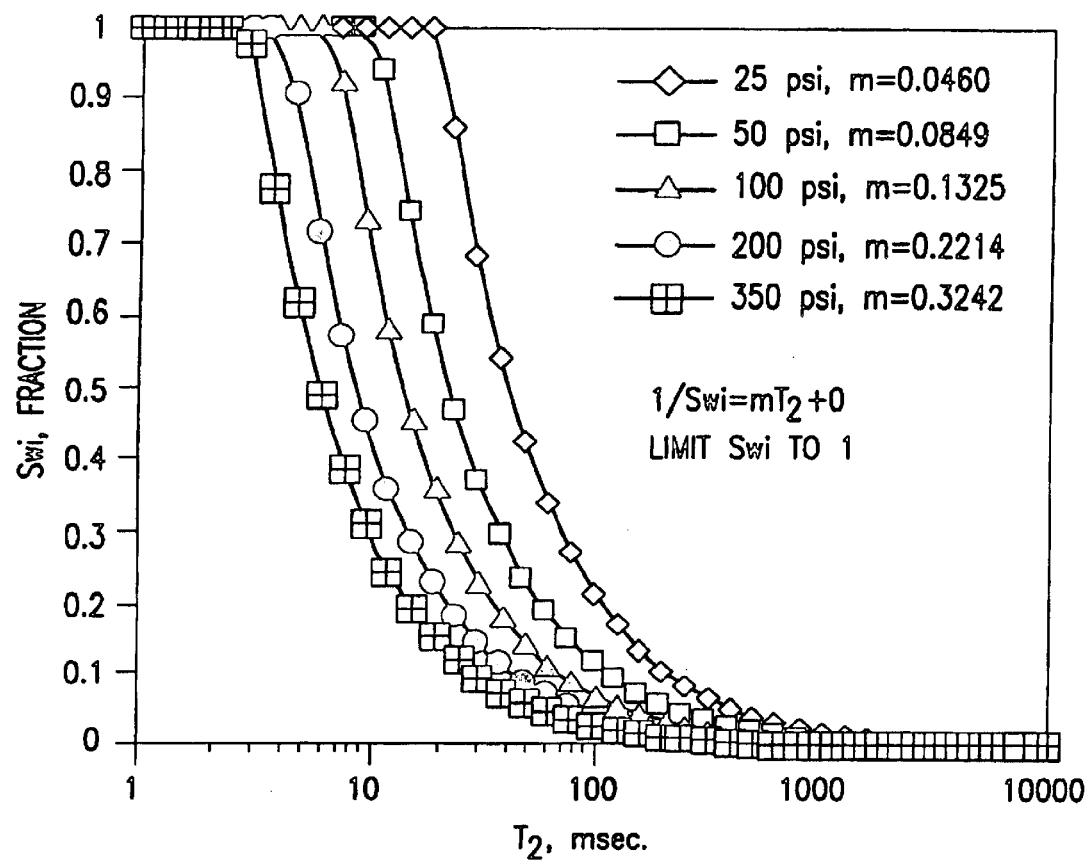
FIG. 5 illustrates SBVI model developed for each displacement pressure using air/brine single-point $S_{WIRR}$ values.

The function was very stable as long as a limiting condition for the $S_{WIRR}$ fraction was set not to exceed one. FIG. 5 shows how the SBVI model is dependent on capillary pressure. For each $P_c$ the slope "m" increases shifting the function to shorter relaxation times. As was the case for the $T_{2t}$, the SBVI function (or slope m) appears to shift to shorter $T_2$ spectrum times logarithmically with increasing $P_c$. A $T_2$ equivalent to the largest pore size unable to be drained is represented where the SBVI curve intersects the y-axis=1. This too shows a decrease as $P_c$ increases.

Figure 6:
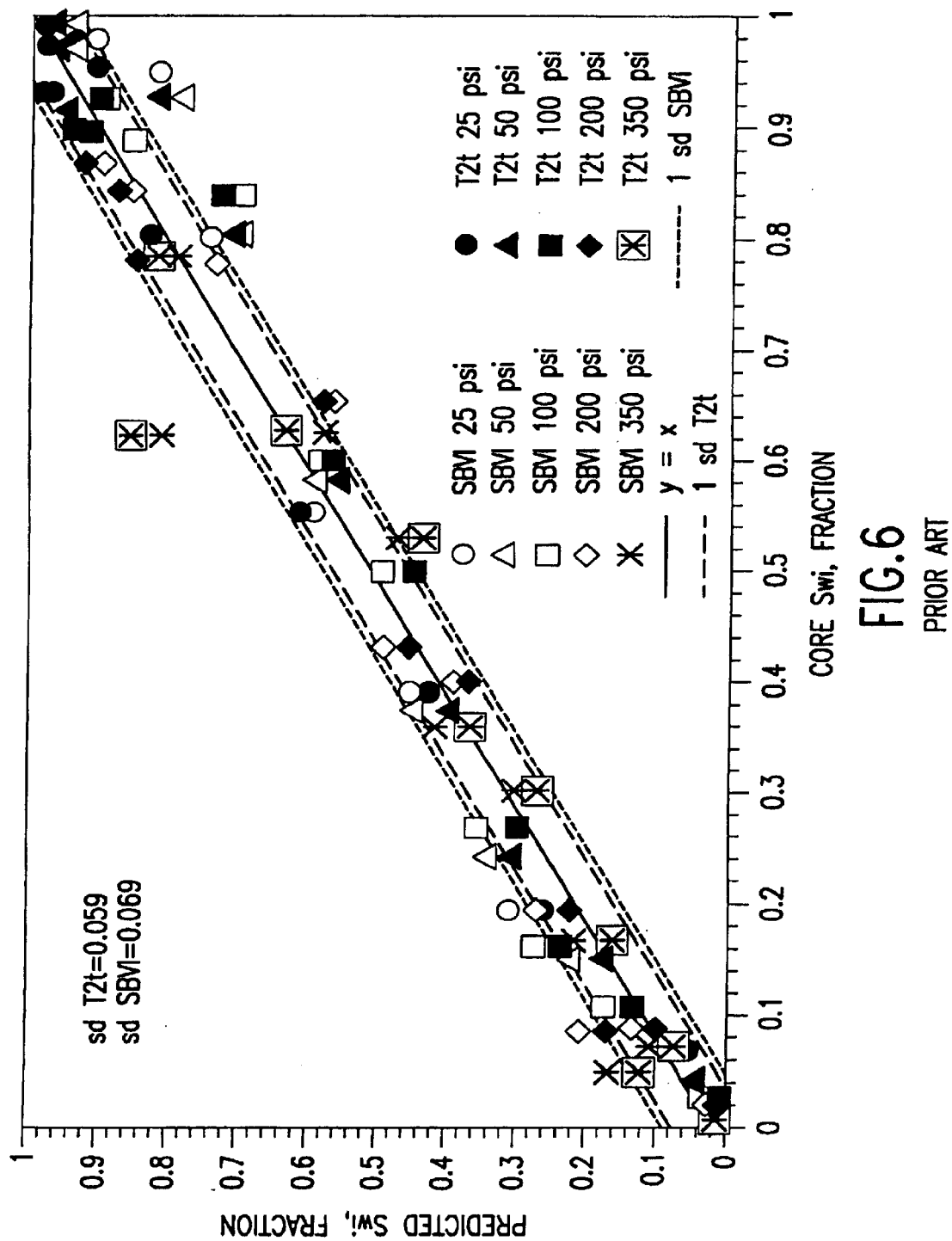
FIG. 6 is a comparison of $S_{WIRR}$ prediction to core measures $S_{WIRR}$ values. Predicted $S_{WIRR}$ value for SBVI and $T_{2t}$ methods were performed using the models shown in FIGS. 4 and 5.

As demonstrated in FIG. 6, when both CBVI and SBVI models are computed for each $P_c$, there is an improvement in values of core partial saturation ($S_{WIRR}$) determined from centrifuge air/brine displacements. The new SBVI model and CBVI model compared very well each with low standard deviations of 6.9 and 5.9 saturation units respectively. The CBVI model at higher pressures for one sample predicted a value of zero for BVI, which is cause for concern when applying this model.

BVI Calibration to Core

Using the above described dependance between SBVI and capillary pressure responses as an example, in a preferred embodiment of the invention, a height-based BVI (HBVI) transformation model is developed linking BVI and capillary pressure response. The basis for the HBVI transformation model is an observation that capillary pressure is a balance of two forces. One force binds the wetting phase to pore walls as shown in equation 3 and another force continues to drive the wetting phase out of the pore system as more hydrocarbons accumulate. At any given height (H, ft.) above a free water level these forces achieve equilibrium. Therefore, in accordance with the present invention, knowing the reservoir fluid properties such as water ($\delta_w$) and hydrocarbon ($\delta_h$) gradients (psi/ft), the in situ capillary pressure conditions corresponding to a particular logging measurement can be calculated by relating height to capillary pressure using a well-known equation $P_c=H(\delta_w-\delta_h)$ (Eq. 8). For a given contrast, or difference, in the pressure gradients between water and hydrocarbon, it will be appreciated that height above the free water level and capillary pressure are synonymous and therefore will be used interchangeably in this application.

FIGS. 4 and 5 show that both CBVI and SBVI methods for deriving BVI have an apparent logarithmic dependence on $P_c$. In accordance with the invention, this dependance is exploited to relate capillary pressure responses from core analysis to define volume of hydrocarbons (and water) for points above the free water level at in situ conditions. In accordance with a preferred embodiment of the invention, using a the laboratory $T_2$ spectrums in a series of simultaneous equations as suggested by Coates et al., the slope "m" of the SBVI function (Eq. 7) can be determined. The solution requires the input of known $S_{WIRR}$ values for each sample. This was performed for each $S_{WIRR}$ source, centrifuge capillary pressure, as well as, single-point saturations for $P_c$ air/brine values of 25, 50, 100, 200 and 350 psi, and from multiple $P_c$ conditions (from 5 to 950 psi) of $S_{WIRR}$ values drawn from equivalent air/brine mercury injection pressures (all data was obtained from the Baker Hughes test wells).

Figure 7:
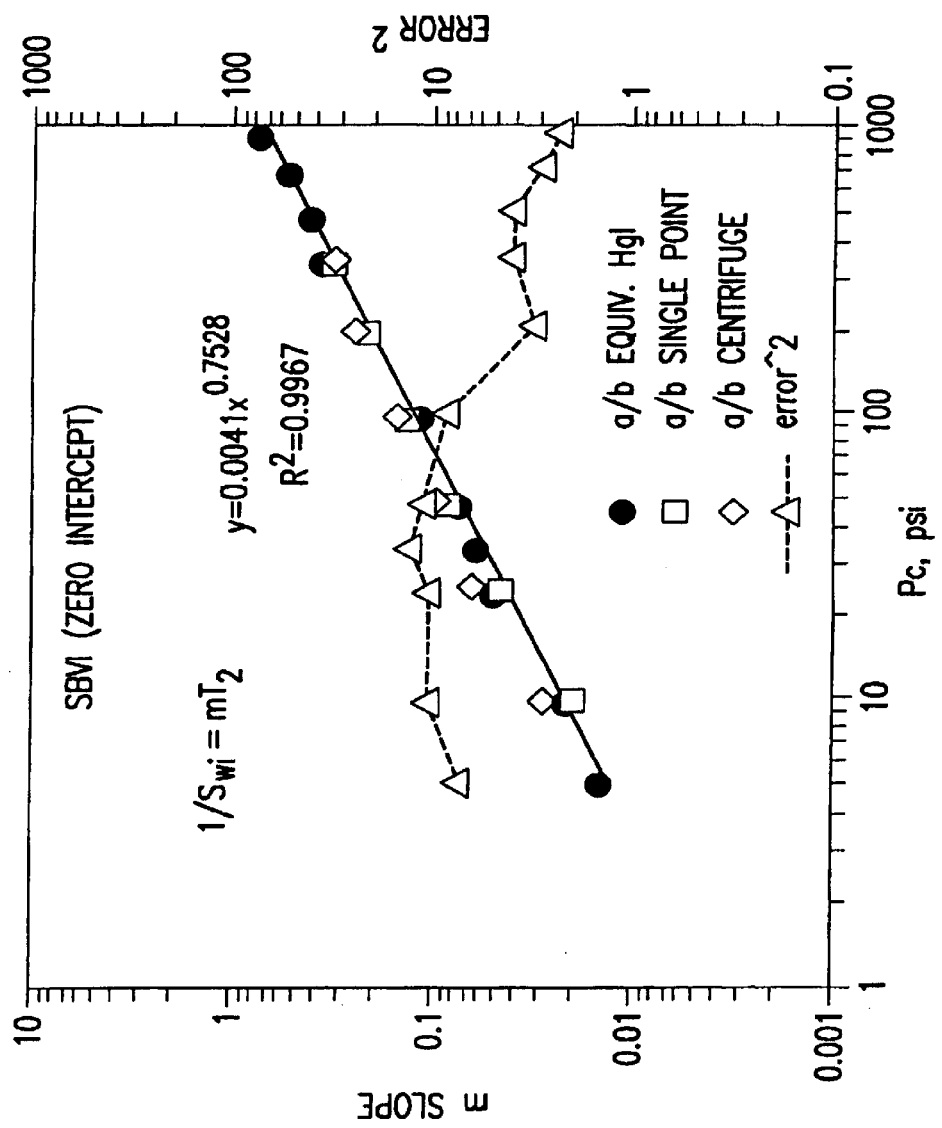
FIG. 7 illustrates a calibration method for HBVI for the SBVI model.

FIG. 7 demonstrates how the slope "m" of the SBVI function can be correlated to $P_c$. The excellent correlation shown was based on "m" values determined using mercury injection $S_{WIRR}$ values. Closely surrounding this correlation are the slope "m" values determined for the centrifuge $P_c$ $S_{WIRR}$ values from both full-curve and single-point methods. All sources of $S_{WIRR}$ values used to generate "m" vs. $P_c$, show very good agreement. Using a simple logarithmic function to correlation "m" and $P_C$ for a specific formation allows control of the BVI parameter for different PC conditions. As shown in equation 8 the $P_c$ can be converted to height above free water for the proper reservoir fluid condition; hence, the correlation given is a HBVI function.

Figure 8:
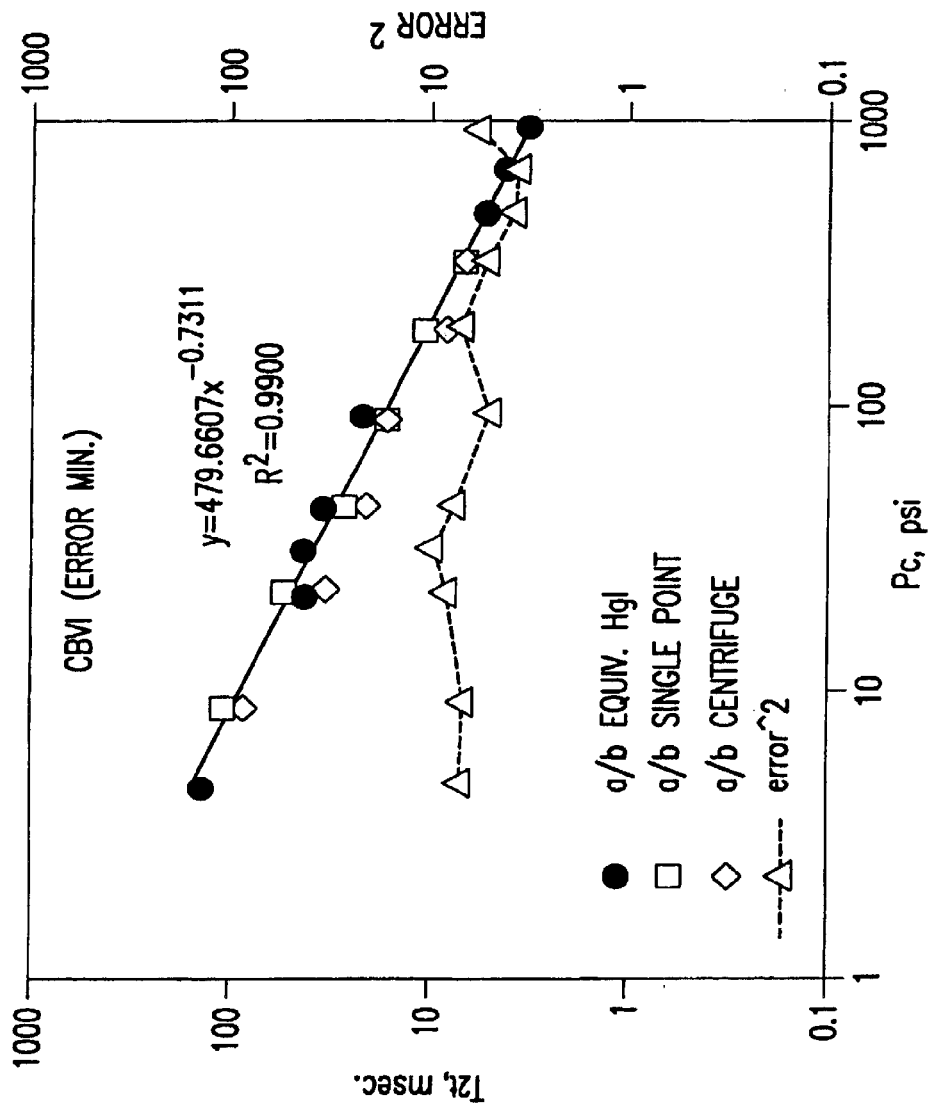
FIG. 8 illustrates a calibration method for HBVI for the CBVI model.

Regarding the CBVI model, FIG. 8 shows that there is an inverse relationship between CBVI and air/brine $P_c$ in accordance with equation 5. As with SBVI in FIG. 7, the correlation shown is based on the $T_{2t}$ values derived from $S_{WIRR}$ via mercury injection. Again, closely surrounding this correlation are values of $T_{2t}$ for the other two sources of $S_{WIRR}$, full curve and single-point centrifuge $P_c$. Formation specific data, like those shown in FIGS. 7 and 10 can be used to generate HBVI functions that allow the determination of an SBVI and/or CBVI models for one or a number of capillary conditions that may be encountered in the formation.

Once the HBVI transformation function has been derived from the calibration of NMR derived BVI to core data, the HBVI can be applied to the NMR data to quantify non-producible water in the NMR log. To this end, in a preferred embodiment, a true vertical depth (TVD) of the measurement is used to facilitate the transformation. Boreholes are often deviated either by design or as a natural consequence of drilling, and therefore TVD in the borehole may serve as a reference in accordance with a preferred embodiment to provide a useful and common basis for cross-referencing logging and core data. In accordance with a preferred embodiment, the NMR relaxation spectra are indexed by true vertical depth (TVD). Similarly, data from routine and special core analyses, such as the capillary pressure curves, are indexed by TVD. Hence, both sets of data can be linked via the above-derived HBVI function.

In accordance with this invention, the array of data points used to establish the fitted relationship between capillary pressure and the parameters in the chosen BVI transformation model need not come from cores in a single well. The disclosed process obviously can be applied in such a way as to simultaneously include all available NMR log and core data from similar formations penetrated by any number of wells in a representative region. For example, the methods used to analyze the samples from the Baker Hughes test well provided three different sources of core partial saturation values to demonstrate the HBVI function. The first source of core $S_{WIRR}$ values came directly from the full-curve centrifuge capillary pressure data. One constraint of this technique is that the test must continue without stopping the rotation. This does not allow separation of the sample from the centrifuge for NMR testing. To allow sample removal, a porous disk is placed at the outlet face to minimize the end effects. This is known as a single-point centrifuge saturation method performed at a specific capillary pressure. This was a second source of core $S_{WI}$ data. The third source of core $S_{WIRR}$ values comes from mercury injection. An equivalent air/brine capillary pressure $(p_{C/b})$ is computed using the air/mercury capillary pressures $(p_{C/Hg})$ as shown in $$P_{ca/b} = P_{ca/Hg} \frac{\sigma \cos\theta_{a/b}}{\sigma \cos\theta_{a/Hg}}. \qquad \text{(Eq. 9)}$$

The contact angle and interfacial tension for air/brine ($\sigma \cos \theta_{a/b}$) and air/mercury ($\sigma \cos \theta_{a/Hg}$) are commonly considered to be 26 and 367 respectively. Thus, $p_{C/Hg}$ in this study was divided by a factor of 5.1 to yield an air/brine capillary pressure. $S_{WIRR}$ values at any given pressure are computed as one minus the mercury saturation. It should be noted that the factor of 5.1 can very and should be checked against actual air/brine displacements. The results achieved from the other two sources of partial saturations are compared to those using mercury injection to demonstrate that mercury injection data can be used reliably to develop HBVI functions when the conversion factor is known or has been confirmed.

With reference to FIGS. 18A–18E, an example of the above-outlined method for using conventional core data to calibrate bound water volumes derived from NMR logs is provided based on the log data obtained by integrating NMR logging data with residual water saturation and porosity data from core analyses in a North Sea oil well. The core data were depth-merged with $T_2$ distributions from the NMR logs in a common data base, and analyzed with a statistical analysis package, such as Matlab, to derive a BVI transformation model.

Figure 18A:
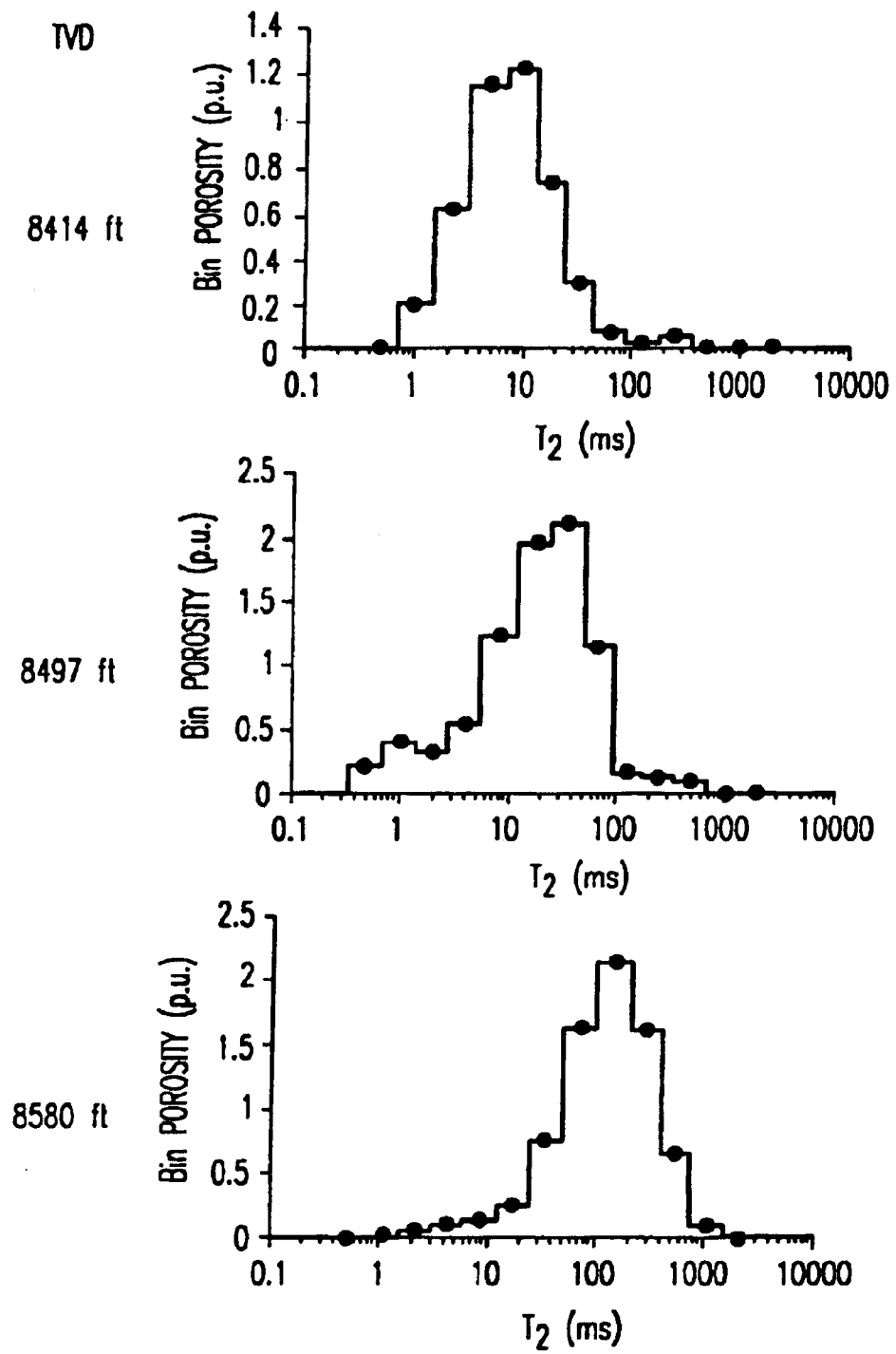
FIGS. 18A–18E illustrate some of the principles underlying the invention. In particular.
Figure 18B:
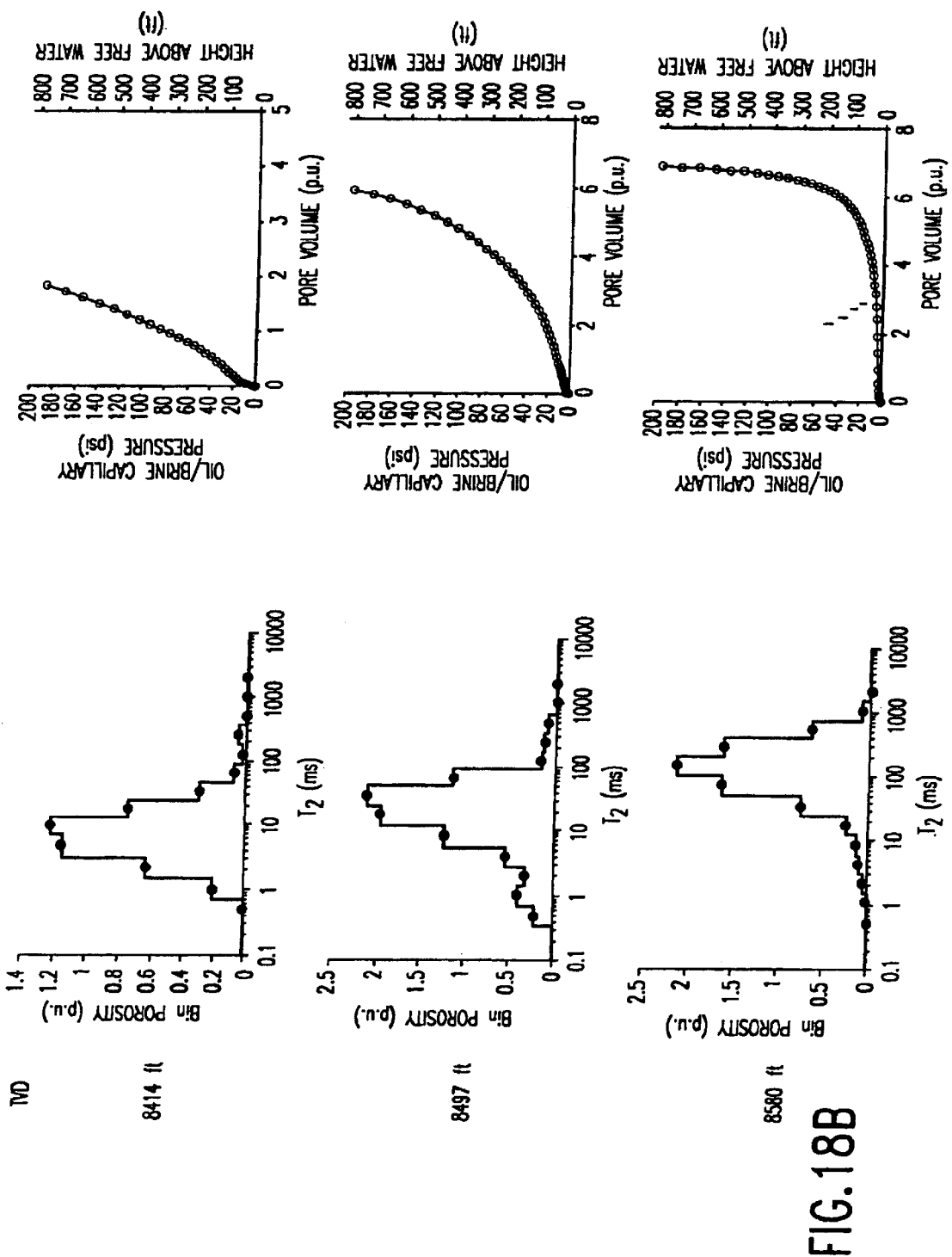

As known in the art, transverse NMR relaxation spectra ($T_2$ distributions) are obtained from a wireline or logging-while-drilling (LWD) NMR measurements. In accordance with a preferred embodiment, the NMR relaxation spectra are indexed by true vertical depth (TVD). FIG. 18A illustrates such $T_2$ distributions at different TVD. Similarly, data from routine and special core analyses, such as the capillary pressure curves, are indexed by TVD. FIG. 18B illustrates sample capillary pressure curves, along with the T2 distributions shown in FIG. 18A.

Figure 18C:
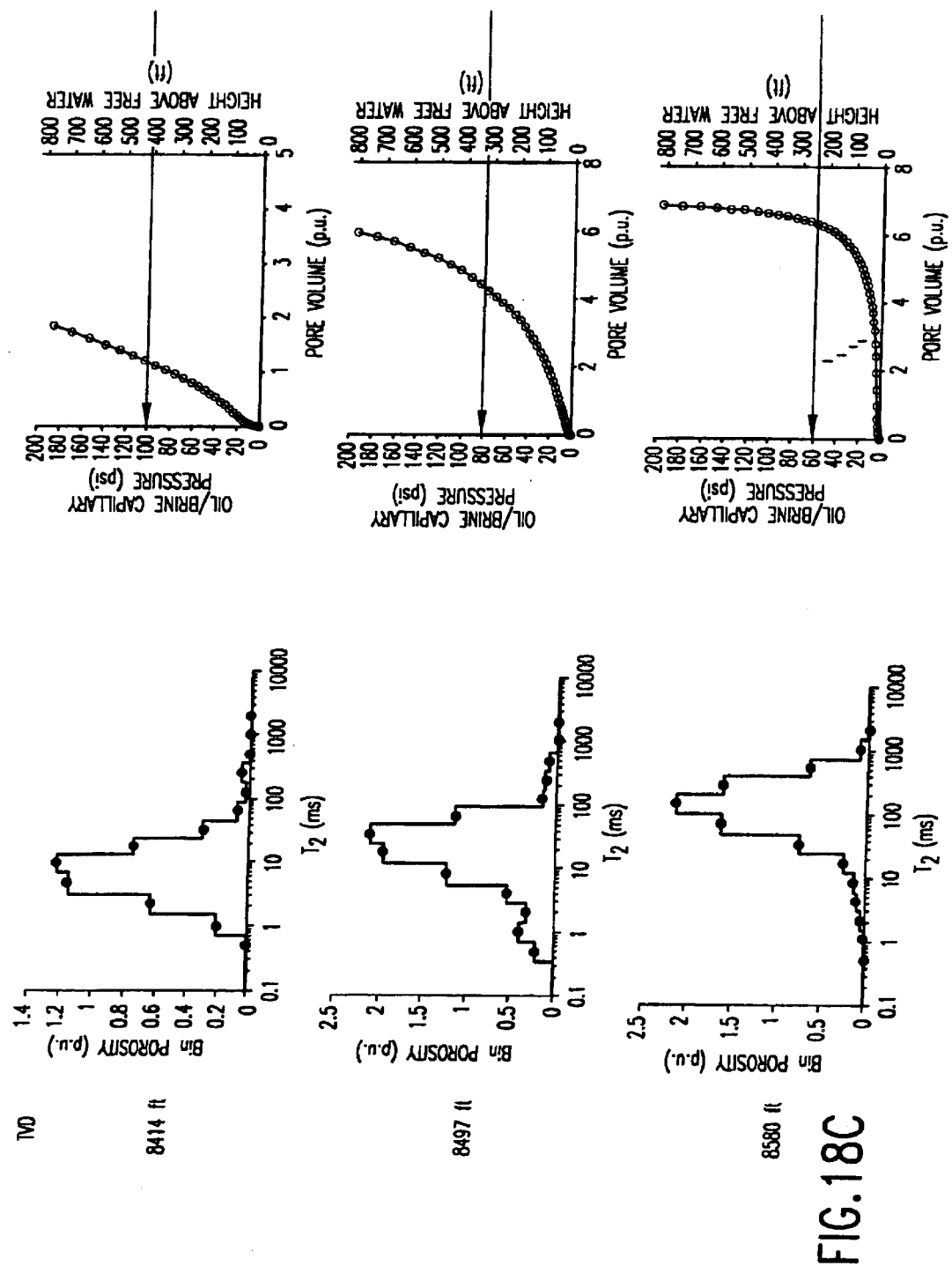
Figure 18D:
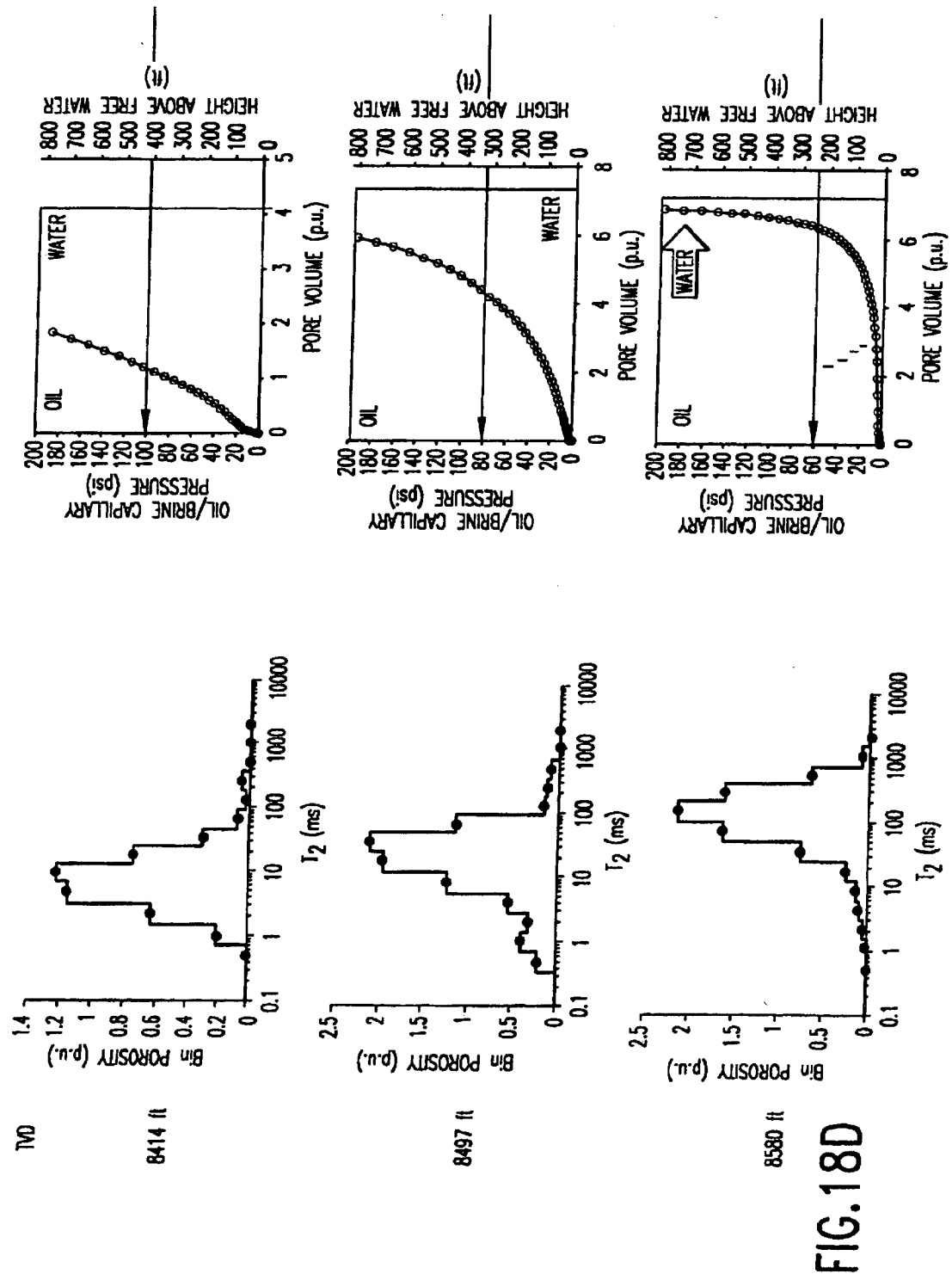

Capillary pressure responses from core analyses define the volumes of hydrocarbons (and water) for points above the free water level at in situ conditions. Projection of the capillary response function to infinity may provide an alternative to commonplace methods to further subdivide the water volume into clay and non-clay water volumes. FIGS. 18C and 18D illustrate the definition of the hydrocarbon and water levels from the capillary pressure response curves.

Figure 18E:
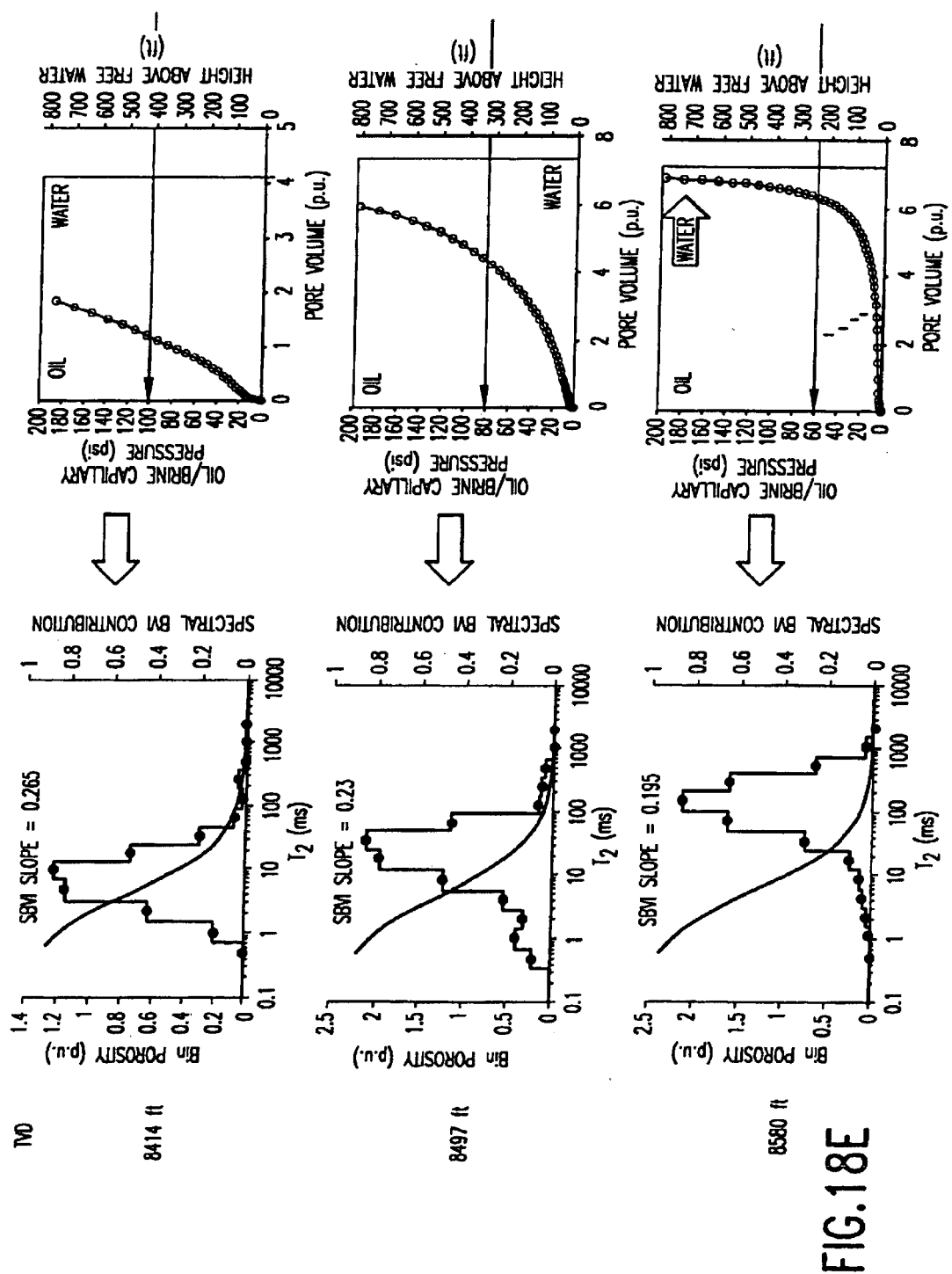

The computed water volume can be used in accordance with this invention to derive calibrated parameters in the chosen BVI transformations that, when applied to the measured NMR log $T_2$ distribution, yields the water volume obtained from the capillary pressure response and associated height above the free water level. As illustrated in FIG. 18E, the lines superimposed over the $T_2$ distributions represent a fractional contribution from each decay component to the overall BVI for the data point, which one skilled in the art will readily recognize as the above-described SBVI model. It should be apparent that the process of this invention is independent of the exact nature of the chosen transformation model. In alternative embodiment, the above-described CBVI transformation may be employed. However, choosing the best, or most representative, transformation model from several possible candidates is a natural, and logical aspect of the invention, which will be appreciated by people of ordinary skill in the art.

Figure 19:
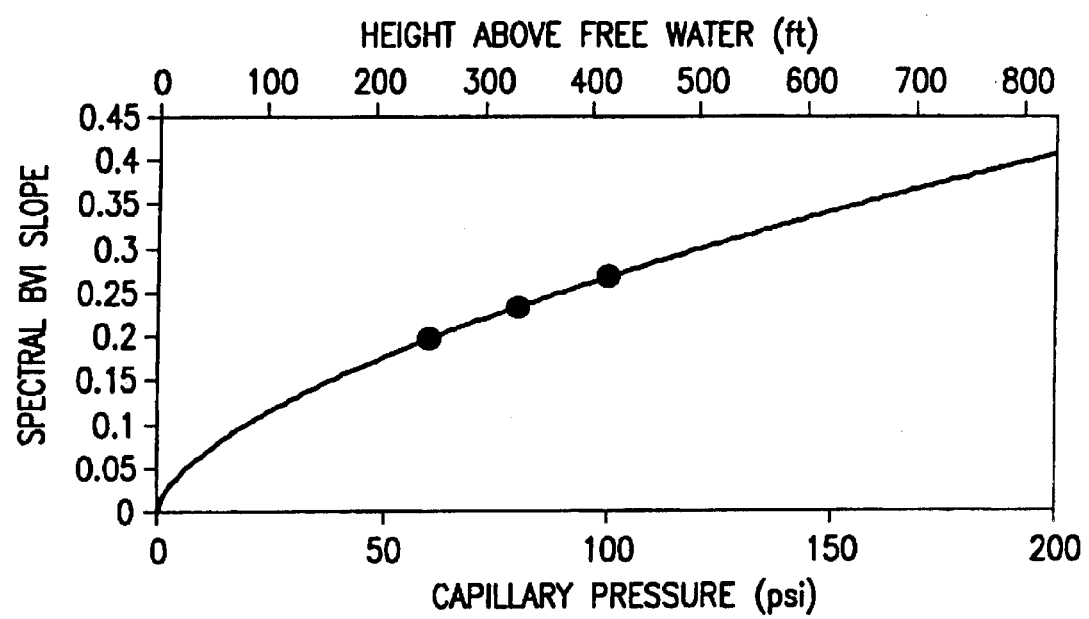
FIG. 19 illustrates the relationship between capillary pressure and the individual calibrations of the parameters in a chosen BVI transformation model.

The individual calibrations of the parameters in the chosen BVI transformation model on a sample-by-sample basis constitute an array of points, which can be related in accordance with this invention to capillary pressure, as shown in FIG. 19. In a preferred embodiment, a mathematical function is fit through the collection of core data points to obtain a continuous relationship between capillary pressure and the parameters in the BVI transformation model. In the example illustration, a single parameter, the spectral BVI slope, as a function of capillary pressure is required to characterize the chosen BVI transformation model over a broad range of capillary conditions. Other BVI transformation models in accordance with this invention may involve more than one calibration parameter and it may be necessary to fit more than one function to relate capillary pressure to all of parameters in the BVI transformation model.

Another important aspect of this invention is the application of HBVI calibrations obtained as outlined above to NMR logging measurements to derive capillary-bound water volumes. It will be appreciated that this aspect covers not only the subject wells utilized in the calibration, but also to logs acquired in other wells penetrating formations that are of similar composition and state, such that they would be considered for practical purposes to be essentially the same. To this end a global solution can be developed for use when core materials for core calibration are not available.

Global Solution

In a specific embodiment of the invention, a global solution is disclosed for use when core materials for core calibration are not available. In a reconnaissance mode these correlation's presented can be used to aid the analysts in determining an HBVI function from which to determine SBVI and/or $T_{2t}$ values (i.e., CBVI) for a single or multiple capillary conditions. In order to develop global solution, in a preferred embodiment, a database containing NMR laboratory measurements was interrogated. Several criteria were used: (a) samples with NMR @$S_w$=100% and partial saturation, (b) groups of 7 or more from a given formation, (c) global distribution of groups, (d) a wide range of permeability, porosity and partial saturations, (e) mercury injection, and (f) wide range and air/brine displacement pressures.

In a preferred embodiment, the database contains samples that have been analyzed for NMR characteristics at full and partial saturation conditions. Consistency with the type of data collected and preparation of the samples had been maintained. Routine core analysis and core preparation was performed as outlined above. All samples have measurements that have been performed at a minimum of two echo-spacing times of 0.5 or 0.6 and 1.2 ms using a minimum of 200 signal to noise ratio. Wait time and number of echoes gathered is adjusted for each sample based on preliminary sample runs. In each case, ample wait time and number of echoes is used to properly characterize the relaxation time spectrum. All inversion processing has been performed using 51 relaxation time bins and the MAP inversion process disclosed by Prammer in "NMR Pore Size Distributions and Permeability at the Well Site."

After database interrogation, a total of 241 samples were selected and grouped by formation, 14 in all. A global distribution of formations is represented. Formations were selected from several continents which include, North America (Alaska, Texas, and Oklahoma) South America (Venezuela and Argentina), the Middle East (Egypt) the Far East (China) Australia and New Zealand. Of the 241 samples 197 have mercury injection data. A subset of these selected samples, 105 in all, was examined for thin section, SEM and mineralogy.

Figure 9:
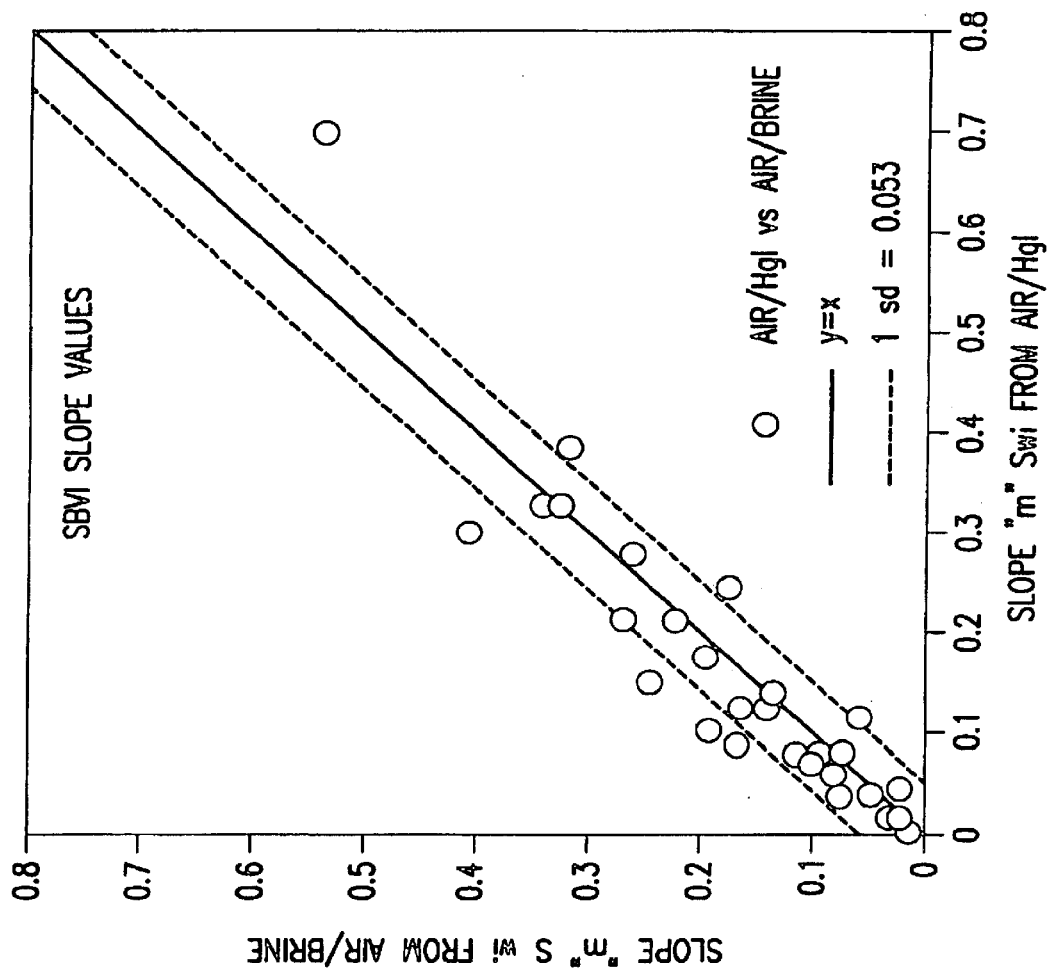
FIG. 9 is a comparison of slope "m" values for the SBVI model for those determined using mercury injection (HgI) and those determined using air/brine displacement. The $P_c$ for HgI was matched to $P_c$ of the air/brine displacement.
Figure 10:
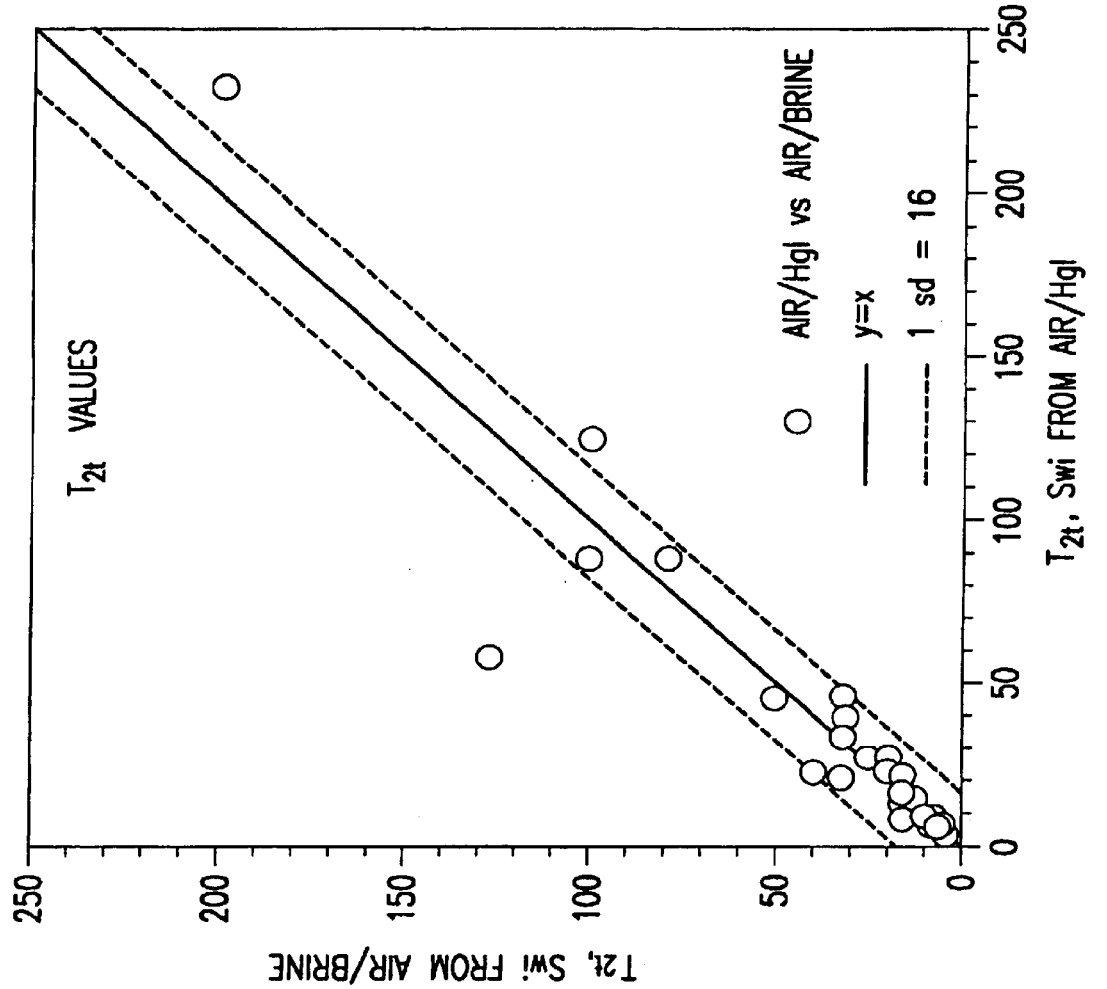
FIG. 10 is a comparison of $T_{2t}$ values for those determined using HgI and those determined using air/brine displacement. The $P_c$ for HgI was matched to $P_c$ of the air/brine displacement.

In accordance with a specific embodiment, to determine SBVI functions and $T_{2t}$ values for each group, mercury injection was used to determine $S_{WIRR}$ values at multiple $P_c$ values (5 to 950 psi, air/brine). Each group also had $S_{WIRR}$ values determined via porous plate and/or single-point centrifuge techniques at a single capillary pressure. A final check on the reliability of using $S_{WIRR}$ values from mercury injection was made by comparing the values of slope "m" and $T_{2t}$ determined from actual air/brine displacement $S_{WIRR}$ values to those determined from mercury injection, (FIGS. 9 and 10). The agreement is good with no apparent bias around the y=x line and a reasonable standard deviation of 0.053 for slope "m" and 16.3 msec. for T2t.

In accordance with a preferred embodiment, $P_c$ (air/brine equivalent) was correlated to slope "m" of the SBVI model (Eq. 8), and $T_{2t}$. In each groups case the correlation was similar to that found in FIGS. 7 and 8 with correlation coefficients ($r^2$) that ranged from 0.999 to 0.910. This shows that SBVI and CBVI are strongly dependent on $P_c$.

Figure 11:
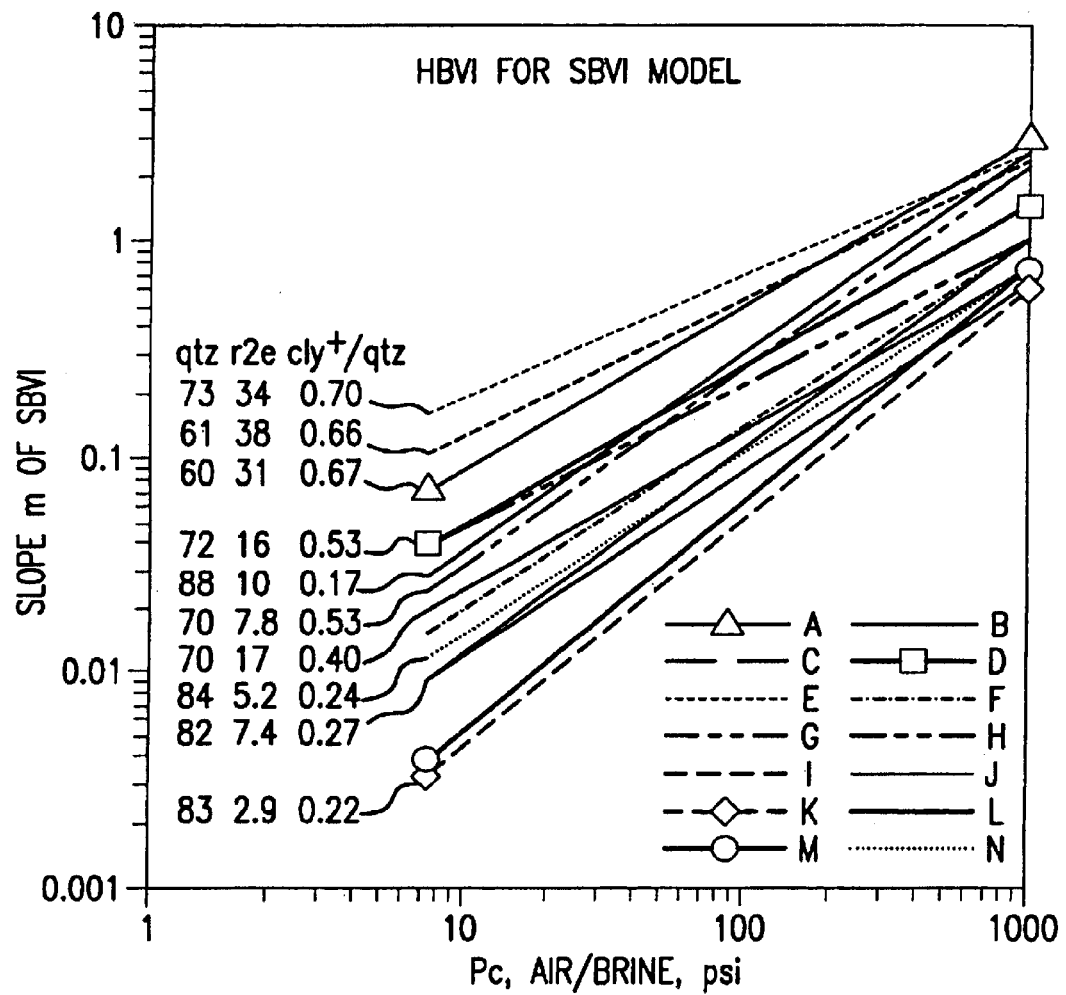
FIG. 11 illustrates HBVI for the SBVI model of the 14 groups studied. Only the regression lines are represented.
Figure 12:
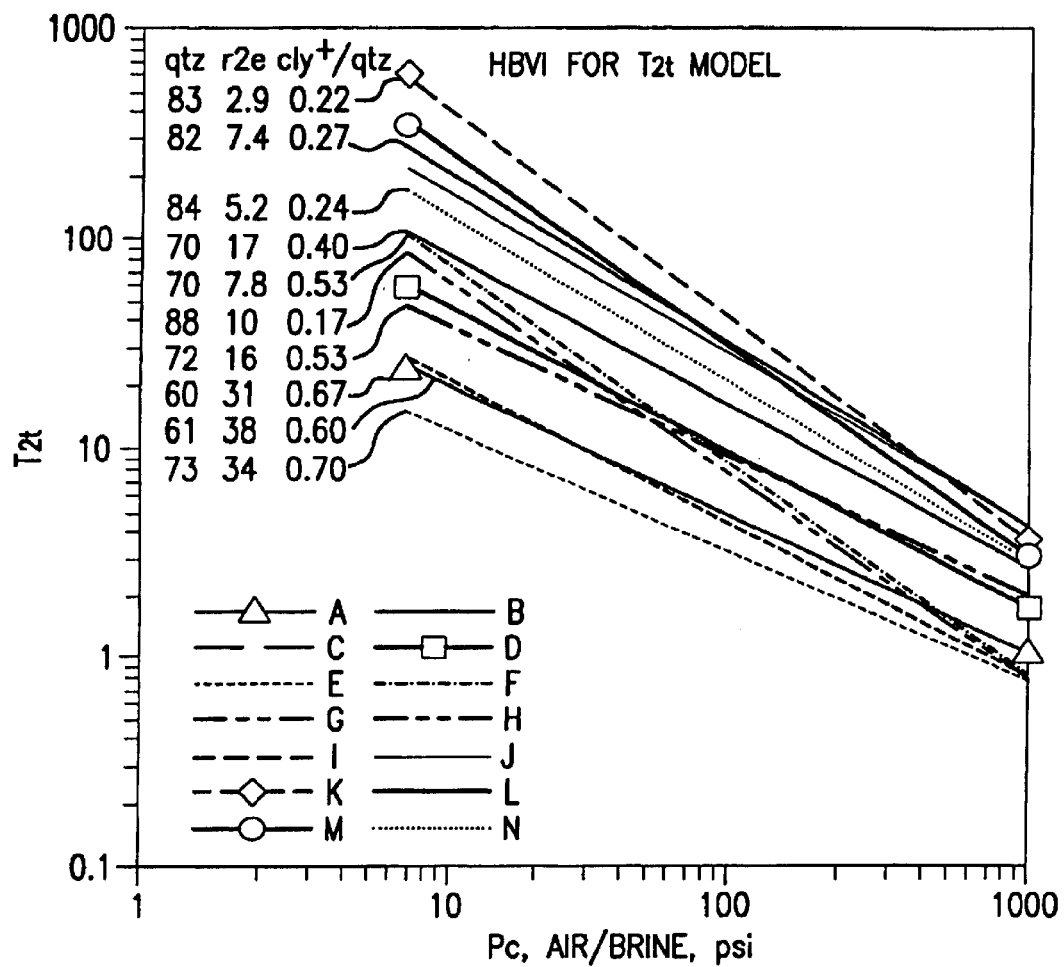
FIG. 12 illustrates HBVI for CBVI model for the 14 groups studied. Only the regression lines are represented.

FIGS. 11 and 12 show the lines of these log-log regressions (y=ix$^b$) that fit the SBVI slope "m" and $T_{2t}$ values vs. $P_c$. In general the lines all have similar slopes "b". For the correlations of SBVI "m" values, slope "b" is from 0.5664 to 1.0927 with an average of "b" equal to 0.8377. For $T_{2t}$ the slope "b" range is very similar but inverted to pressure as a negative value. Slope "b" for $T_{2t}$ ranged from −0.5827 to −1.0377 with an average value being −0.8038.

A significant spread of the lines along the y-axis is apparent in FIGS. 11 and 12. At low pressure the lines span 2 logarithmic decades and at high pressures the lines span 1 logarithmic decade. As expected a significant dynamic range is observed with intercepts of these correlations. For the SBVI "m" vs. $P_c$, the intercept "i" ranges from 3.79E-04 to 5.22E-02. The intercept "i" for the $T_{2t}$ vs. $P_c$ correlation ranges from 48.9 to 5248.

Figure 13A:
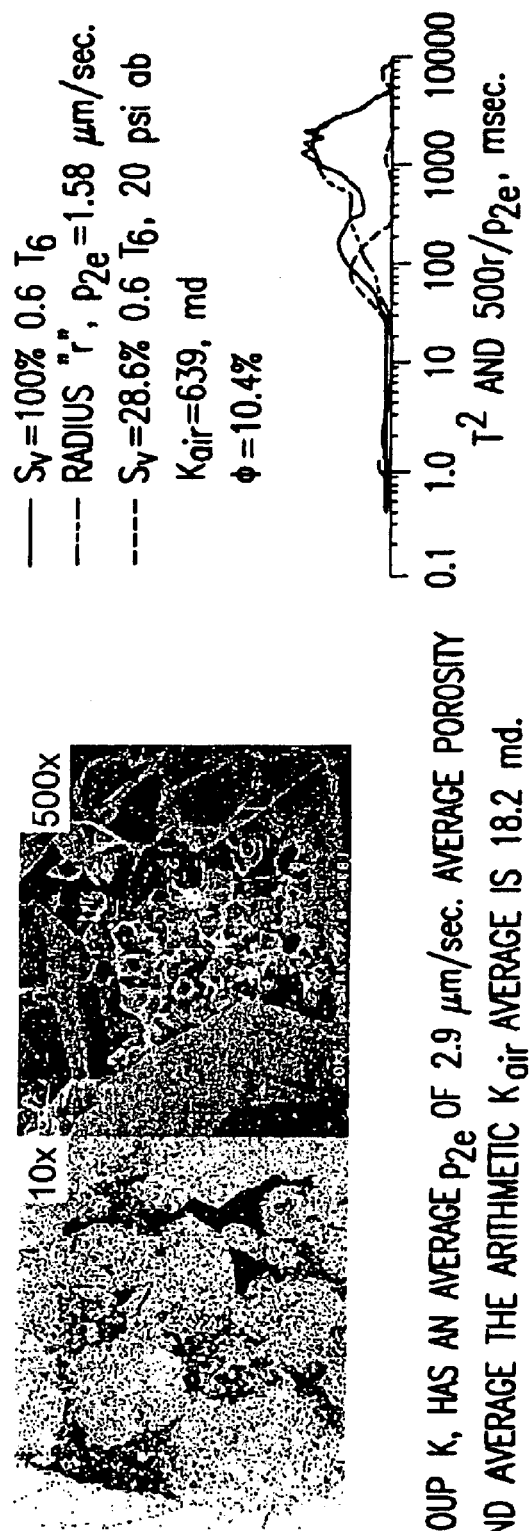
FIG. 13 illustrates the petrophysical and T2 spectrum for selected groups of the database study.
Figure 13D:
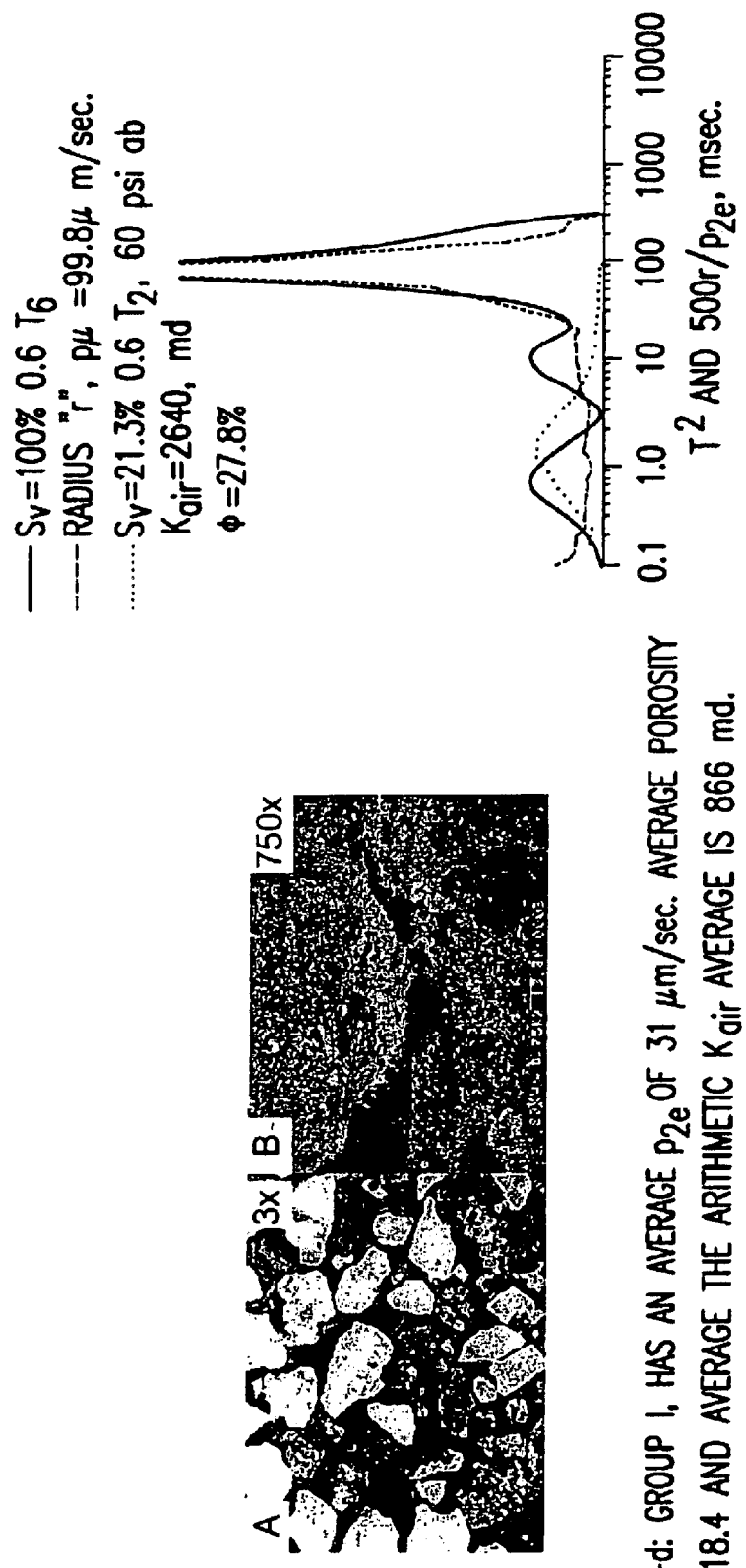

To understand what is causing the spread along the y-axis, end members and two midrange groups were selected for review. Petrographic and $T_2$ spectrums for these selected groups are summarized in FIG. 13. FIG. 13a is an end-member labeled group K in FIGS. 11 and 12. The group is characterized in the $T_2$ spectrum as having very long relaxation times. In fact these times are more typical of carbonate formations. The porosity of the sample selected for display is low, 10.4%, but is near the group average of 8.5%. Air permeability, 6.39 md, also considered low, is near the groups average of 18.2, md (arithmetic). In sharp contrast to this is group I, (FIG. 13-d) another end member. This group exhibits much shorter relaxation times but the average porosity of 18% and average permeability of 866 md, are much higher than group K. The sample displayed is a good example of group I.

Reviewing the thin sections and SEM's of these end member groups it becomes apparent that group K exhibiting the long relaxation times but low porosity and low permeability has abundant quartz overgrowths, high quartz content and pore filling Kaolinite. Of significance in terms of surface relaxation mechanism is the fact the pore wall surfaces are smooth, flat, and planar in nature as seen in SEM. These pores have low surface areas. In contrast to this, group I is characterized as having less quartz richness, with more of the framework grains being rock fragments possessing mineralogies of feldspar and plagioclase which are known to be parent minerals for authigenic clays. The group is also characterized as having microporosity as a function of these rock fragments being dissolved. The pore surfaces are all coated with authigenic mixlayer clays of Illite/Smectite and Chlorite/Smectite. It is these authigentic clay minerals (an average of 6.9% weight percent) that shorten the relaxation times. The pore walls are characterized by having large surface areas. The average effective relaxivity for Group I is 31 m/sec., in sharp contrast the average of Group K at 2.9 m/sec.

The midrange members show similar characteristics but the groups and samples within each group tend to have more of a mixture of pores with flat surfaces (primarily quartz overgrowths) and clays that line pore walls. This is exactly the case for Group L (FIG. 13c). Group F (FIG. 13b) is of interest as its line has a higher slope compared to most others. In SEM it would appear to be like the end-member group K with a lot of large flat surfaces, and by XRD it is quartz rich. However, hinted in SEM, but confirmed by thin section, is the presence of grain coating smectite. At high $S_{WIRR}$ conditions the abundance of quartz overgrowths causes slow relaxation times, however, as $S_{WIRR}$ decreases the clays that line the pore walls dominate the relaxation times of the $T_2$ spectrum. This is why group F's line transverses across slower relaxing groups at low $P_c$ values and fast relaxing groups at higher $P_c$ values.

The problem of low clay volumes causing fast relaxation can be overcome by computing a clay volume that includes the weight percent of feldspar, plagioclase with a multiplier for known fast relaxing minerals. The fast relaxing minerals in this global set were noted to be, smectite, chlorite and analcime whose weight percents were multiplied by a factor of 15 prior to summing total clay plus (cly$^+$). A cly$^+$ value was computed for the XRD data for each sample. A ratio of the cly$^+$ to quartz (cly$^+$/qtz) was used as a comparative tool to help understand the spread of lines shown in FIGS. 11 and 12.

Where the data is available, FIGS. 11 and 12 display the quartz percent, effective relaxivity and the cly$^+$/qtz ratio. Observing FIGS. 11 and 12 it is apparent that a fair correlation is exhibited between quartz content and the spread of regression lines along the y-axis. Variation are likely due to authigentic grain coating clays that can be low in weight percent but have a dramatic effect on the $T_2$ spectrum. It is plausible to consider however, that there is a fair correlation because the probability that clay causing fast relaxation is greatest when the quartz content is low. Furthermore when quartz overgrowths are present, the probability that clays that line pore walls will be absent is highest, as it is the location of these clays that prevent quartz precipitation.

Figure 14:
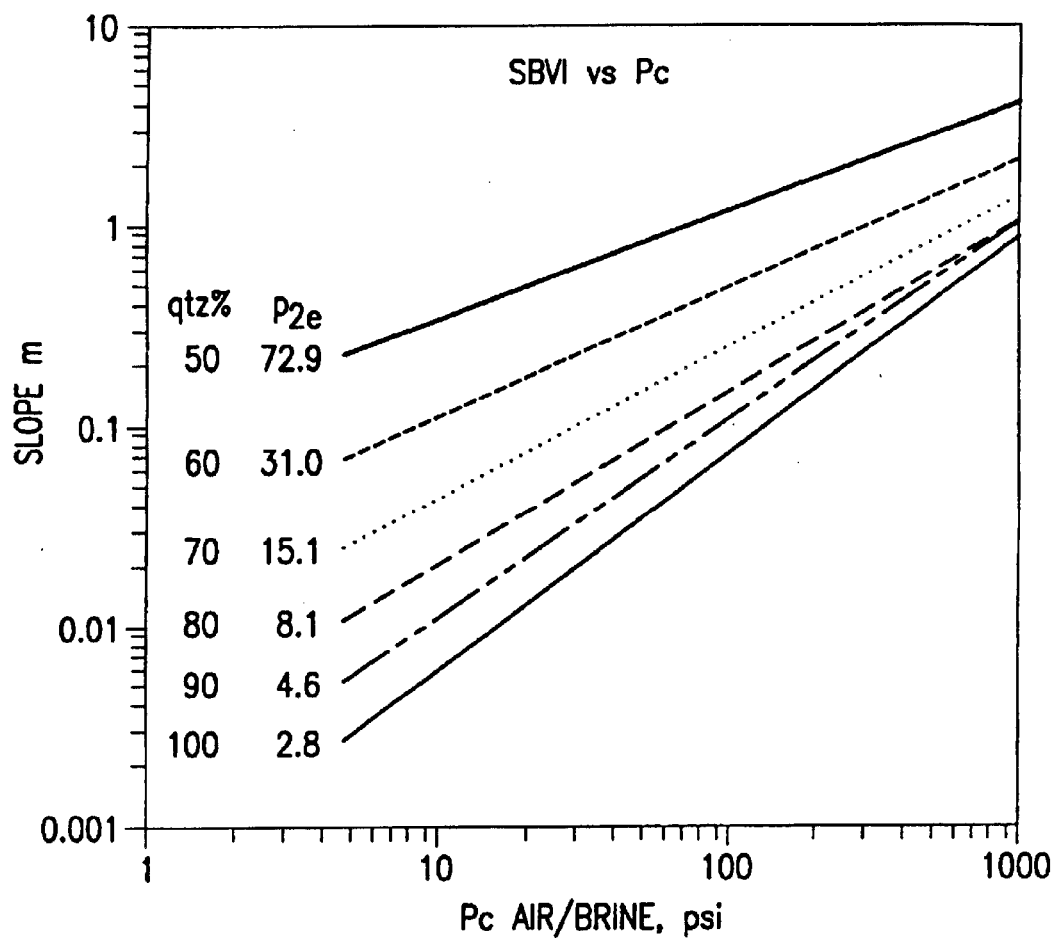
FIG. 14 is the HBVI global solution for the SBVI model a based on quartz content.
Figure 15:
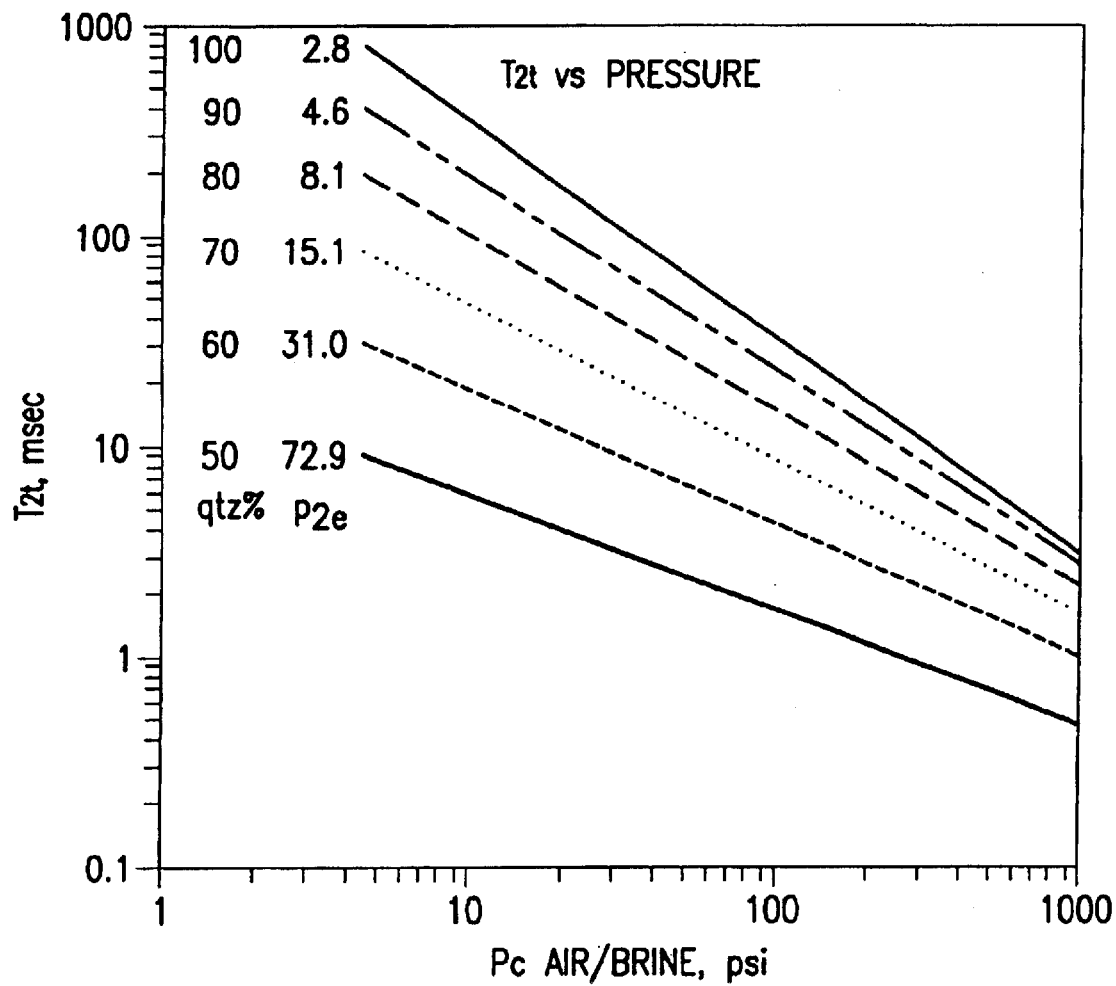
FIG. 15 is the HBVI global solution for the CBVI model a based on quartz content.

In accordance with present invention, FIGS. 14 and 15 present correlations developed form the quartz richness using XRD results and the intercepts of the regressions of "m" vs. $P_c$ and $T_{2f}$ vs. $P_c$. In the absence of other data, estimation of quartz content form log analysis techniques, can aid the analyst in determining a HBVI function for SBVI and/or CBVI models to use when analyzing NMR logs. The analyst would enter FIG. 14 or 15 with a desired capillary pressure or pressures, choose an average quartz percent that fits the average of the formation of interest, and determine the CBVI and/or SBVI function needed. In addition the analyst can predict an effective relaxivity and for $T_2$ spectrums or parts of the T2 spectrum that are not effected by hydrocarbons, and estimate the pore throat sizes using equation 4, (substituting $T_2$ for $T_1$).

Figure 16:
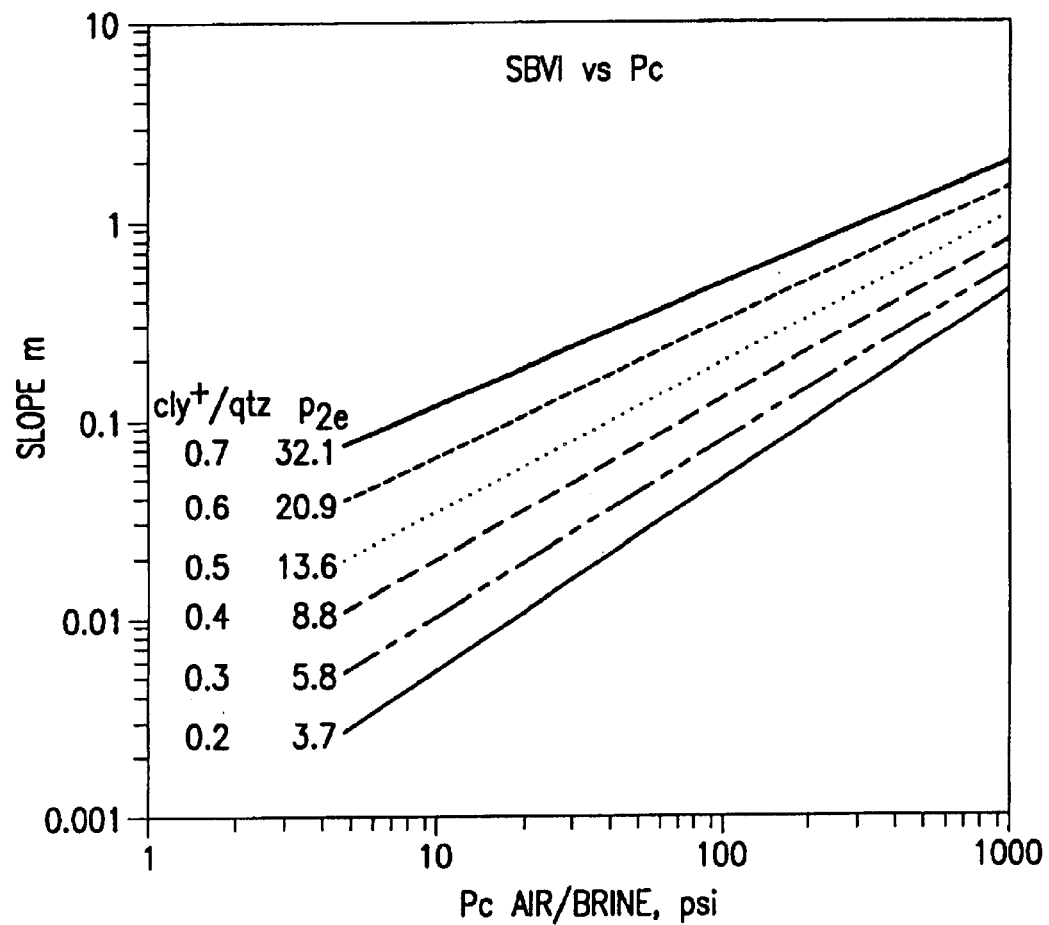
FIG. 16 illustrates a global solution used to determine SBVI functions at a single or multiple capillary pressures.
Figure 17:
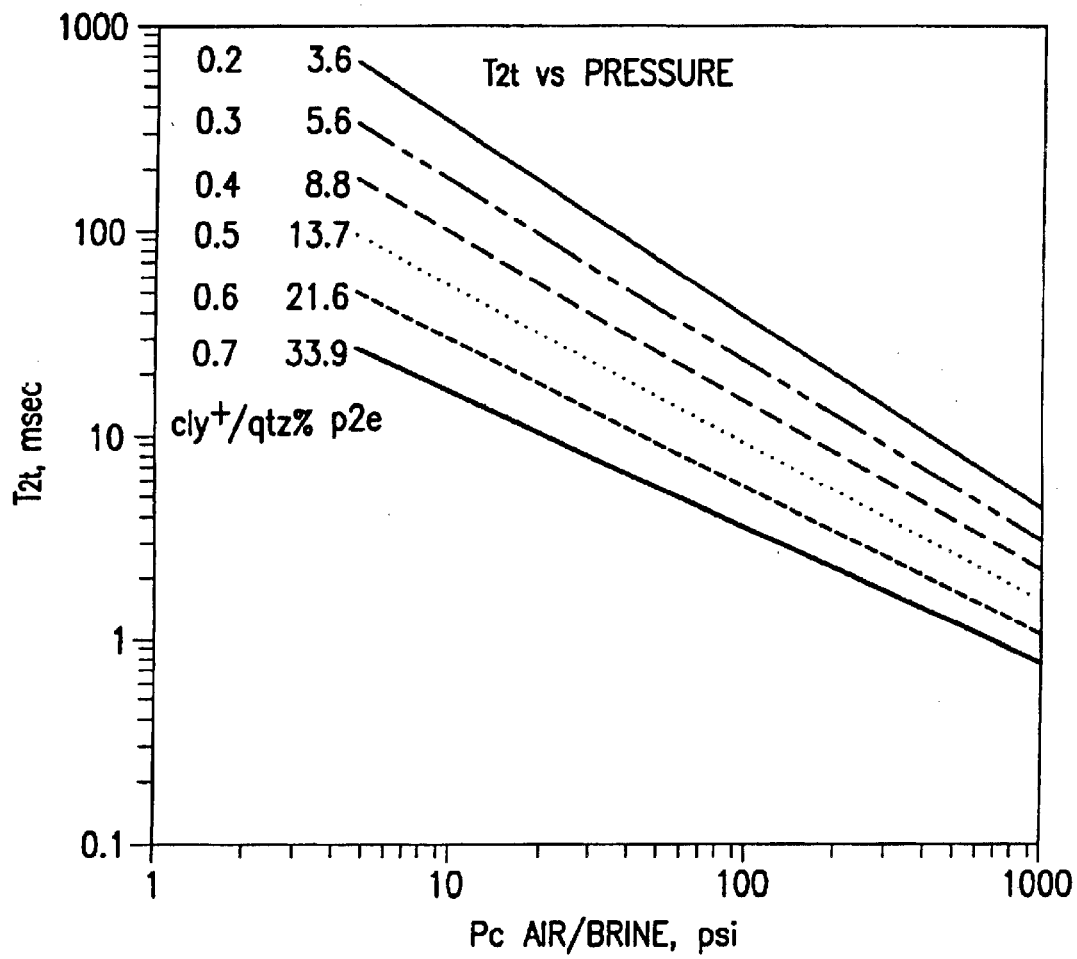
FIG. 17 illustrates the global solution for HBVI to determine $T_{2t}$ for a selected pressure or multiple capillary pressures. Based on a XRD data to determine a cly$^+$/qtz ratio.

If XRD data is available, the analyst can compute a cly$^+$/qtz ratio as discussed previously and use FIGS. 16 and 17 to predict an HBVI function for SBVI and/or CBVI models. This method would be preferred as the correlation demonstrated in FIGS. 11 and 12 show a better trend with the spread or regression lines along the y-axis, or regression intercepts.

Preferred Embodiment of the System

Figure 20:
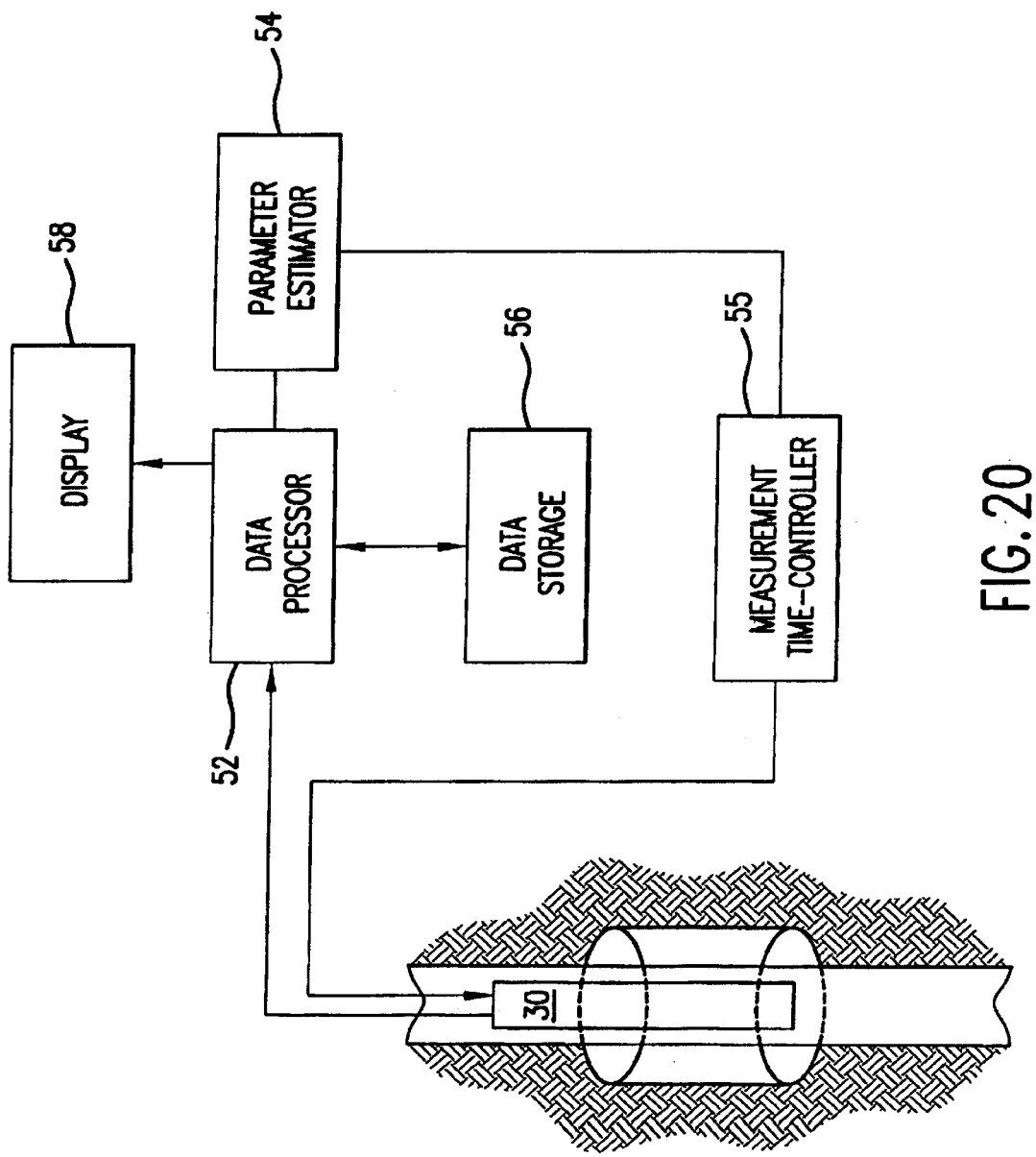
FIG. 20 is a block diagram of the system in accordance with a specific embodiment of the present invention.

FIG. 20 is a block diagram of the system in accordance with a specific embodiment of the present invention, which shows individual block components for controlling data collection, processing of the collected data and displaying the measurement results. In FIG. 20 the MRI electronics 30 comprises an MRI probe controller and pulse echo detection electronics. The output signal from the detection electronics is processed by data processor 52 to analyze the relaxation characteristics of the sample. The output of the data processor is provided to the parameter estimator 54. Measurement cycle controller 55 provides an appropriate control signal to the MRI probe. The processed data from the log measurement is stored in data storage 56. Data processor 52 is connected to display 58, which is capable of providing a graphical display of one or more measurement parameters, preferably superimposed on display data from data storage 56. The components of the system of the present invention shown in FIG. 20 can be implemented in hardware or software, or any combination thereof suitable for practical purposes.

Still with reference to FIG. 20, in a preferred embodiment of the invention the system comprises a database (that could be implemented as part of data storage 56), a statistical analysis software package, such as Matlab, which can be applied to data processor 52, and a log data processing system, diagrammatically illustrated as data processor 52 and parameter estimator 54. Alternative configurations could involve multiple databases and/or multiple statistical analysis packages, as will be appreciated by those of skill in the art. Straightforward extensions of this system configuration, which involve the use of communications network that connects various components remotely also form part of the invention, and will be used in alternative embodiments.

In the preferred embodiment, the database 56 serves as a common repository for the NMR logging data ($T_2$ distributions) and core data. The statistical analysis package is used to perform quality control evaluations and curve fitting on the data stored in the data base. In addition, the statistical analysis package used in a preferred embodiment provides graphical output on display 58, which can be used to evaluate the curve fitting results. It will be appreciated that this feature is useful in selecting the best BVI transformation model among several candidate models for a given set of log and core measurements.

The log data processing system functionally serves as a means for applying the fitted BVI transformation model to NMR logs thereby allowing for BVI determination over the entire logged interval.

Advantages of the Proposed Approach

The disclosed method enables improved permeability estimation. Permeability is defined as a constant value, for a single fluid, in laminar flow with no rock or fluid reactions occurring. NMR data traditionally has been used to determine this absolute permeability because the SBVI and/or CBVI could only represent a single capillary condition. Now that BVI can be varied as a function of the capillarity, the dependence of permeability on irreducible water saturation can be included when computing permeability. For example, sand of the same rock quality at two different structural heights should exhibit different permeabilities. However, using the traditional BVI methods, each zone would have the same permeability. Improvements in determinations of producibilty should be an outcome of the HBVI method.

Quite often the number of capillary pressure measurements performed on core material substantially exceeds the number of laboratory samples investigated in a NMR core study to calibrate a BVI transformation. Thus, the new process is expected to lead to a more robust calibration because a larger collection of data points is used.

Figure 21:
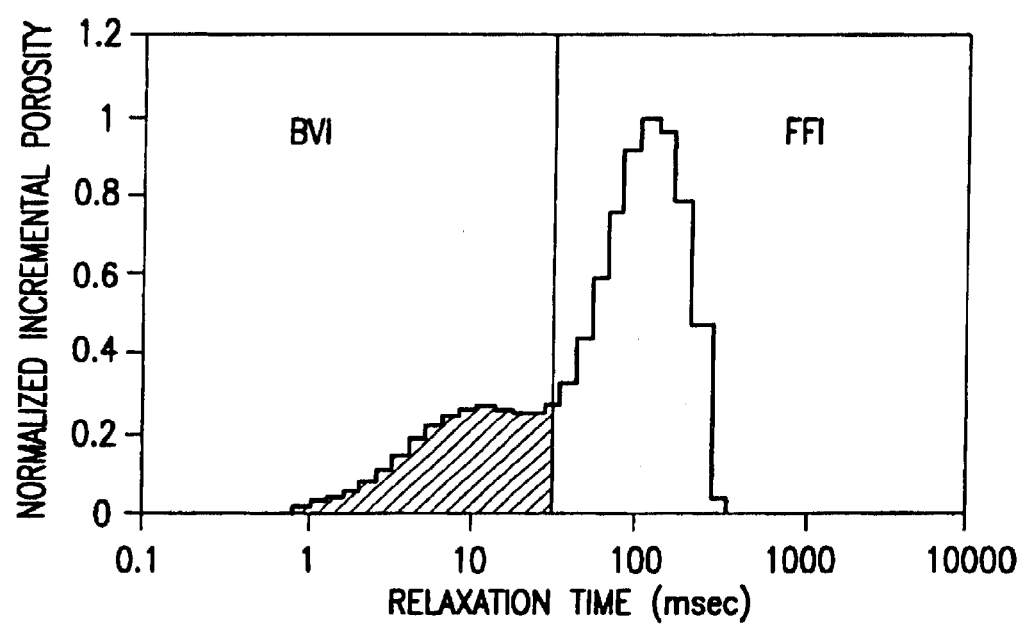
FIG. 21 illustrates CBVI technique applied to a multi-exponential $T_2$ distribution obtained from a laboratory NMR measurement performed on a medium porosity quartz sandstone.

In addition, because the NMR measurements used in the process are acquired at in situ conditions of fluid pressure, temperature, formation stress, calibrations performed with the new process are less prone to systematic errors compared to traditional laboratory NMR measurements. FIG. 21 illustrates a CBVI technique applied to a multi-exponential T2 distribution obtained from a laboratory NMR measurement performed on a medium porosity quartz sandstone.

Further, the new process is less prone to errors in reservoirs having substantial heterogeneity. It will be appreciated that the proposed approach diminishes the potential for errors arising from coring-induced structures in core samples.

It will also be appreciated that the process can be used to obtain BVI transformation calibrations when laboratory NMR studies can not be performed because of logistics or security.

While the foregoing has described and illustrated aspects of various embodiments of the present invention, those skilled in the art will recognize that alternative components and techniques, and/or combinations and permutations of the described components and techniques, can be substituted for, or added to, the embodiments described herein. It is intended, therefore, that the present invention not be defined by the specific embodiments described herein, but rather by the appended claims, which are intended to be construed in accordance with well-settled principles of claim construction.

Appendix A

Petrophysical Model

Basic Model Concept. The SBVI model embodies two key interpretation concepts: (1) Each component in the T2 spectrum represents fluid contained in pores within a particular narrow range of pore sizes. (2) Each pore size group contains at least some capillary bound water. Thus, each $T_2$ component has its own $S_{WIRR}$.

The first assumption is consistent with the fact that water in rocks is in the fast-diffusion limit (Brownstein and Tarr, 1979; Latour et al., 1992) and hence $$\frac{1}{T_2} = \rho_2 \left(\frac{A}{V}\right) + \frac{1}{T_{2B}}. \quad \text{(Eq. 1)}$$

Here, $T_{2B}$ is the relaxation time of bulk water, V and A are, respectively, the pore volume and surface area, and $\rho_2$ is the so-called surface relaxivity which characterizes the relaxation rate on A. For pore sizes typical of sandstones, relaxation of bulk water is usually negligible compared to the surface relaxation and hence is often an excellent approximation. Here, we are also ignoring the effects of diffusion in a gradient magnetic field on the observed $T_2$ (Coates et al., 1995). This is valid for the MRIL tool (MRIL is a registered trademark of NUMAR Corp.) provided the log is run using a short inter-echo time, i.e., $T_E$ 1 msec or less. Interpreting each $T_2$ component as representing a narrow range of pore sizes, instead of a single pore size as implied by Eq. 1, addresses two effects that tend to limit the pore size information contained in NMR relaxation measurements. First, the resolution in real $T_2$ spectra is limited because of the linebroadening effects of measurement noise. This effect can be partially offset by increased signal averaging.

A second, more fundamental effect arises from diffusional coupling between connected regions of the pore space as described by Kleinberg in "Pore Size Distributions, Pore Coupling, and Transverse Relaxation Spectra of Porous Rocks." That is, diffusion of pore fluid molecules tends to average but variations in nuclear magnetization that occur within individual pores and between well-connected neighboring pores. For example, in a water-filled pore (FIG. 22a), diffusion mixes the bulk pore water with water in regions of high local radius of curvature that would not be displaced during capillary drainage (e.g., pendular rings at grain contacts and in roughness elements on pore surfaces). This results in a single $T_2$ that reflects the average volume-to-area ratio for the entire pore. Thus, the fraction of "true" BVI that is coupled into the free water volume will normally relax with a $T_2$ that is larger than the standard cutoff $T_2$, resulting in a CBVI value that underestimates the true BVI.

On the other hand, diffusion does not occur across a phase boundary and, hence, there is no diffusional coupling between water and other pore fluids. Thus, for example, water in a water-wet rock at irreducible conditions will have a short $T_2$ that reflects the dimensions of the near-surface pore volume elements it occupies (FIG. 22b). Consequently, the $T_2$ of irreducible water in a drained pore will normally be less than the standard cutoff value and, thus, CBVI true BVI.

Experimental Evidence.

Figure 23:
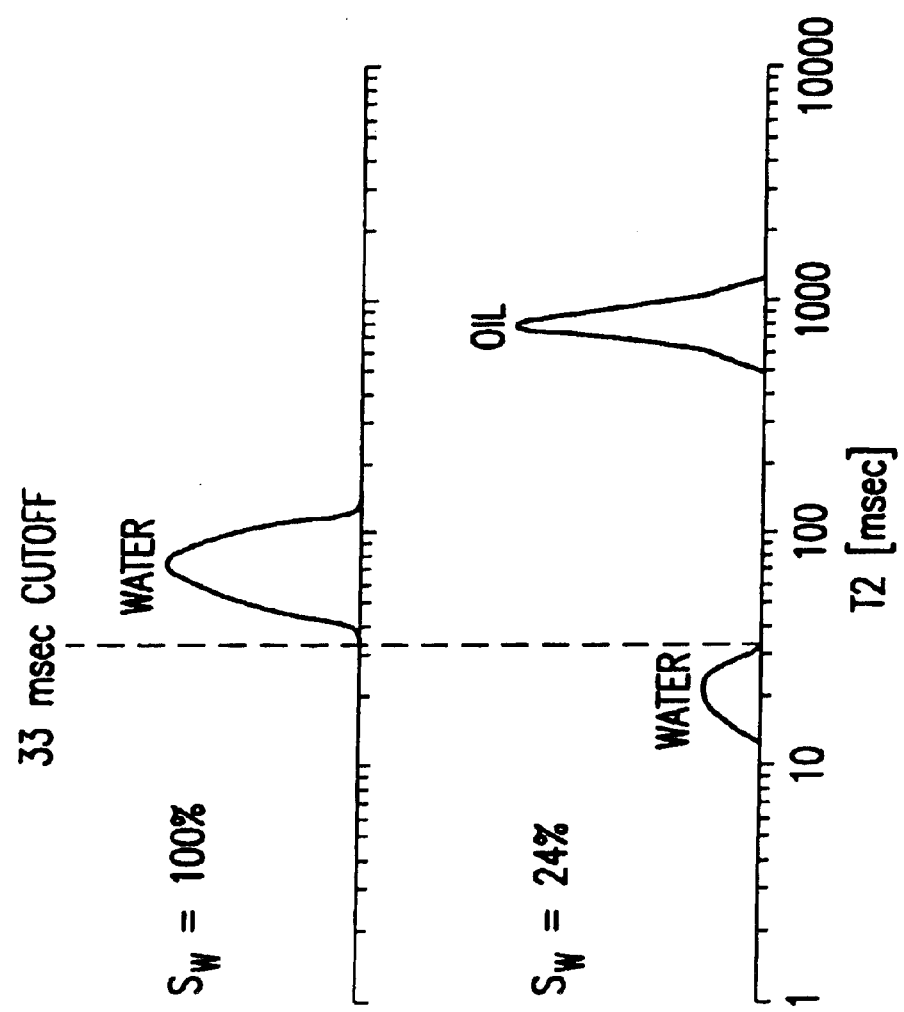
FIG. 23 is a laboratory NMR data for a porous ceramic showing $T_2$ shift for water after centrifuging under refined oil to $S_{WIRR}$ consistent with the conceptual model shown in FIG. 22.

An example of this effect is illustrated in FIG. 23 which shows a pair of $T_2$ spectra measured for a water-wet silicate ceramic sample in two different saturation conditions: saturated with water ($S_W$=100%) and after centrifuging under refined oil irreducible conditions ($S_{WIRR}$=24%). At $S_W$=100%, water shows a sharp peak at $T_2$ 80 ms; there is no signal with $T_2$<33 msec cutoff and, hence, CBVI=0. After centrifuging under oil, the water peak shifted down to $T_2$ 20 msec and there is no water signal with $T_2$>33 ms. The second, larger amplitude peak is caused by oil which exhibits a $T_2$ close to its bulk fluid value. The ratio of the integrated water signal amplitude to the total spectrum amplitude yields the true (i.e., known) water saturation ($S_W$=24%). Thus, CBVI with the standard 33 ms $T_2$ cutoff provides an accurate estimate of true BVI at low $S_W$ but is inappropriate at high SW.

The magnitude of the $T_2$ shift for water shown in FIG. 23 also is consistent with efficient coupling between free- and bound-water fractions. Assuming water is the wetting phase and remains in the fast-diffusion limit as SW varies, Eq. 2 becomes $$T_2 = \frac{S_w}{\rho_2}\left(\frac{V}{A}\right) \quad \text{(Eq. 3)}$$

because the volume of water in a pore at any $S_W$ is $S_W V$ while the interfacial contact area for water A is independent of $S_W$. Thus, $T_2$ is proportional to $S_W$ so reducing $S_W$ from 100% to 24% should result in a 4×reduction for $T_2$ of water which is, in fact, observed.

Figure 24:
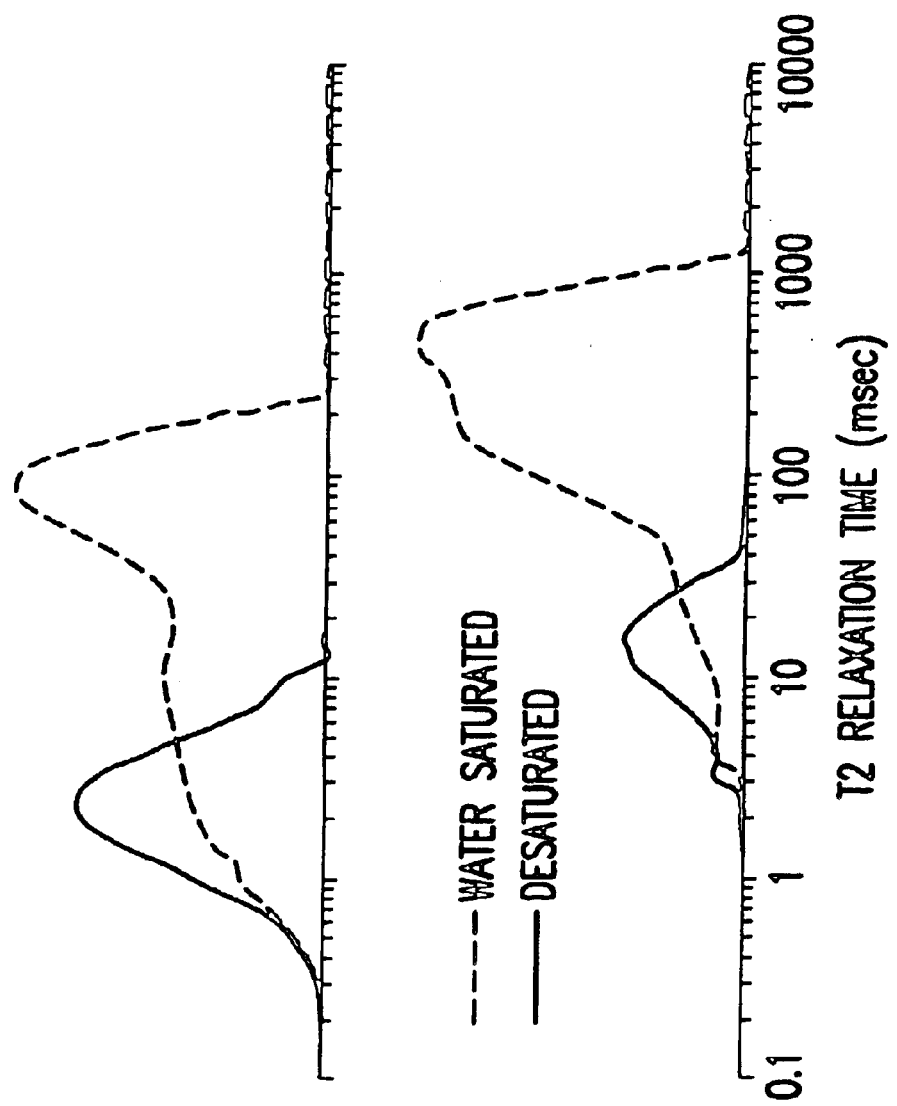
FIG. 24 is a laboratory NMR data showing $T_2$ spectra for two clean sandstones at 100% water saturation and after centrifuging to irreducible conditions.

Similar $T_2$ shifts are often, though not always, observed for irreducible water in rocks. FIG. 24 shows this effect for two clean sandstone core plugs at $S_W$=100% and after centrifuging in air to $S_{WIRR}$. Centrifuging expels the mobile water in large pores and, therefore, removes the long $T_2$ components in the spectra at $S_W$=100%. The observed build-up in short $T_2$ components after centrifuging implies that some water remains in the larger pores. Straley et al. (1991) also observed this effect for $T_1$ relaxation of water in sandstones and attributed it to diffusional coupling between bulk pore water and bound water associated with pore-lining clays. The effects of diffusional coupling are clearly evident in our data, but the bound water is not associated with clay.

Neither the ceramic (FIG. 23), nor the sandstone (FIG. 24) samples contain any clay.

The experimental data demonstrate that, even in very clean rocks, there can exist a layer of capillary bound water on pore surfaces. This is strong evidence supporting the second interpretation concept underlying the SBVI model, i.e., each pore size group has a non-zero irreducible water saturation associated with it. In general, the irreducible saturation associated with each pore size group will be a decreasing function of pore size and, hence, $T_2$.

Figure 22:
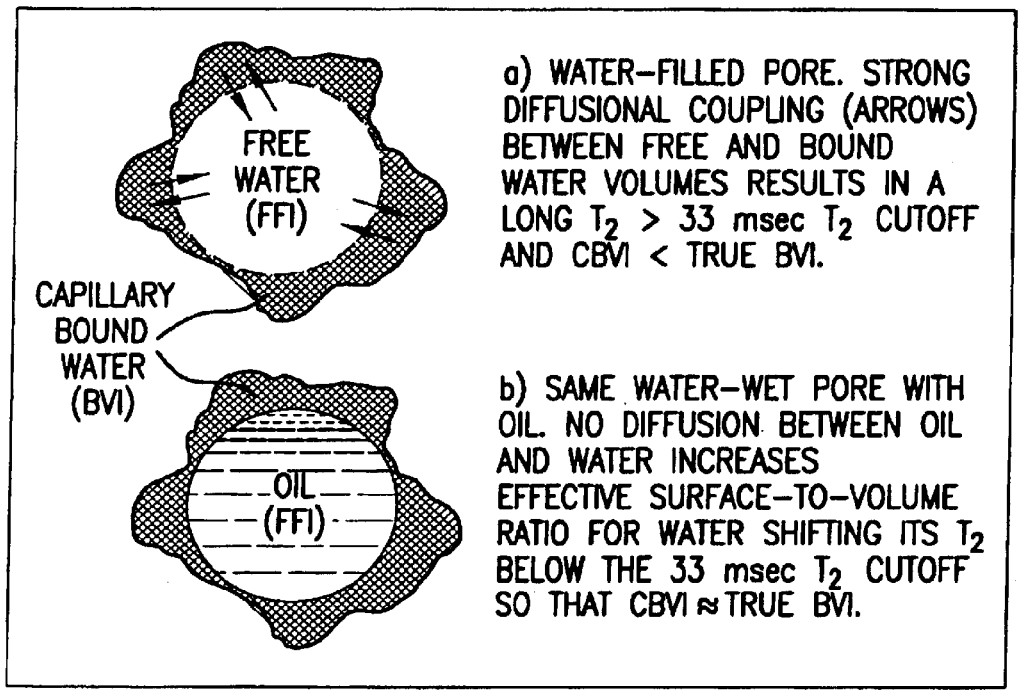
FIG. 22 is a conceptual basis of the SBVI model.

The main implication for log interpretation is that, for formations at high $S_W$, the division between free- and capillary-bound water is not well represented by a discrete $T_2$ cutoff. Evidently a model is needed in which each component, or "bin", in the $T_2$ spectrum has an associated value of $S_{WIRR}$. Finding the appropriate $S_{WIRR}$ function, or at least a discrete representation of it, is the key to implementing such a model. Theoretical Model Equation for $S_{WIRR}$. One of two approaches we investigated to obtain the required $S_{WIRR}$ function was to model the pore space of a rock as a bundle of water-wet capillary tubes. The model is based on an idealized geometry in which an annular layer of irreducible water surrounds a cylinder of non-wetting fluid at the center of the pore. By geometry, we have $$S_{WIRR}(T_2) = \frac{T_{2IRR}}{T_2}\left(2 - \frac{T_{2IRR}}{T_2}\right)$$

where R is the pore radius and $R_{WIRR} \leq R$ is the thickness of the irreducible water layer. In drainage of a bundle of capillary tubes, $R_{WIRR}$ is the radius of the largest tube not entered by non-wetting fluid. $R_{WIRR}$ can be interpreted as representing the average local radius of curvature of the near-surface pore volume occupied by bound water (FIG. 22). At equilibrium, the thickness of the water layer is related to the capillary pressure at irreducible conditions, $P_{CIRR}$, by $R_{WIRR}=2\sigma/P_{CIRR}$ (Eq. 5) where $\sigma$ is the interfacial tension between water and the non-wetting fluid and we have assumed perfect wetting (i.e., contact angle=0) for water on pore surfaces. Using A/V=2/R for cylinders in Eq. 2 gives $R=2\rho_2 T_2$ (Eq. 6) for a water-filled pore. Substituting Eq. 5 and Eq. 6 into Eq. 4 gives $$S_{WIRR}(T_2) = \frac{T_{2IRR}}{T_2}\left(2 - \frac{T_{2IRR}}{T_2}\right) \quad \text{(Eq. 7a)}$$

where $$T_{2IRR} = \frac{\sigma}{\rho_2 P_{CIRR}} \quad \text{(Eq. 7b)}$$

Thus, $S_{WIRR}$ is a quadratic function of relaxation rate $1/T_2$ that depends on capillary pressure and interfacial properties. $T_{2IRR}$ is a particular value of $T_2$ corresponding to the threshold pore size $R_{WIRR}$ in Eq. 5. The physical bound on saturation $0<S_{WIRR}\leq 1$ implies Eq. 7a is valid for $T_2 \geq T_{2IRR}$. An important point to note is that the $S_{WIRR}$ function is independent of the details (e.g., shape) of the $T_2$ spectrum.

Figure 25:
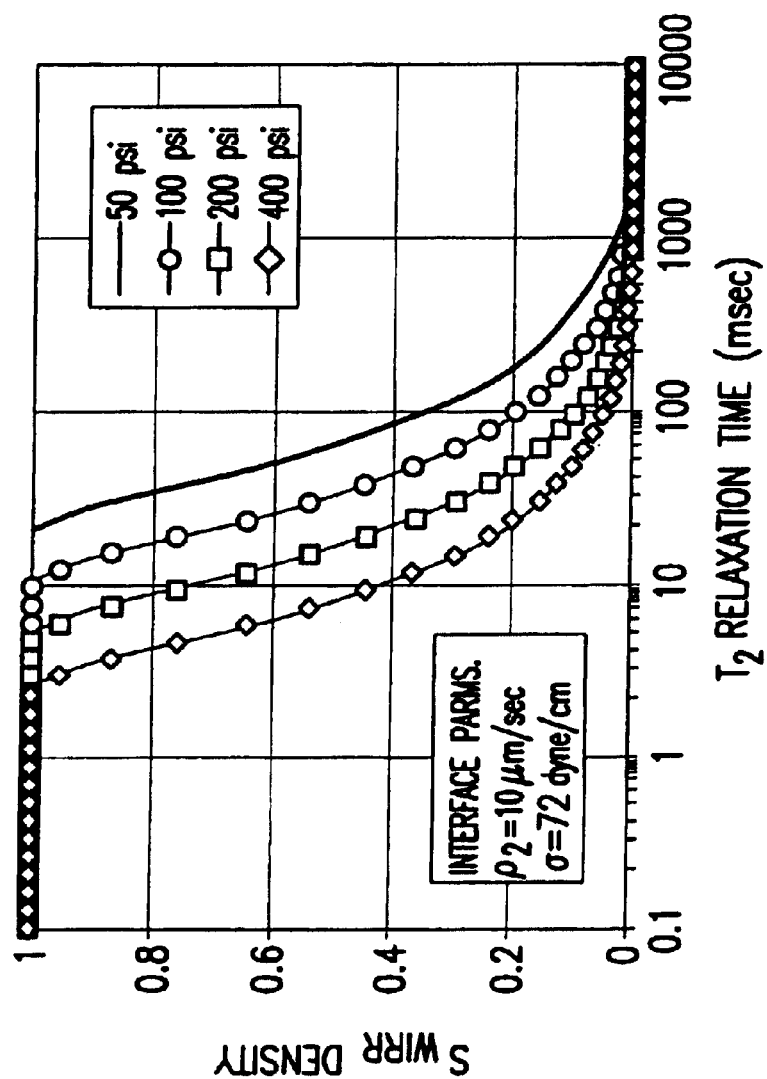
FIG. 25 is a $S_{WIRR}$ functions computed from capillary tube model (Eq. 7 in Appendix A) for an air-brine system at four different capillary pressures.

The $S_{WIRR}$ function (Eqs. 7) is plotted in FIG. 25 for an air-brine system ($\sigma=72$ dyne/cm) subject to a range of capillary pressures (50 to 400 psi) and a representative value of surface relaxivity for sandstones ($\rho_2=10$ μm/sec). As expected, the $S_{WIRR}$ curves move left (toward smaller $T_2$'s) as capillary pressure increases. Inspection of Eq. 7 shows that increasing $\rho_2$ or decreasing $\sigma$ (e.g., if oil were the non-wetting phase) would have the same effect. For the interfacial parameters assumed in FIG. 25, we find by integrating the $S_{WIRR}$ function that a fixed $T_2$ cutoff of 33 msec corresponds to an air-brine $P_{CIRR}$ of 132 psi, which is close the standard value of 100 psi normally used to calibrate fixed $T_2$ cutoffs (e.g., Straley et al., 1994).

Figure 26:
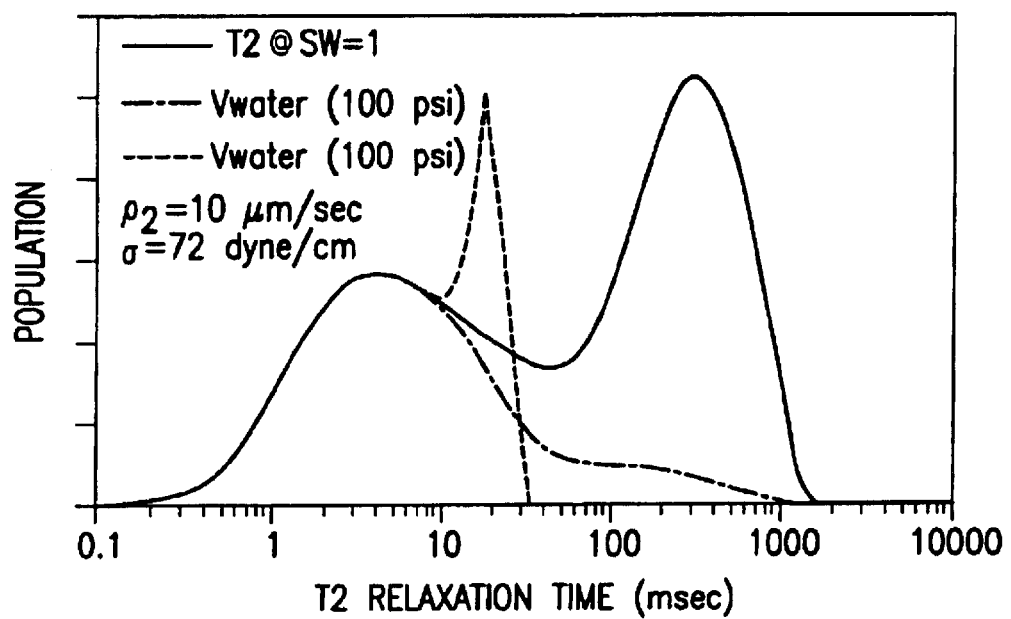
FIG. 26 is a pore-level distribution of BVI distribution and $T_2$ distribution for BVI in drained pores computed from capillary tube model (Eq. 7 in Appendix A) for an air-brine system at 100 psi.

FIG. 26 shows the pore-level BVI distribution for a rock sample with a bimodal pore size distribution at $P_{CIRR}$ (air-brine)=100 psi and the same interfacial parameters as in FIG. 25. The BVI curve (dot-dash) was obtained by multiplying the bin amplitudes in the water-saturated $T_2$ spectrum (solid) by the corresponding $S_{WIRR}$ values (100 psi curve in FIG. 25). Also shown in FIG. 26 is the predicted $T_2$ spectrum for BVI that would be observed for this sample at irreducible conditions (dotted). $T_2$ of BVI in the drained state is just $S_{WIRR}$. $T_2$ which can be shown by substituting Eq. 5 and the expression for V/A for the water annulus into Eq. 2. FIG. 26 shows the characteristic build-up in amplitude at short $T_2$ qualitatively similar to those observed in lab experiments (FIG. 24).

Empirical Model Equation for $S_{WIRR}$

The link between $S_{WIRR}$ and $T_2$ established in the preceding discussion was developed for a simple geometry consisting of capillary tubes that may, or may not, represent the effective geometry of complex pore systems in rocks. Two popular permeability models used with NMR data suggest an alternative form that does not rely on a specific model of the pore geometry. From Coates and Denoo (1981) and Morriss et al. (1993) we have $$K^{1/2} = 100 \, \phi^2 \, \frac{FFI}{BVI} \quad \text{(Eq. 8)}$$

and $K^{1/2}=4\phi^2 T_{2GM}$ (Eq. 9). By substituting $\phi (1-S_{WIRR})$ for FFI and $\phi S_{WIRR}$ for BVI, in the right-hand side of Eq. 8, can be set equal to Eq. 9 to give $$\frac{1 - S_{WIRR}}{S_{WIRR}} = 0.04 \, T_{2GM} \quad \text{(Eq. 10)}$$

Equation 10 is easily rearranged to link the inverse of $S_{WIRR}$ (fractional units) and the geometric mean $T_2$, $T_{2GM}$ (ms), through the linear relationship, $$\frac{1}{S_{WIRR}} = 0.04 \, T_{2GM} + 1 \quad \text{(Eq. 11)}$$

Figure 27:
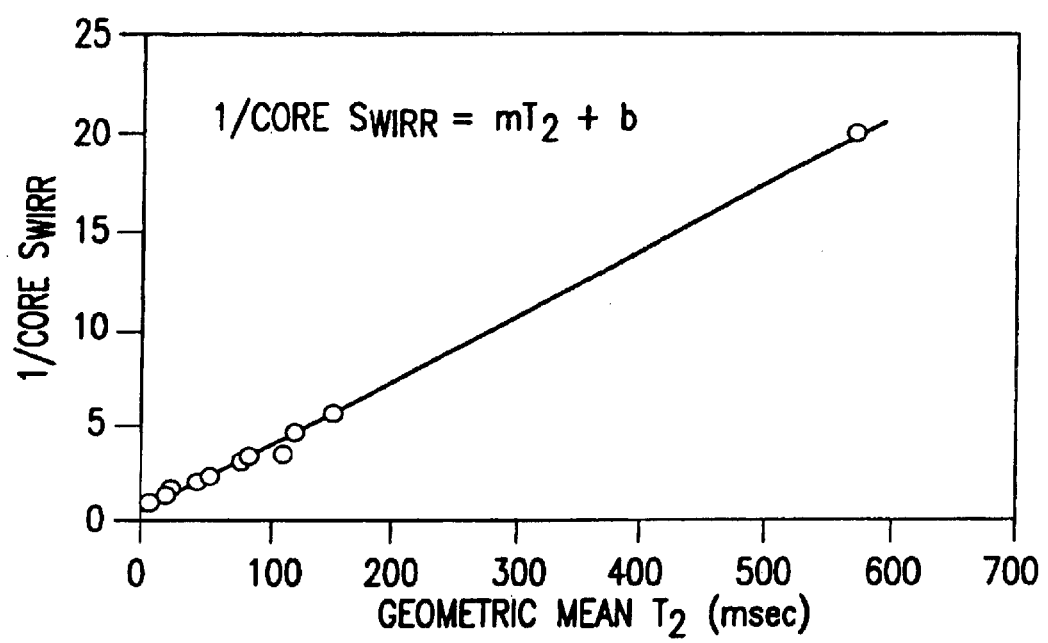
FIG. 27 is a geometric mean $T_2$ measured at $S_W=100\%$ vs. reciprocal irreducible saturation from standard core analysis for a suite of sandstone plugs illustrating linear behavior predicted by Eq. 12 in Appendix A.
Figure 28:
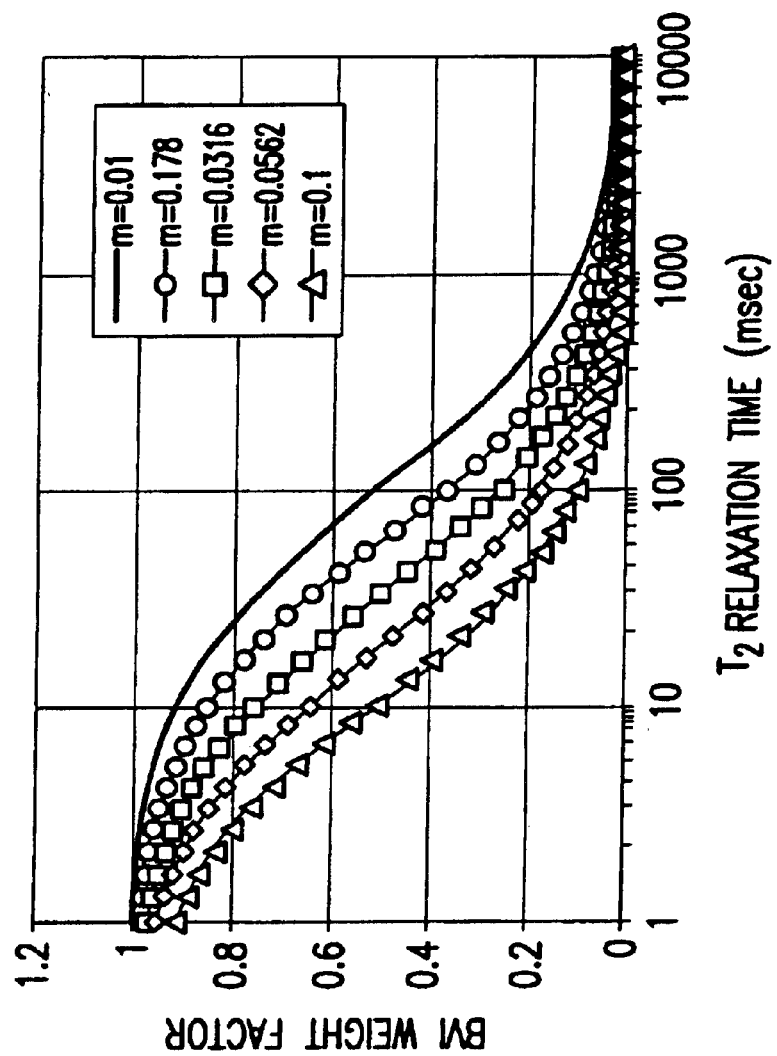
FIG. 28 illustrates empirical SBVI weighting function curves for different m values and b=1.
Figure 29:
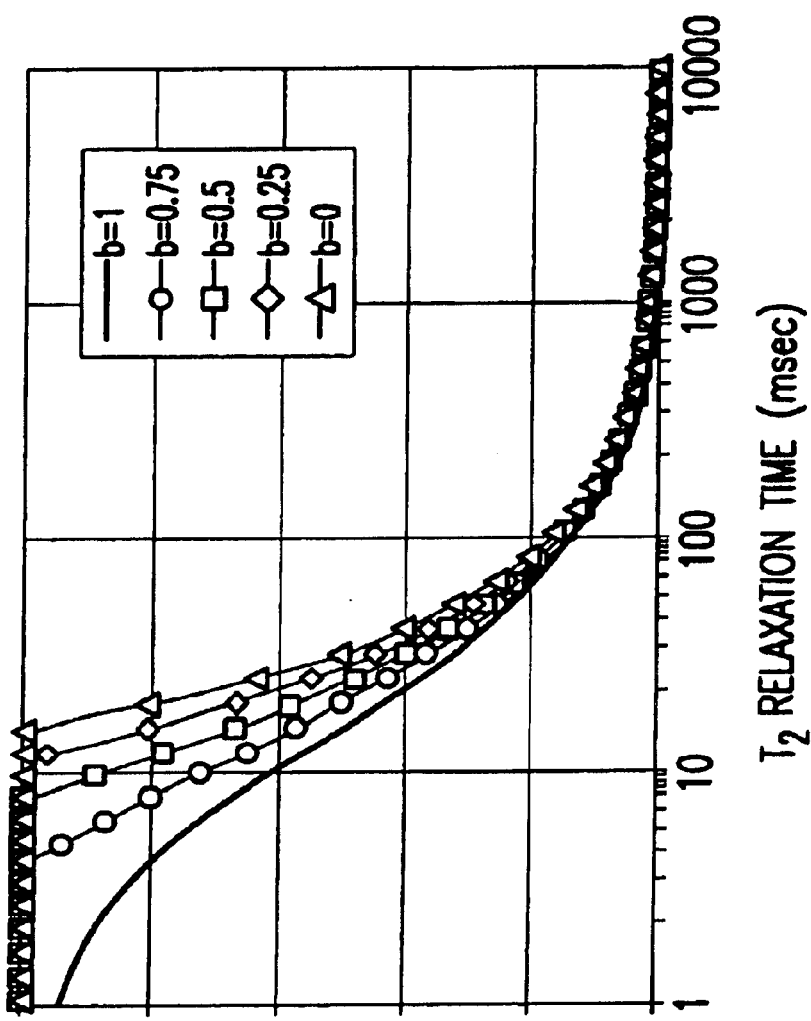
FIG. 29 is empirical SBVI weighting function curves for m=0.0618 and different values of b.

Results from a set of Cooper Basin, Australia core plugs (see log example 2) are shown in FIG. 27 which support the linear form suggested by Eq. 11. Similar results have been observed in several other studies. Basic data from the cores are listed in table 1. NMR measurements were performed on brine-saturated plugs to compute the $T_{2GM}$ values. The plugs were then de-saturated to measure the irreducible water saturation. For the purposes of this study, "irreducible" conditions are defined as the water saturation corresponding to a one percent fractional flow of water. De-saturation pressures were calculated by applying the procedure described by Marschall et al. (1995) to mercury injection measurements made on end trim sections. $S_{WIRR}$ was calculated by taking the ratio of the NMR porosities from the de-saturated and saturated states. In the limit of a narrow range of pore sizes, the observed NMR decay converges to a single exponential, and $T_{2GM}=T_2$. This suggests Eq. 11 may be used to estimate $S_{WIRR}$ associated with each component in a $T_2$ spectrum such that $$\frac{1}{S_{WIRR}} = mT_2 + b \qquad \text{(Eq. 12)}$$

where each pore size ($T_2$) is shown to retain a decreasing fraction of irreducible water with increasing pore size. Thus, Eq. 12 is our second trial weighting function for water-saturated T2 distributions. FIG. 28 shows a plot of Eq. 12 for different values of m and b=1. When Eq. 12 is compared with Eq. 7a, it can be seen that m should be sensitive to variations in the ratio of inter-facial tension divided by the product of surface relaxivity and capillary pressure. As shown later, we observe different values of m for sandstones and carbonates which are known to have different surface relaxivities. FIG. 29 shows that changing b causes the maximum plausible weight of 1 to be applied to components with a $T_2$ smaller than $(1-b)/m$.

Calibration to Core

To implement the SBVI model, each component amplitude of the $T_2$ spectrum $P_i$ is multiplied by a coefficient ci and then the products are summed, i.e., $$SBVI = \sum_i c_i P_i$$

(Eq. 13) where the subscript represents the bin number. The SBVI coefficients, $c_i$, represent the irreducible water saturation associated with each T2 bin. In the preceding section, we obtained two alternate expressions for SWIRR as a function of T2. Both expressions contain adjustable parameters which must be obtained by calibration against core data.

Preferably, the calibration process should make maximum use of the available information and be consistent with the intended application. Consistency with the application is achieved by performing laboratory MR measurements at the same echo spacing ($T_E$=1.2 msec) that will be used to acquire the logs, and by using the same relaxation time components (typical 10 bins@4, 8, . . . , 2048 msec) that will be used when processing the raw log data. The lab MR distributions (m T2 bins) can be combined in a series of n simultaneous equations, one for each core, of the form, $$\begin{aligned}S_{WIRR1}\theta_1 &= c_1 P_{1,1} + c_2 P_{2,1} + \cdots + c_x P_{x,1} \\ S_{WIRR2}\theta_2 &= c_1 P_{1,2} + c_2 P_{2,2} + \cdots + c_x P_{x,2} \\ &\vdots \\ S_{WIRRn}\theta_n &= c_1 P_{1,n} + c_2 P_{2,n} + \cdots + c_x P_{x,n}\end{aligned} \qquad (14)$$

so that all of the information contained in the $T_2$ distributions is used. Eq. 14 can be solved for the coefficients if the system is determined. The direct solution approach may not work in several instances depending on the number and characteristics of the samples. Relief from both problems can be obtained by substituting an expression from a saturation function, such as Eq. 7a or Eq. 12, for each of the coefficients, i.e., $c(T_2)=S_{WIRR}(T_2)$. Thus, the system of equations can be simplified to one free parameter if Eq. 7a is used and one or two free parameters, depending on how b is constrained, if Eq. 12 is used. Care should be taken in setting up the least-squares solution of Eq. 14 to constrain the individual coefficients to be $\leq 1$. If left unbounded, the function linking $S_{WIRR}$ and $T_2$ may predict nonphysical values for some components in the $T_2$ spectrum.

$S_{WIRR}$ Model Selection

Figure 30:
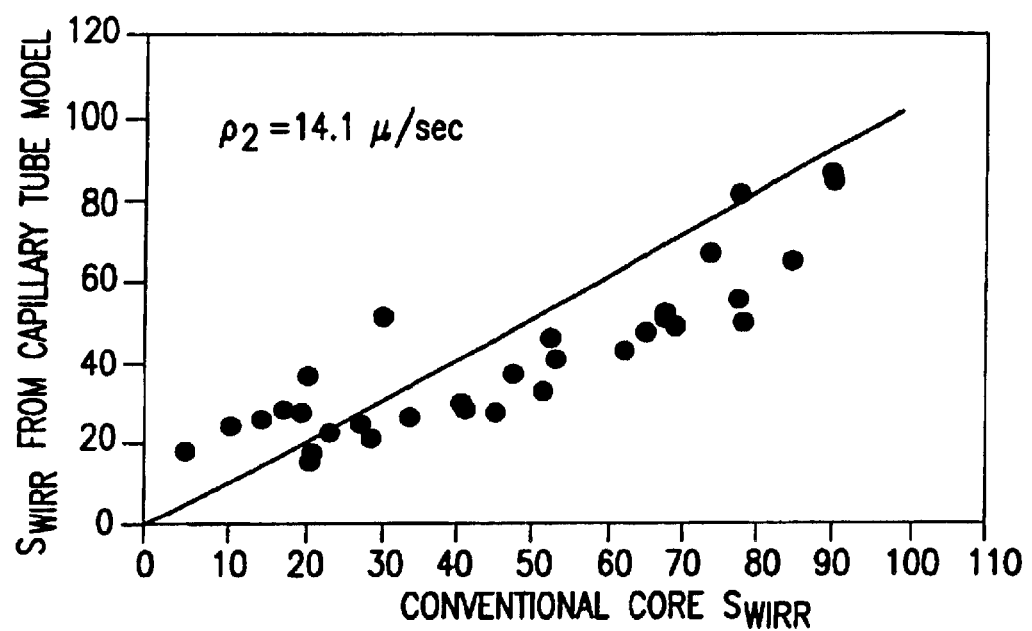
FIG. 30 shows that capillary tube model $S_{WIRR}$ predictions do not vary linearly with the measured core saturations.
Figure 31:
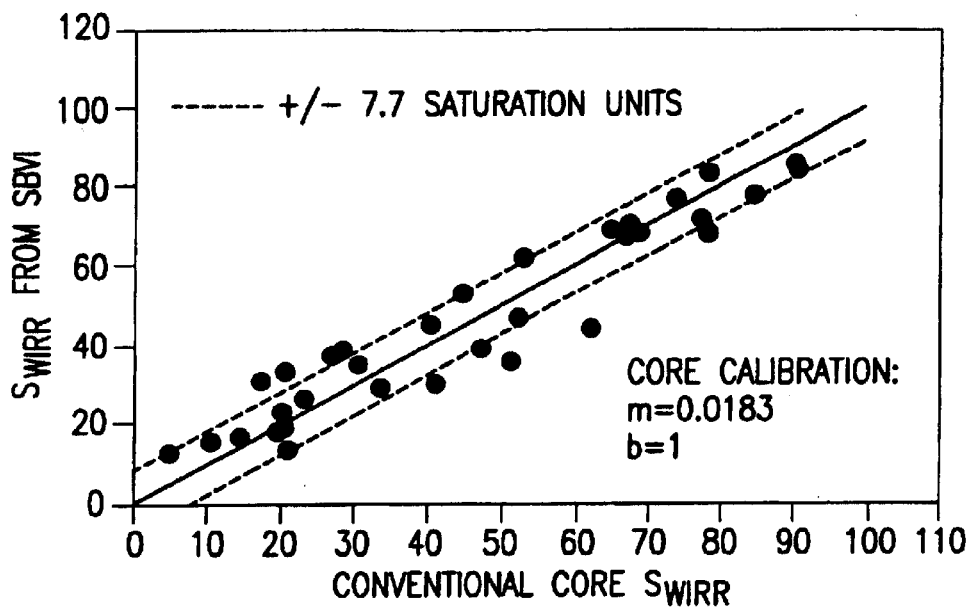
FIG. 31 shows calibrated SBVI results compared to core $S_{WIRR}$ for the data set shown in FIG. 30.

The calibration procedure described above was used to evaluate both trial $S_{WIRR}$ functions. The results in FIGS. 30 and 31 show that the empirical function (Eq. 12) is superior to the theoretical model (Eq. 7) for deriving SBVI coefficients.

In the case of the capillary tube model, the system of equations involves one free parameter, the surface relaxivity, $\rho_2$; all other quantities (core $S_{WIRR}$, de-saturation pressures, and the saturated state bin porosities) are known. Taken in combination with the actual de-saturation pressures, the optimum $\rho_2$ (14.1 $\mu$m/sec) was used to compute SBVI coefficients on a sample-by-sample basis that were applied to the saturated-state $T_2$ distributions. The resulting BVIs, divided by porosity, give $S_{WIRR}$ values that are compared with the core values in FIG. 30. On average, the predicted irreducible saturations are biased toward lower saturations by approximately 6 saturation units. In addition, the predicted values do not appear to vary linearly with the measured core saturations.

Calibration of the empirical model was done by using Eq. 12 for the $T_2$ weighting function with an intercept of 1. Experience with the empirical weighting function indicates the best results are obtained when the intercept is constrained to 1 in most instances. Predicted BVI values were computed by using the calibration value of 0.0183 for the slope and the imposed intercept in Eq. 12 to compute a single set of SBVI weights that were applied to the saturated-state $T_2$ distributions. The predicted $S_{WIRR}$ for each sample is shown in FIG. 31 compared with the core results. The mean difference between predicted and measured $S_{WIRR}$ values is zero with a standard deviation of 7.7 saturation units. The empirical weighting function $S_{WIRR}$ predictions also correlate linearly with measured core saturations.

Figure 32:
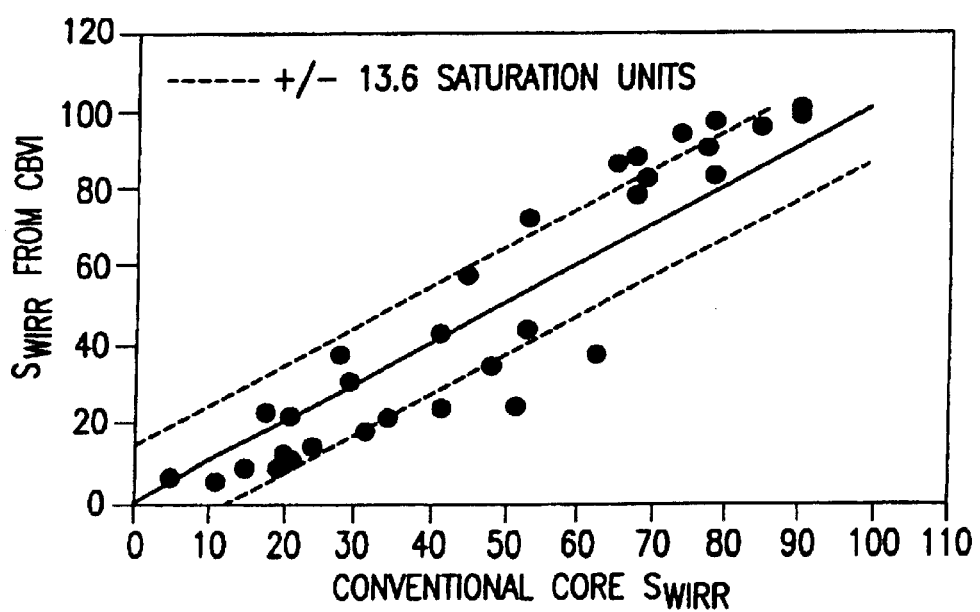
FIG. 32 shows that precision of optimized $T_2$ cutoff results are 2× worse than SBVI results shown in FIG. 31.

FIG. 32 compares $S_{WIRR}$ from CBVI to core $S_{WIRR}$ data. CBVI was obtained using a fixed $T_2$ cutoff of 61.5 ms which gives a zero mean difference between predicted $S_{WIRR}$ and the values from the cores. Cutoff values range from 12 to 700 ms for the individual cores in this example. The optimum cutoff value seems to strike a compromise among the group which appears to cause most of the points below $S_{WIRR}$ of 50% to be underestimated, and those with higher $S_{WIRR}$ to be overestimated. In fact, FIG. 32 shows that few points actually fall on, or near, the parity line.

Two important observations emerge when the SBVI results (FIG. 31) are compared with the fixed cutoff results (FIG. 32). First, more of the SBVI points fall on, or near, the parity line meaning the SBVI model produces accurate results more often in conditions where the $T_2$ cutoff varies. Secondly, the precision of the SBVI results is better than the precision of the fixed cutoff results by almost a factor of two.

Application to Log Processing

The empirical weighting function approach has been implemented in NUMAR's commercial log data processing software. Generic equations for the weighting function are presented in a later section for different rock types when a custom calibration is unavailable.

The SBVI model is designed to handle the case where irreducible and producible water volumes are strongly coupled by diffusion. As discussed above, CBVI will tend to underestimate the true BVI in such formations and SBVI will give the best results. In other cases where the diffusional coupling between FFI and BVI is weak, e.g., finely laminated silty sands with structural clays and hydrocarbon-bearing formations at, or near, $S_{WIRR}$, the SBVI model will tend to underestimate the actual irreducible water content, and the cutoff method will provide a better estimate of the true BVI. For the general case of variable hydrocarbon saturation, experience has shown the best results are obtained by setting the MRIL BVI output, MBVI, equal to the maximum of SBVI and CBVI, i.e., MBVI=max (SBVI, CBVI) (Eq. 15)

LOG EXAMPLES

Example 1

This example shows that the calibration technique described above works well even when only a few laboratory measurements are available to calibrate the SBVI model. Table 2 lists porosity, permeability, irreducible water saturation, fixed T2 cutoff values and de-saturation pressures for nine core plugs taken from mediumto-high porosity sandstone formations. Fixed cutoff values for these samples range from 14.2 to 87 ms. The arithmetic and logarithmic means of the fixed cutoffs are 41.8 and 33.9 ms, respectively.

Figure 33:
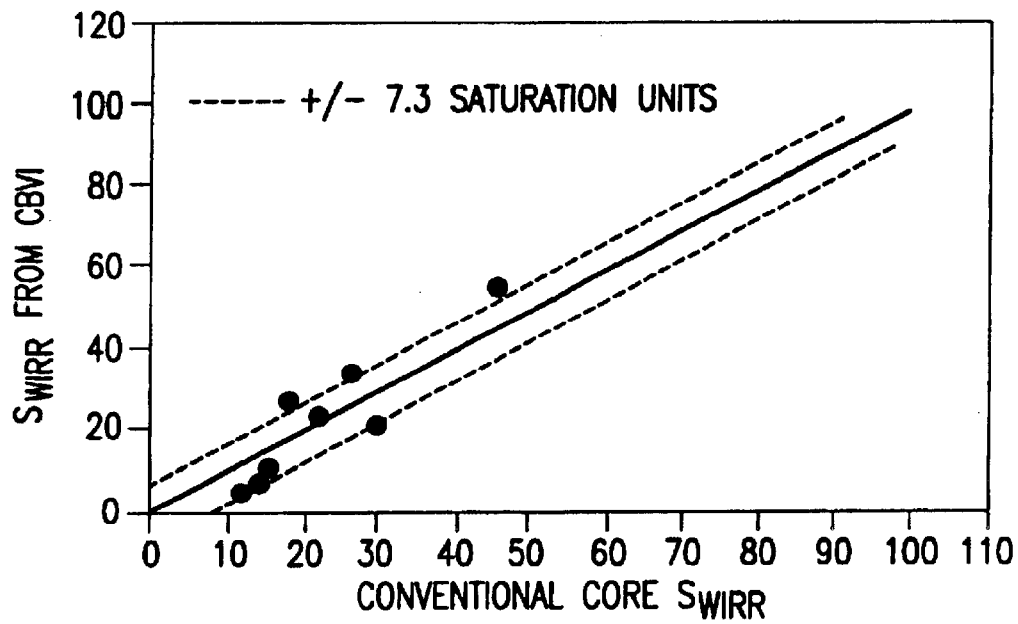
FIG. 33 illustrates optimum $T_2$ cutoff of 31.24 ms applied to the core data from Example 1 in Appendix A.
Figure 34:
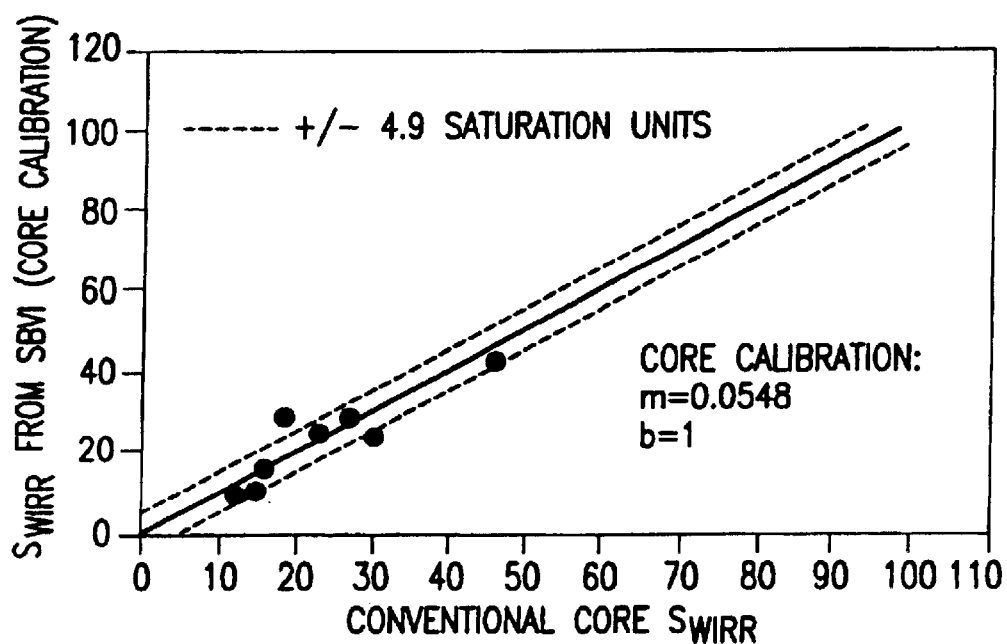
FIG. 34 illustrates that SBVI precision is 1.5×better than the optimum fixed $T_2$ cutoff results for Example 1 in Appendix A.

The laboratory NMR echo trains were processed to obtain 10-bin distributions that were used to evaluate the fixed T2 cutoff and SBVI methods on these samples. A fixed cutoff of 31.24 ms was found to give an unbiased average difference between the cutoff $S_{WIRR}$ and the measured $S_{WIRR}$ when the cores were de-saturated to the capillary pressures listed in Table 2. As shown in FIG. 33, the standard deviation of the difference between the fixed cutoff and the core $S_{WIRR}$ values is 7.3 saturation units (s.u.). The SBVI calibration procedure gave m=0.055 in Eq. 12 when b was constrained to 1. The differences between the predicted and measured irreducible saturations decreased when the SBVI model was applied to the same data, as shown in FIG. 34. The mean difference (SBVI minus core $S_{WIRR}$) is 0.3 s.u. with a standard deviation of 4.9 s.u. which represents an important improvement in BVI precision compared to the fixed cutoff results.

Figure 35:
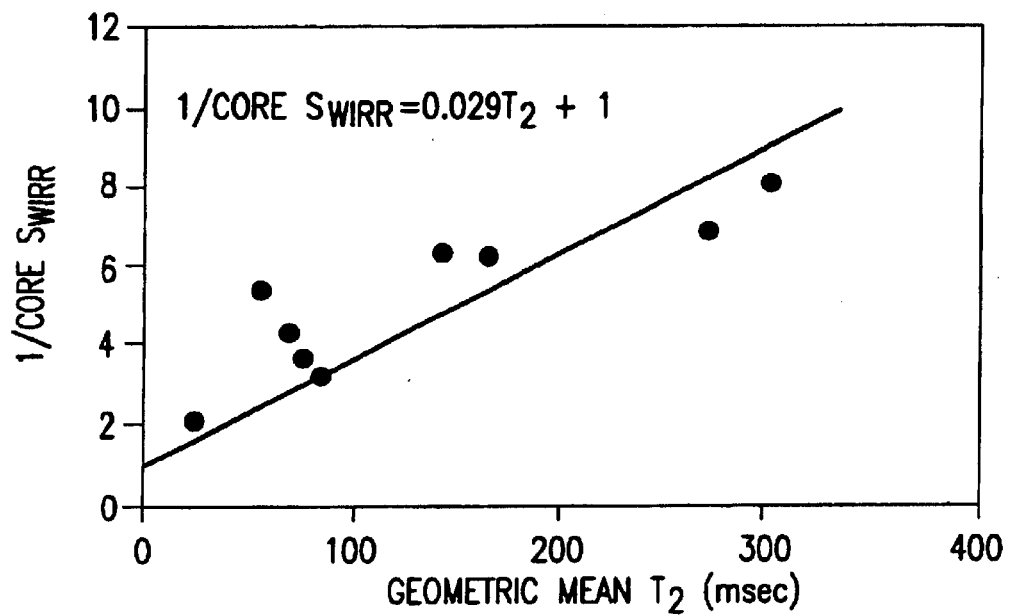
FIG. 35 shows that $T_{2GM}$ data do not always obey the b≦1 limit as shown here for Example 1 in Appendix A.
Figure 36:
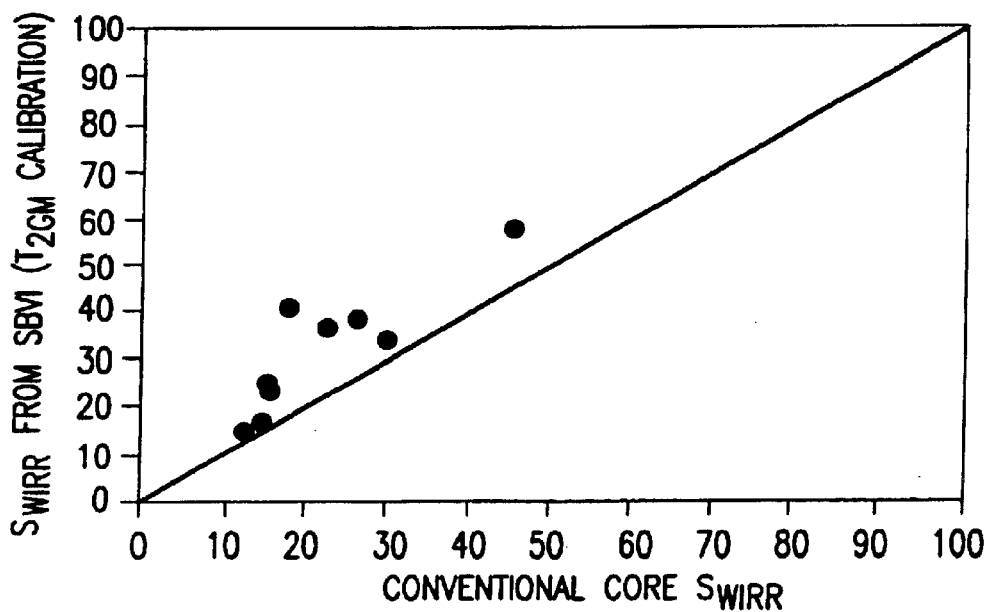
FIG. 36 shows how using $T_{2GM}$ in Eq. 12 in Appendix A (results shown in FIG. 35) can sometimes bias the SBVI calibration.

The data from this study also demonstrates how following a different SBVI calibration procedure can affect the results. The empirical relationship between $T_2$ and $1/S_{WIRR}$ was first illustrated in terms of the geometric mean $T_2$ (FIG. 26). It is tempting to combine core $S_{WIRR}$ data with $T_{2GM}$ values from saturated-state MR lab distributions to calibrate Eq. 12 and compute the coefficients for the SBVI model. FIG. 35 shows the data for this example and a least-squares fit of Eq. 12 with b=1. Coefficients for the SBVI model were computed from the fitted function and applied to the saturated-state distributions. The results presented in FIG. 36 show a consistent overestimation of SWIRR. Although the geometric mean $T_2$ may be a useful first-order parameter for comparing individual distributions, it is not an appropriate parameter for calibrating the SBVI model.

Figure 37:
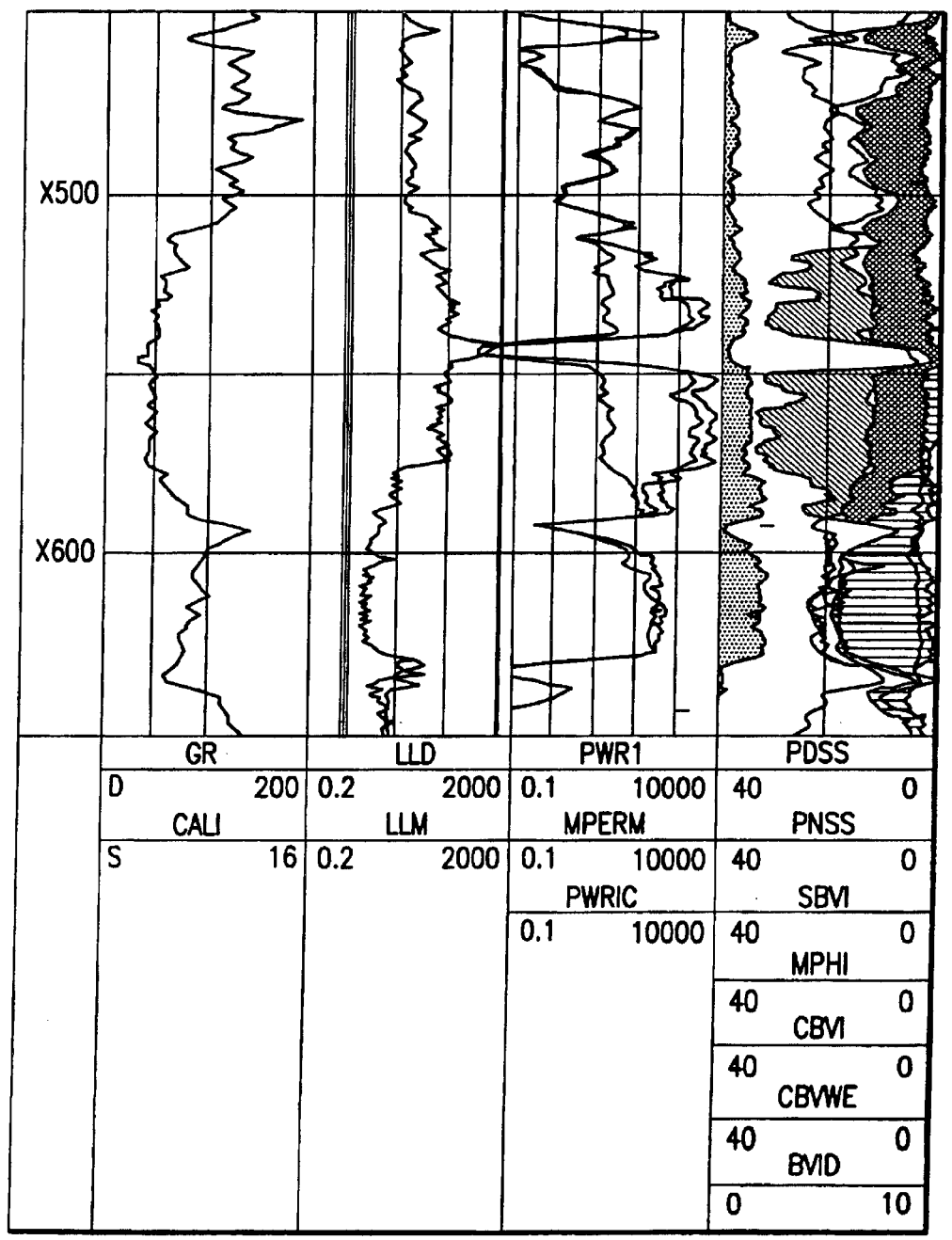
FIG. 37 is a CBVWE curve computed from the resistivity logs, neutron-density porosity, and Rw from the water zone confirming the accuracy of SBVI above the gas/water contact at X576.

The core plugs in this study were taken from various depths spanning a 476-ft interval of a water/hydrocarbon column drilled with oil-based mud. A portion of log from the interval is shown in FIG. 37. Track I shows gamma ray and caliper logs, Track II contains deep and shallow reading resistivity logs, presented in Track III are three calculations of permeability, and Track IV shows the MRIL porosity response, raw neutron and density porosity readings in sandstone units, the SBVI bulk volume irreducible, a 22.63-msec fixed $T_2$ cutoff-BVI (CBVI), a bulk volume water from resistivity logs (CBVWE), and the difference between the SBVI and CBVI values, BVID. The MR log in this example was acquired with a wait time of 10 seconds and 500 echoes per CPMG experiment with an inter-echo spacing of 1.2 msec.

A gas/water contact exists at X576 that is easily identified on the resistivity logs. Immediately above the contact a large gas cross-over (slant-line shading) is observed between the neutron and density logs where a decrease in MRIL porosity occurs because of the hydrogen index effect of unflushed gas. Below the gas/water contact, the fixed cutoff method produces some near-zero readings and is smaller than the SBVI result (white shading) by about 2 p.u., on average, as indicated by the black shaded area in Track IV. Above the contact, CBVI increases and approaches SBVI in the shaley sands near the top of the interval.

CBVWE was computed by using the resistivity and nuclear logs together with a water resistivity value obtained in the water-bearing sand below the gas/water contact. The cross-hatch shading to the left of CBVWE shows the fraction of the NMR porosity containing hydrocarbons, and moveable water (horizontal line shading) is indicated where CBVWE is larger than SBVI. CBVWE is an independent quantification of irreducible water content above the gas/water contact that confirms the accuracy of the SBVI model for these formations.

Accurate data for BVI and FFI are important for permeability calculations that involve FFI/BVI ratios such as the one used in this example (Eq. 8). The MPERM curve in Track III was computed by using MPHI for porosity, SBVI for BVI, and the difference between MPHI and SBVI for FFI. Used in this way, the function will give good estimates of permeability where the MR porosity reading is unaffected by gas. In the zones where the MR porosity is affected by gas, MPERM is too small because the difference between MPHI and SBVI underestimates FFI. The difference between porosity from the nuclear logs and SBVI gives a better estimate of FFI for calculating permeability in this situation. The PMRI curve was computed in this manner and is a more reasonable representation of permeability in the gas zones. Similarly, the PMRIC curve was computed by combining CBVI with the nuclear log porosity to show how BVI accuracy influences the calculated permeability.

Example 2

A more extensive core study was carried out to develop a global BVI and permeability model for the Cooper Basin, Australia. In all, thirty four core plugs were available from conventional cores obtained in thirteen wells and four formations. Table 1 shows the range of porosity, permeability, irreducible water saturation, fixed $T_2$ cutoff values, and de-saturation pressures spanned by the cores. As shown previously, the SBVI model represents the aggregate data set and achieves nearly a factor of two improvement in precision compared to the fixed cutoff method.

Figure 38:
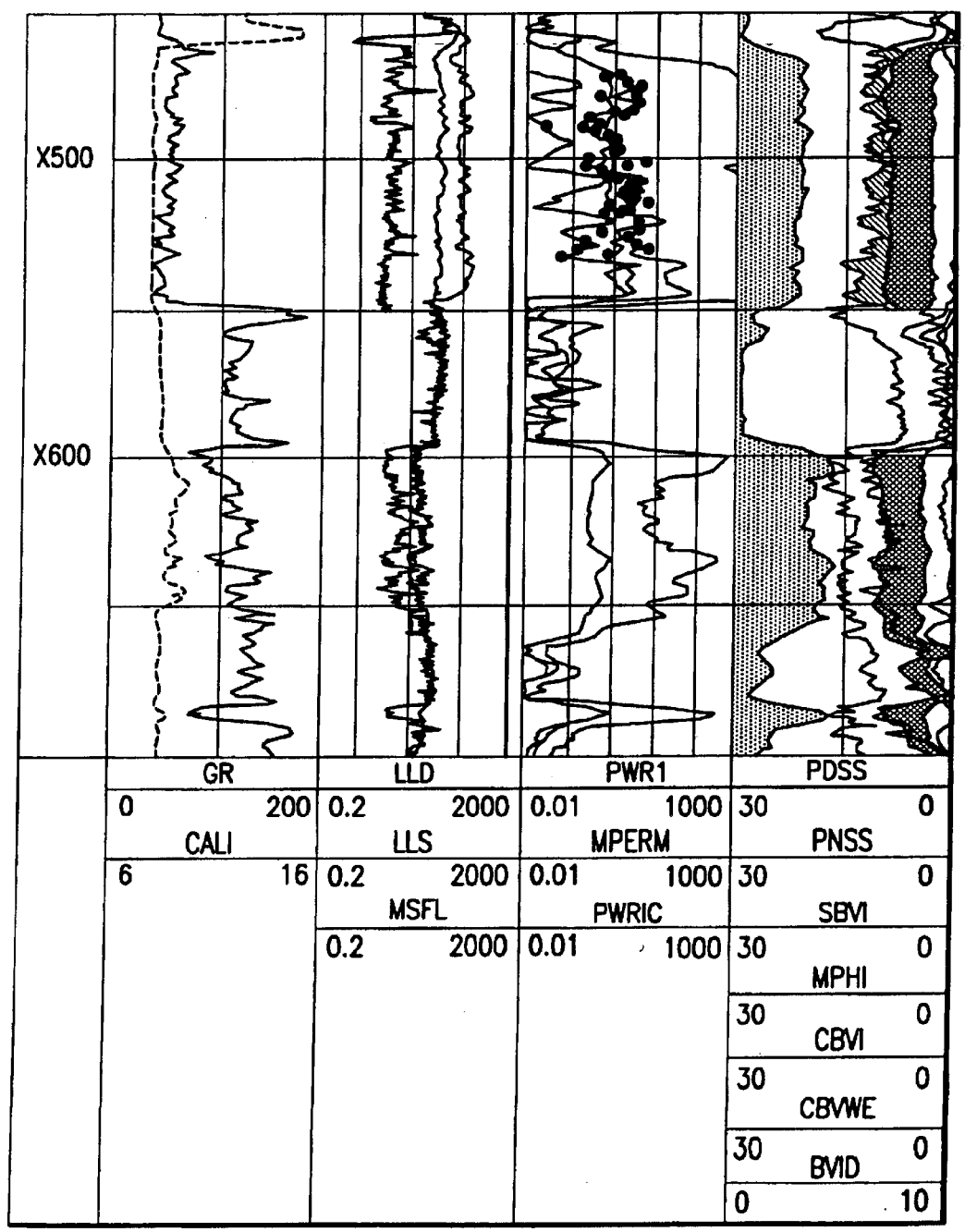
FIG. 38 illustrates resistivity logs and production results confirming the SBVI answer in this low porosity, low permeability example from South Australia where a typical fixed T2 cutoff under-estimates BVI.

The log interval presented in FIG. 38 uses the same presentation format as the previous example. The data were acquired in an 8.5-in. borehole drilled with a KCl-polymer (48 Kppm NaCl equivalent) mud. A 12-second wait time was used to collect 300 echoes of MR data at an inter-echo spacing of 1.2 ms.

This example illustrates how the SBVI model can be useful in low-porosity, low-permeability formations. The core study for this example did not include samples from this well. However, 6 of the samples were from the sandstone formation at the top of the interval which is above the field gas/water contact in this well.

The log shows a clean sandstone formation at the top and a shaley sandstone formation at the bottom of the interval which are separated by an intervening shale. In both sandstone formations, the SBVI model indicates significantly larger irreducible water content compared to a typical sandstone fixed-T2 cutoff prediction. CBVI is near zero throughout most of the upper sand meaning that little, or no, signal is associated with rapid decay components. These conditions are what SBVI was designed to remedy. As shown by the black shaded area in Track IV, BVI from the SBVI model is larger than CBVI by up to 4.5 p.u. in the lower sand and 2.5–3 p.u. in the upper sand.

CBVWE was computed from resistivity using a formation water salinity supplied by the oil company. The match between CBVWE and SBVI throughout the interval indicates that both formations are at irreducible water conditions. This conclusion is supported by production results; the upper sand has been producing for two months and is currently not producing formation water.

All of the log-derived permeability curves shown in this example were computed using a model calibrated for the Cooper Basin. Good agreement between the conventional core permeabilities (dots) and the PMRI curve exists for most of the points in the upper gas sand. Some natural and drilling induced fractures were observed in the recovered core, especially near the bottom of the cored interval, that may account for some of the larger differences between PMRI and the core values.

The disparity between SBVI and CBVI in these low-permeability rocks has important implications in the permeability calculation as shown by the comparison of the PMRI and PMRIC curves. In the upper sand, PMRIC from CBVI is up to 3–4 orders of magnitude greater than the core permeabilities. In the lower, shaley sand, CBVI produces permeability indications that are 1–2 orders of magnitude greater than PMRI and MPERM.

Proper interpretation of the resistivity logs in this well was possible because of the operator's experience. Inaccurate, or unknown, knowledge of formation water salinity can lead to large errors in reserves estimates that are based on analysis of resistivity logs. For zones at irreducible conditions, BVI from NMR logs provides an upper limit on reserves calculations. In the broader picture, a salinity-independent determination of BVI from NMR measurements can be a valuable aid to planning field development.

Operational Considerations

Data Acquisition and Processing. The SBVI model carries with it the implicit assumption the $T_2$ distributions it is applied to are undistorted. Therefore, it is important to plan the acquisition and data processing parameters to achieve the truest representation of the incremental porosities for each relaxation time component. Specifically, (1) The data should be acquired with a wait time long enough to fully polarize all components in the $T_2$ spectrum so that polarization corrections (Morriss, et al., 1996) are not required. (2) The number of echoes should be large enough to include the smaller of (a) the number required for the signal to decay to the noise level and/or (b) a number corresponding to a pulsing time equal to twice the largest decay component in the spectrum. (3) The raw NMR data should be processed with a $T_2$ basis set that brackets the range of decay times in the signal.

Generic SBVI Models

Figure 39:
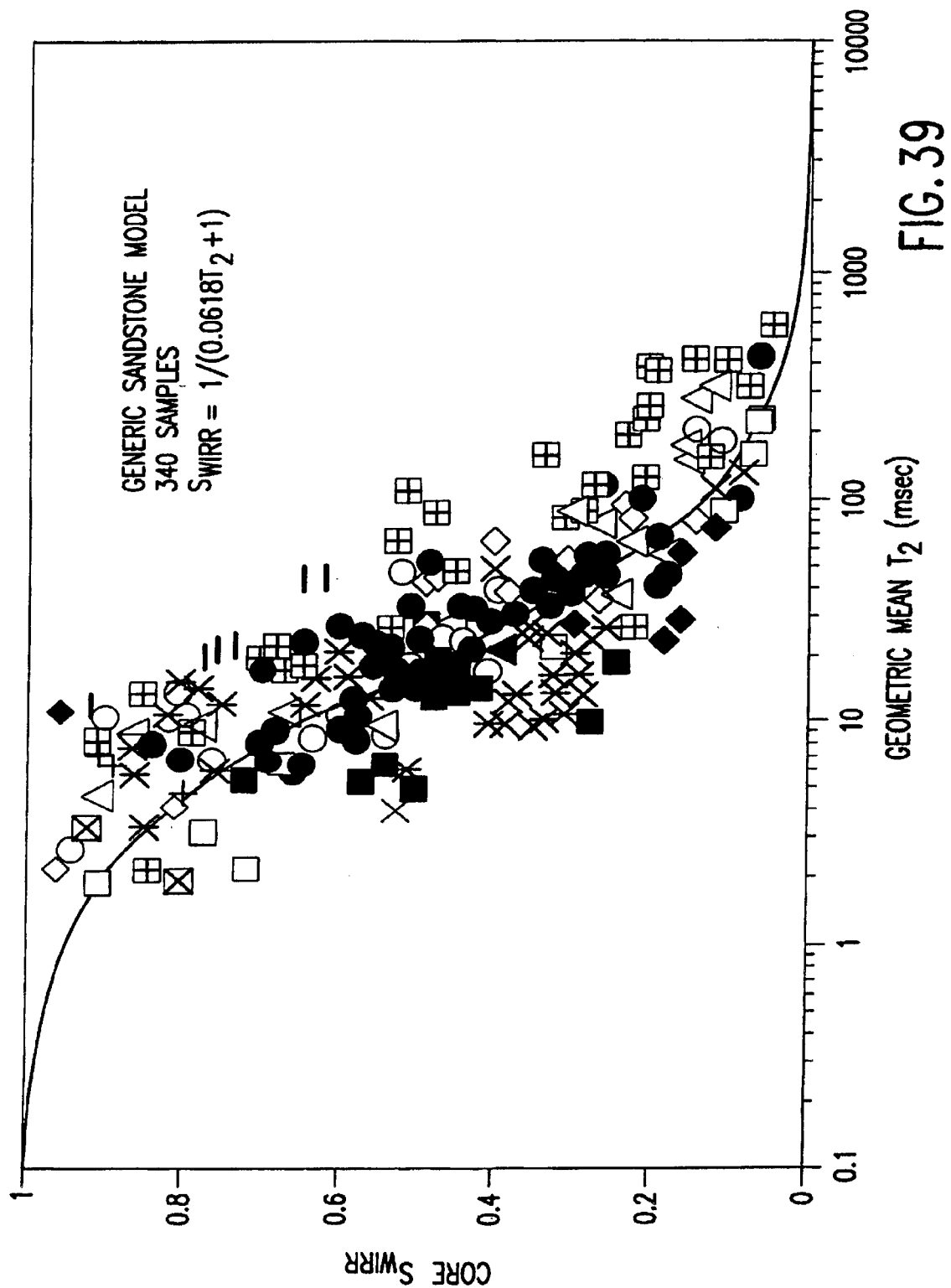
FIG. 39 illustrates how samples from 22 geographical/formation groups were used to build a generic sandstone SBVI model. The generic model will give good results in many situations where an optimum calibration is unavailable, but with less precision.
Figure 40:
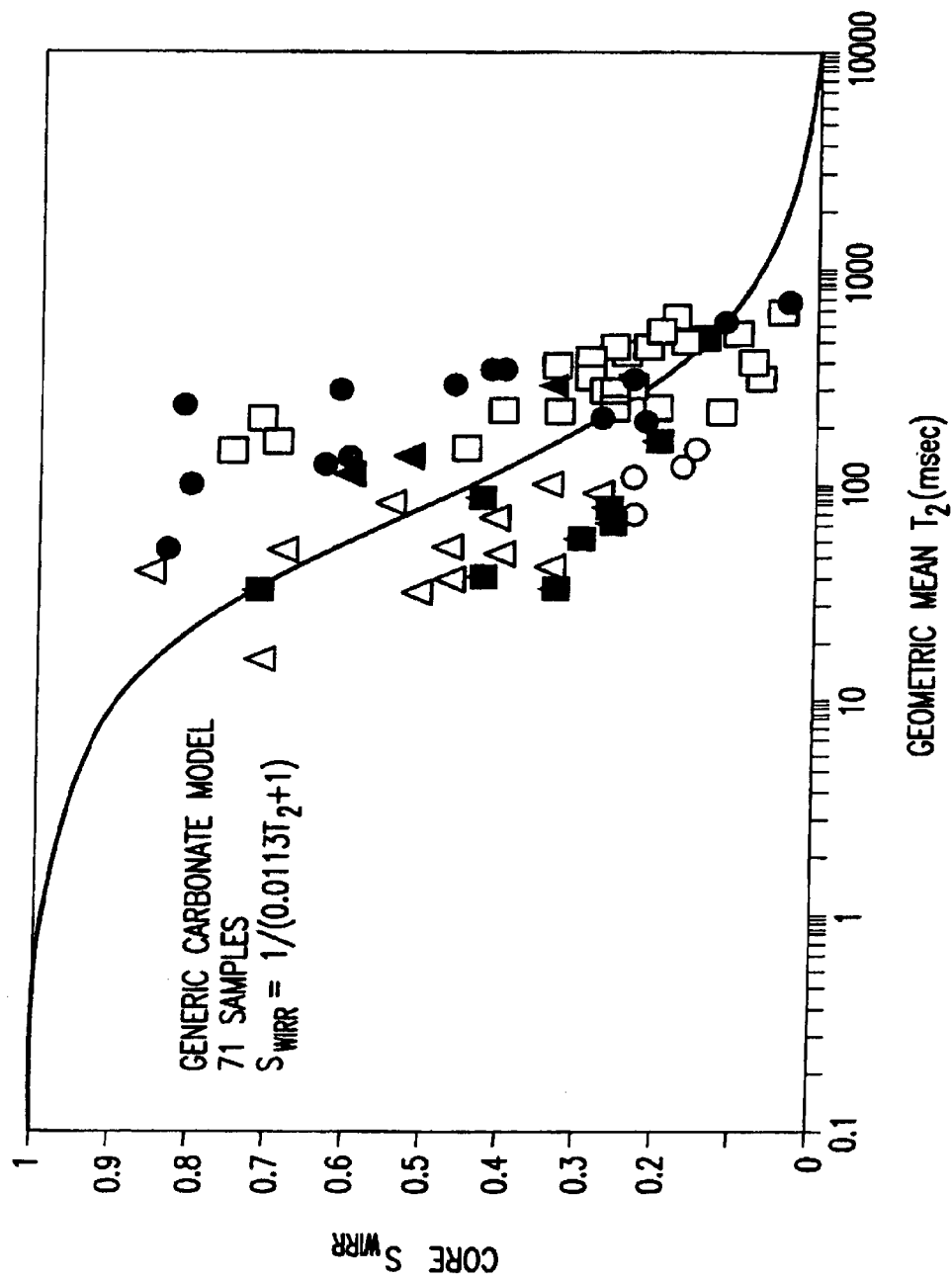
FIG. 40 shows how the generic carbonate SBVI model was built from six groups of samples. On an individual basis, some of the groups suggest the empirical $S_{WIRR}$-$T_2$ transform should have b<1.

In cases where NMR logs are run for the first time and a laboratory core study is not available to define the calibration coefficients, generic models, derived from aggregate studies of several sandstone and carbonate formations, are applied to the data. In most cases, the generic models will give good results, however, the precision may not be as good as that which can be achieved with an optimized calibration. The generic model for sandstones was derived from 340 sandstone samples, and the carbonate model was developed from 71 samples using b=1. The m in Eq. 12 is 0.0618 for the generic sandstone model, and 0.0113 for carbonates. FIG. 39 shows the data that were used to develop the generic sandstone model. The data came from 22 geographical/formation groups. Six groups of samples were used to construct the generic carbonate model as shown in FIG. 40. Individual groups of carbonate samples suggest b<1 may be appropriate for some formations. The available carbonate data is limited; the generic model in its present form is provisional and may be subject to change as more examples are added. Results from the generic carbonate model may also be less precise in many cases because of the variability of carbonates in general, and the small number of points used to develop the model.

We claim:

1. A method for nuclear magnetic resonance (NMR) borehole logging comprising the steps of:
   a. providing a core analysis of a borehole, the analysis comprising capillary pressure responses being indexed by true vertical depth (TVD) in the borehole;
   b. providing a NMR log of a borehole, the NMR log being indexed by a true vertical depth (TVD);
   c. deriving a bound volume irreducible (BVI) transformation model calibrated on the basis of the provided core analysis;
   d. applying the derived BVI transformation model to the NMR log of the borehole to quantify non-producible water in the NMR log.

2. The method of claim 1, wherein the derived BVI transformation model comprises a height-bases BVI (HBVI) model.

3. The method of claim 2, wherein the HBVI model is defined by $P_c=H(\delta_W-\delta_H)$, where $P_c$ represents capillary pressure, $\delta_W$ is the pressure gradient for the water in the formation, $\delta_H$ is the pressure gradient of the hydrocarbon, and H is the height of the measurement above the free water level.

4. The method of claim 1, wherein the derived BVI transformation model comprises a spectral-BVI (SBVI) model.

5. The method of claim 4, wherein the SBVI model is expressed as $1/S_{WIRR}=mT_2+b$, wherein integer $b\geq 0$, m is a slope of the SBVI function and $S_{WIRR}$ is an irreducible water saturation.

6. The method of claim 5, wherein the slope m of the SBVI function is correlated to the capillary pressure responses.

7. The method of claim 5, wherein the slope m of the SBVI and the capillary pressure responses have logarithmic dependence.

8. The method of claim 2, wherein the derived BVI transformation model comprises a cutoff-BVI (CBVI) model.

9. The method of claim 2, wherein the derived BVI transformation model comprises a SBVI and a CBVI models.

10. The method of claim 1 further comprising the step of computing a capillary pressure curve based on the provided capillary pressure responses.

11. The method of claim 1 further comprising the step of identifying hydrocarbon and water volumes on the computed capillary pressure curve.

12. The method of claim 9 further comprising the step of subdividing the identified water volume into clay and non-clay water volumes.

13. The method of claim 12, wherein the $T_2$ measurements are obtained via logging-while-drilling process.

14. The method of claim 12, wherein the $T_2$ measurements are obtained via wireline logging.

15. The method of claim 12, wherein the $T_2$ measurements are obtained via logging-while-drilling process.

16. The method of claim 12, wherein the $T_2$ measurements are obtained via wireline logging.

17. The method of claim 1, wherein provided core analysis was collected from at least one borehole.

18. The method of claim 1, wherein the provided core analysis comprises an integration of core analyses from more then one borehole.

19. The method of claim 1 further comprising a step of constructing a database of core analyses.

20. The method of claim 1 further comprising a step of fitting a mathematical function through the collection of points to obtain a continuous relationship between capillary pressure and the parameters in the BVI transformation model.

21. The method of claim 1, wherein the NMR log comprises $T_2$ measurements.

22. The method of claim 1, wherein the NMR log comprises $T_2$ measurements.

23. The method of claim 1, wherein provided core analysis was collected from at least one borehole.

24. The method of claim 1, wherein the provided core analysis comprises an integration of core analyses from more then one borehole.

25. The method of claim 1 further comprising a step of constructing a database of core analyses.

* * * * *

UNITED STATES PATENT AND TRADEMARK OFFICE
CERTIFICATE OF CORRECTION

PATENT NO. : 6,833,699 B2  
APPLICATION NO. : 10/252135  
DATED : December 21, 2004  
INVENTOR(S) : James E. Galford and David M. Marschall It is certified that error appears in the above-identified patent and that said Letters Patent is hereby corrected as shown below:

At column 21, line 25, replace

" $S_{WIRR}(T_2) = \dfrac{T_{2IRR}}{T_2}\left(2 - \dfrac{T_{2IRR}}{T_2}\right)$ " with -- $S_{WIRR}(R) = \dfrac{R_{WIRR}}{R}\left(2 - \dfrac{R_{WIRR}}{R}\right)$ --.

Signed and Sealed this

Twenty-fifth Day of March, 2008

JON W. DUDAS  
*Director of the United States Patent and Trademark Office*